(12) United States Patent
Driskell

(10) Patent No.: US 6,801,230 B2
(45) Date of Patent: Oct. 5, 2004

(54) METHOD TO DISPLAY AND MANAGE COMPUTER POP-UP CONTROLS

(76) Inventor: Stanley W. Driskell, 4830 Washtenaw Ave., No. C2, Ann Arbor, MI (US) 48108

( * ) Notice: Subject to any disclaimer, the term of this patent is extended or adjusted under 35 U.S.C. 154(b) by 500 days.

(21) Appl. No.: 10/023,319

(22) Filed: Dec. 18, 2001

(65) Prior Publication Data

US 2003/0112278 A1 Jun. 19, 2003

(51) Int. Cl.[7] .............................................. G06F 15/00
(52) U.S. Cl. ....................................... 345/854; 345/808
(58) Field of Search ................................. 345/763, 853, 345/854

(56) References Cited

U.S. PATENT DOCUMENTS 6,256,032 B1 * 7/2001 Hugh ........................ 345/854

* cited by examiner

Primary Examiner—Cao (Kevin) Nguyen
(74) Attorney, Agent, or Firm—Harness, Dickey & Pierce, P.L.C.

(57) ABSTRACT

This invention enhances the usability of the human-computer interface by disclosing a technique for the display of single and multi-generation pop-up controls at a location that best meets the user's criterion of an optimal display location. The technique determines the minimum size of a rectangle capable of displaying the actual or likely maximum size of pop-up controls requested during any given activation of the subsystem that manages display of requested controls. The invention then identifies a location that assures the said rectangle either has no overlay or a minimum overlay of the screen area of current interest to the user while avoiding display clipping. A fixed-point is now determined within said rectangle based on physical characteristics of the controls to be displayed that permits display of descendant controls in a backward cascade that enables the user to maintain visual focus at a fixed screen location while manipulating successive controls. The invention provides the user with the ability to redisplay any previously displayed control irrespective of control type as well as provide a "Done" capability for appropriately designed controls that permits the user to convert a single selection control into a multi-selection control. As an adjunct to the reverse order the invention provides four capabilities that permit the user to undo and redo arbitrary services via performed via redisplay of ancestor controls.

46 Claims, 61 Drawing Sheets

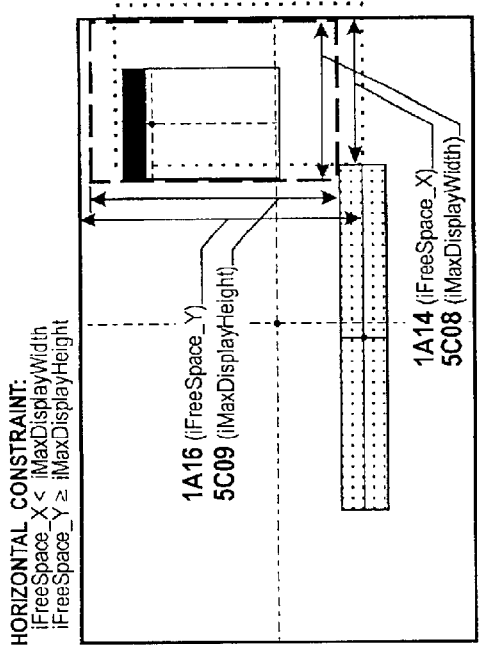
FIGURE 1B1
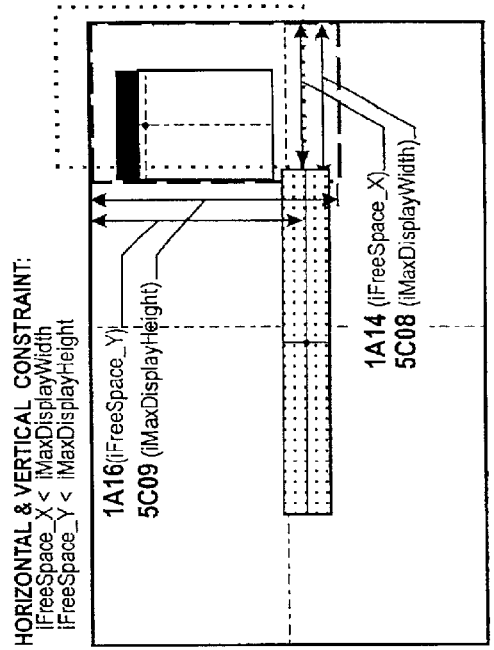
FIGURE 1B2
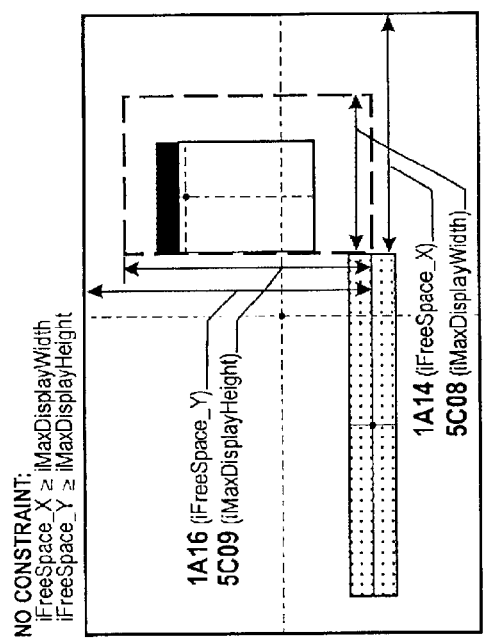
FIGURE 1B3
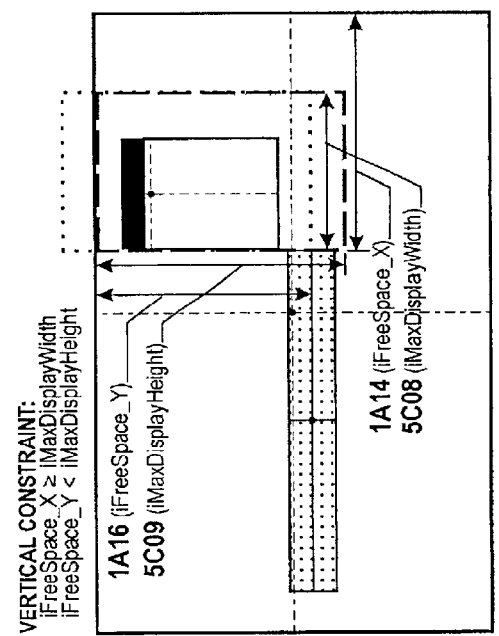
FIGURE 1B4

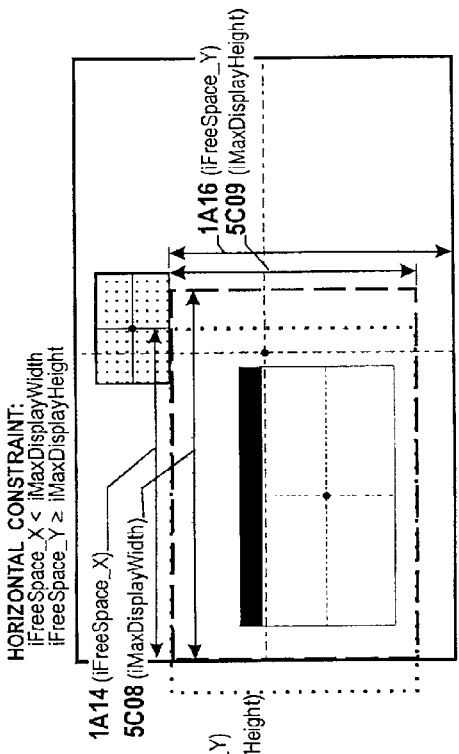
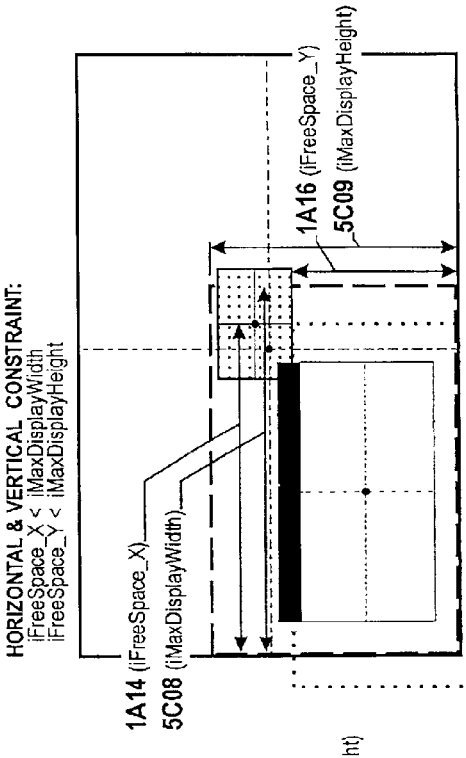
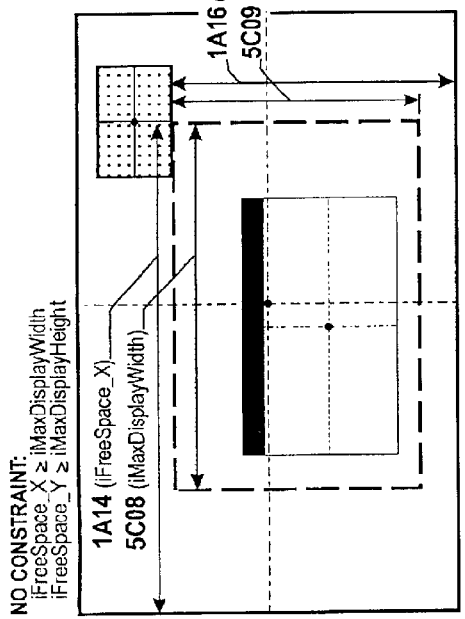
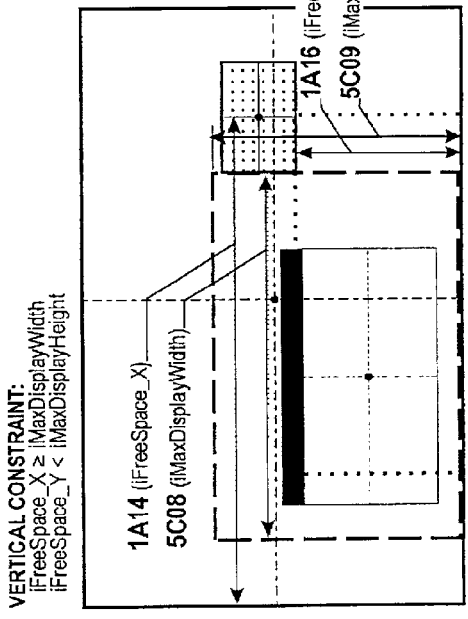

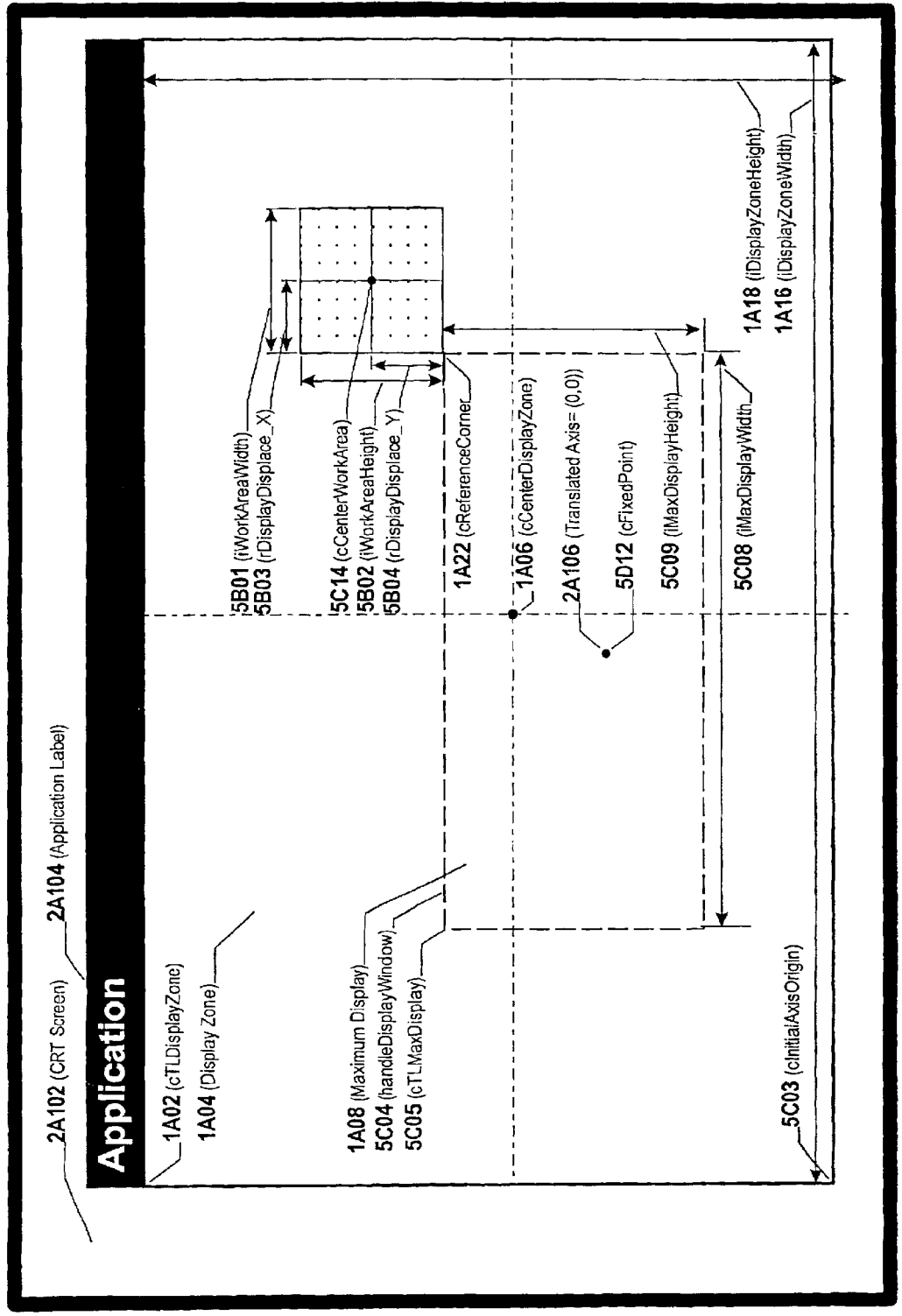
FIGURE 2A1

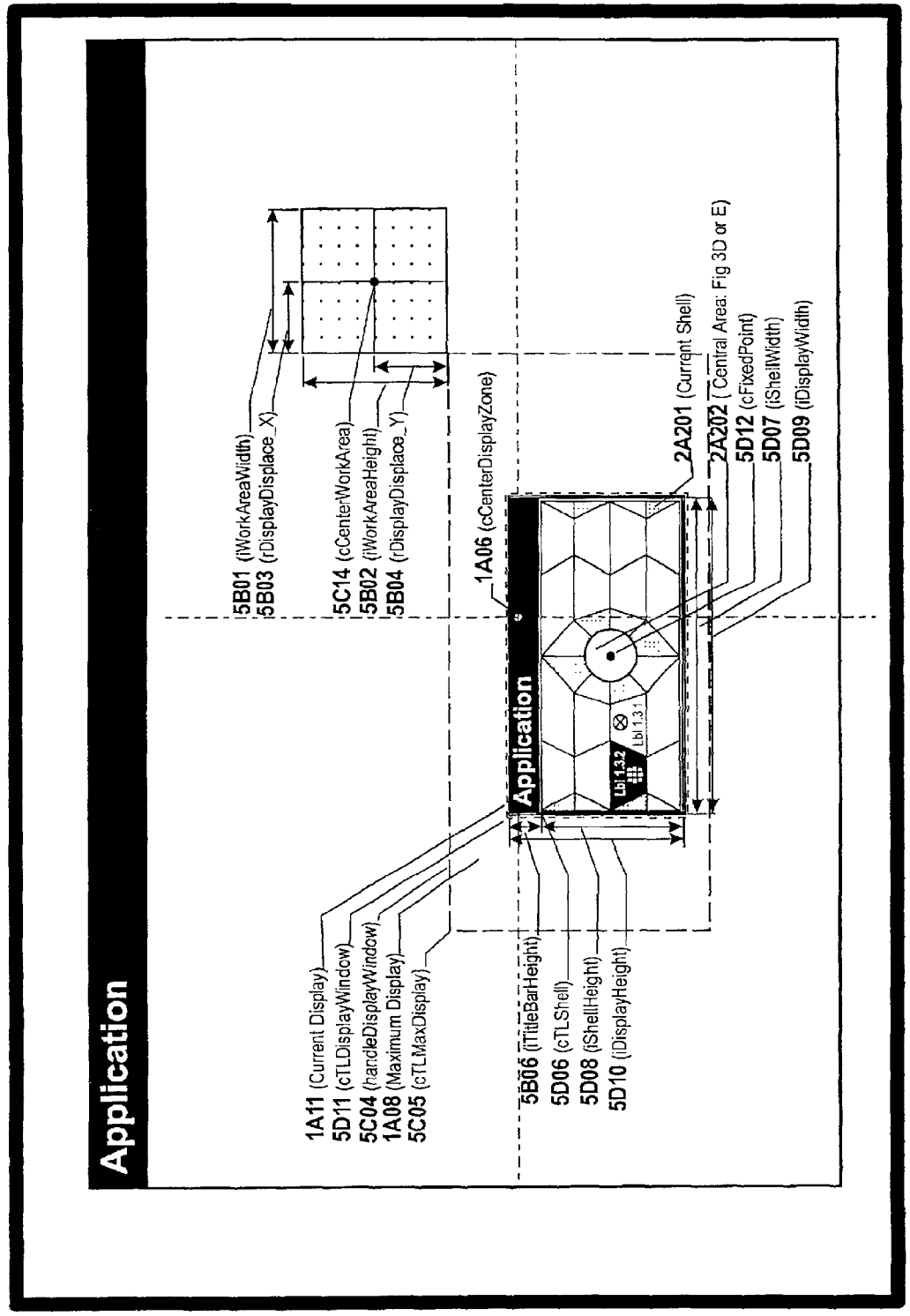
FIGURE 2A2

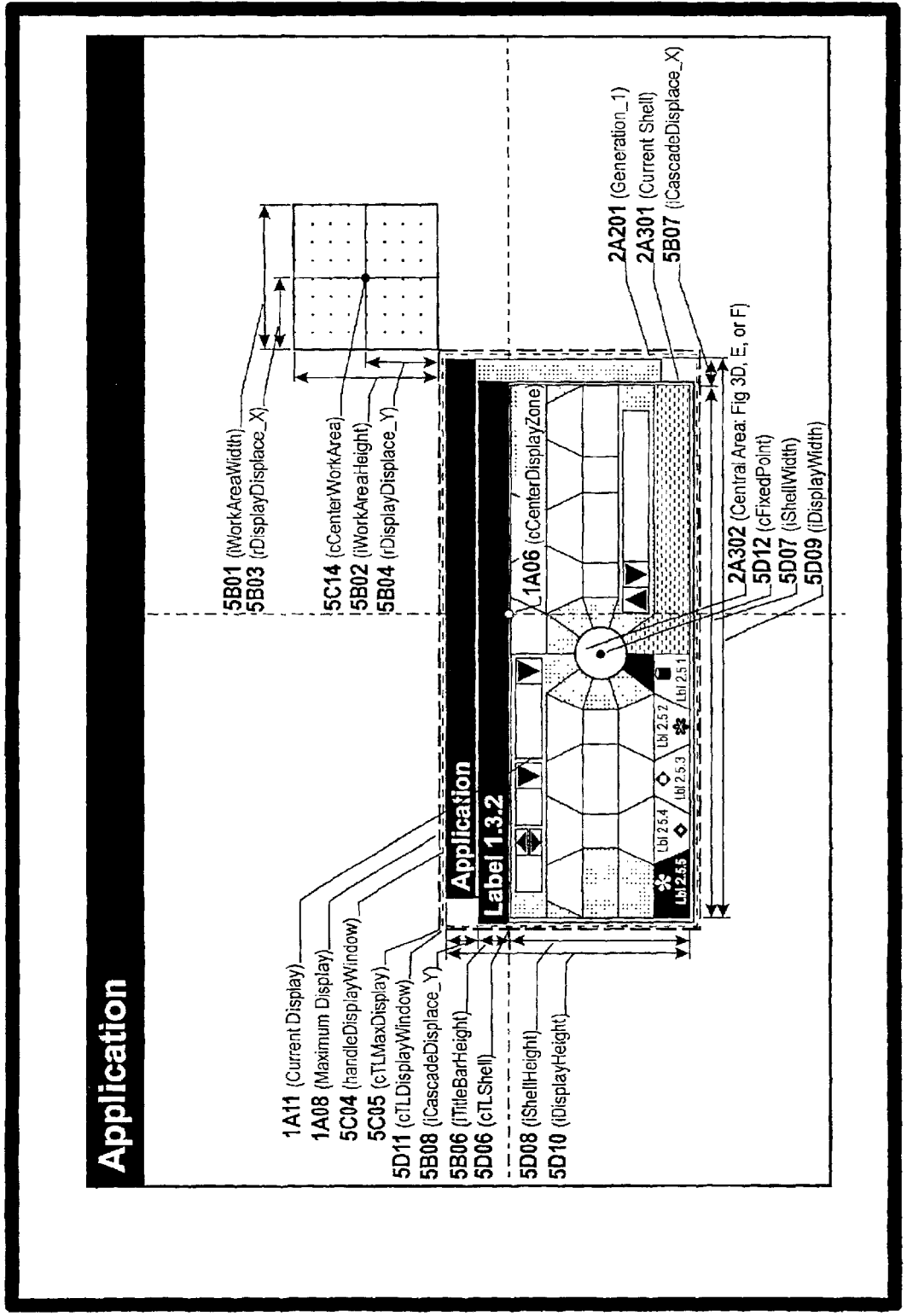
FIGURE 2A3

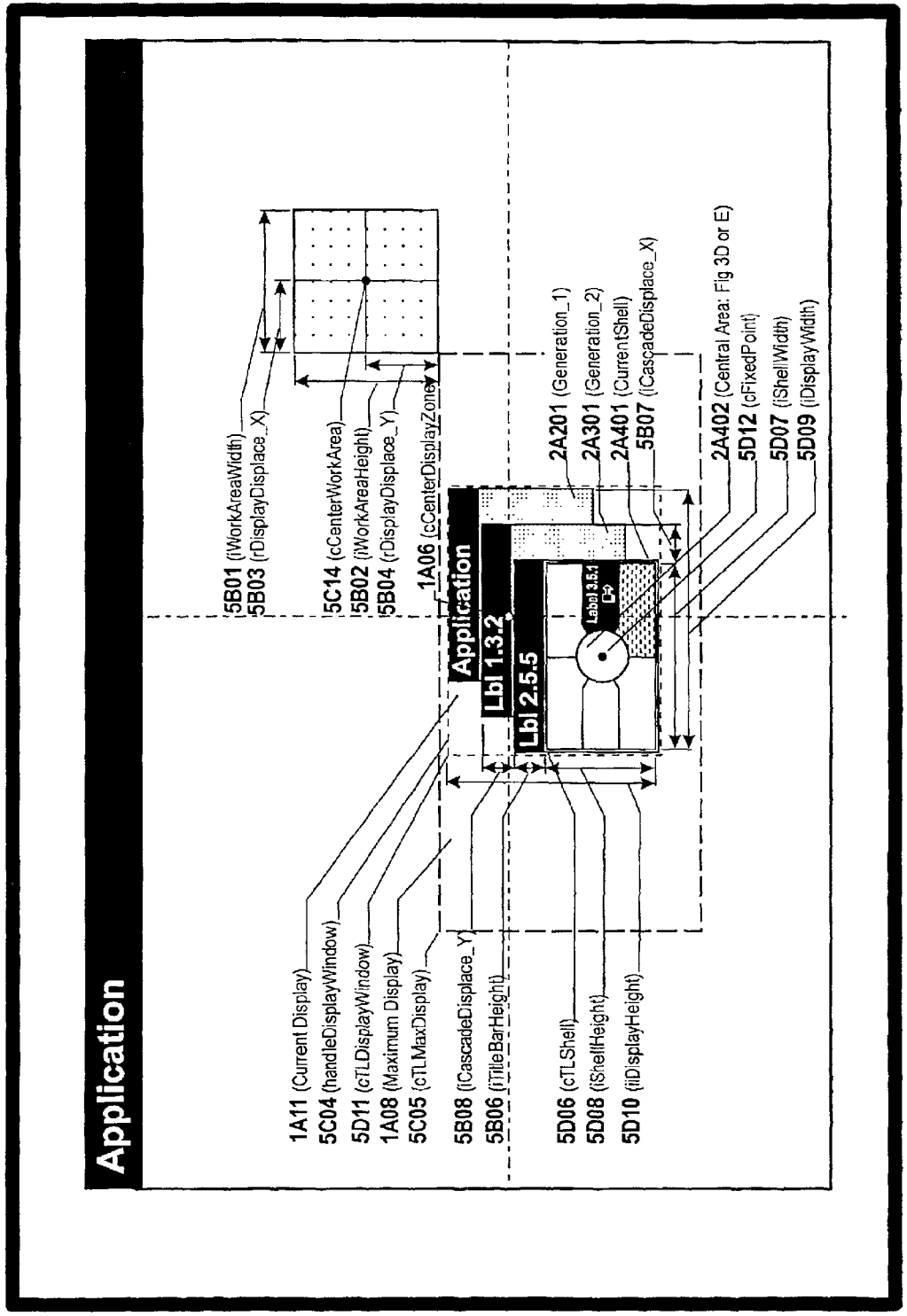
FIGURE 2A4

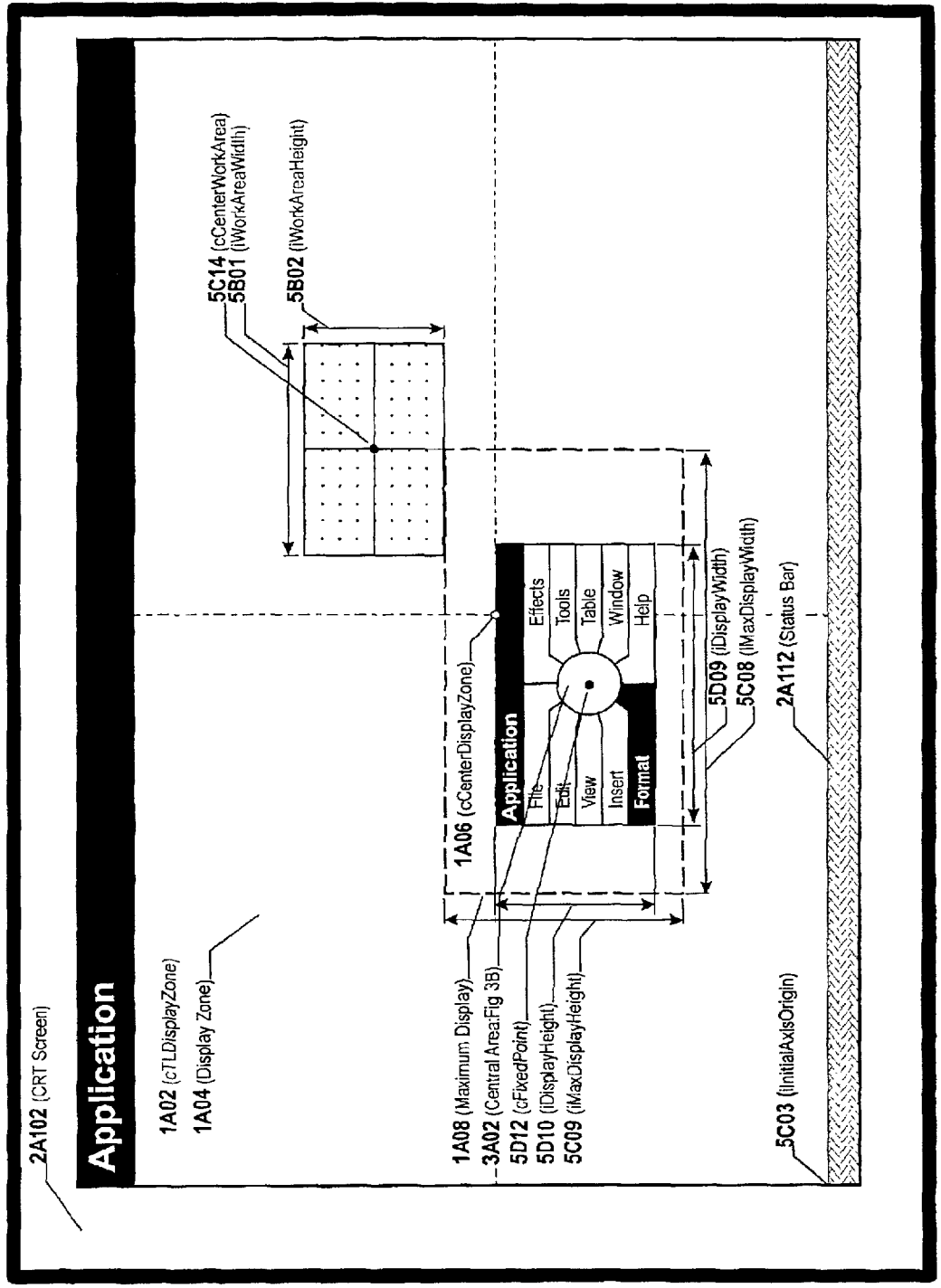
FIGURE 3A1

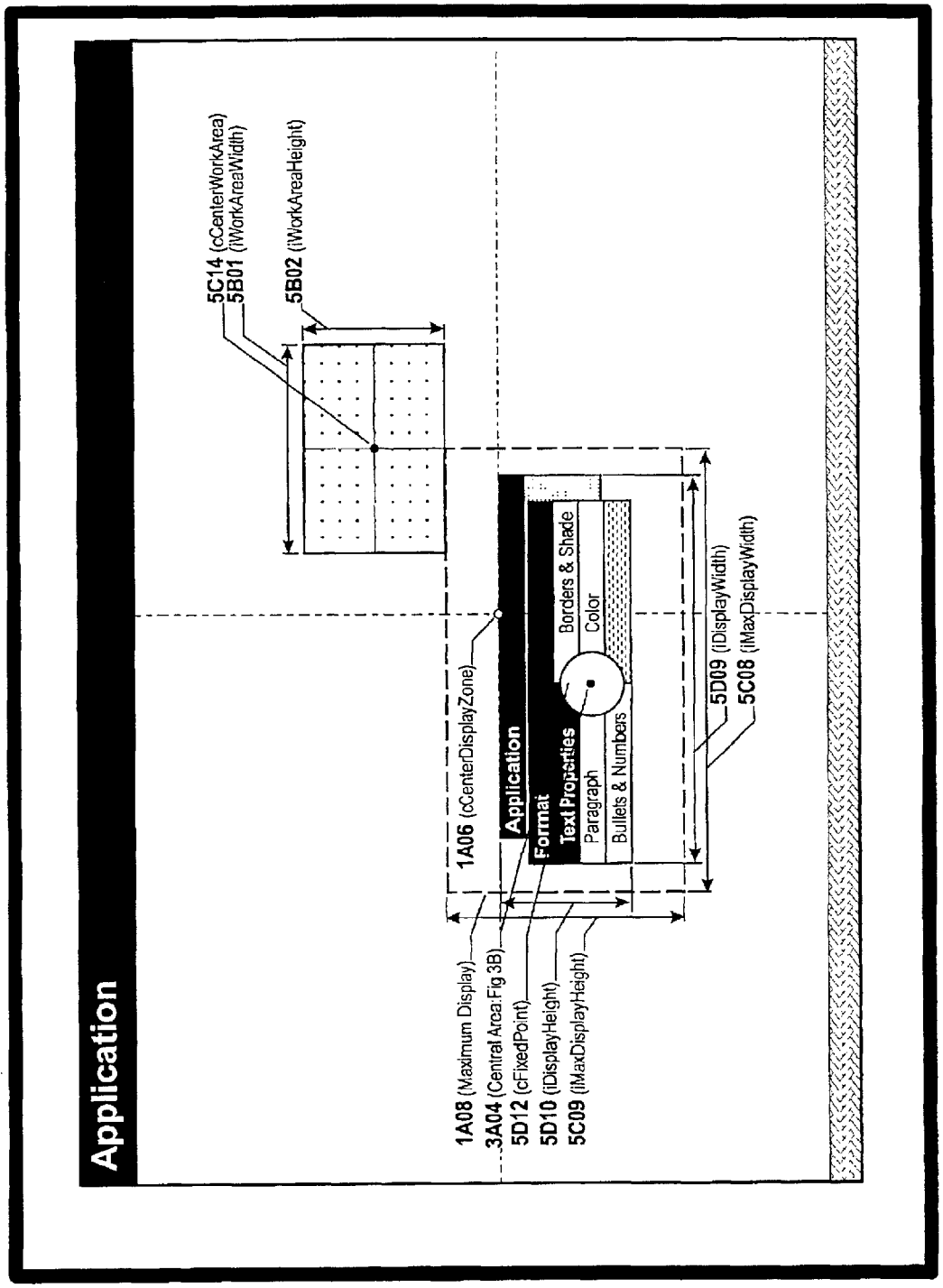
FIGURE 3A2

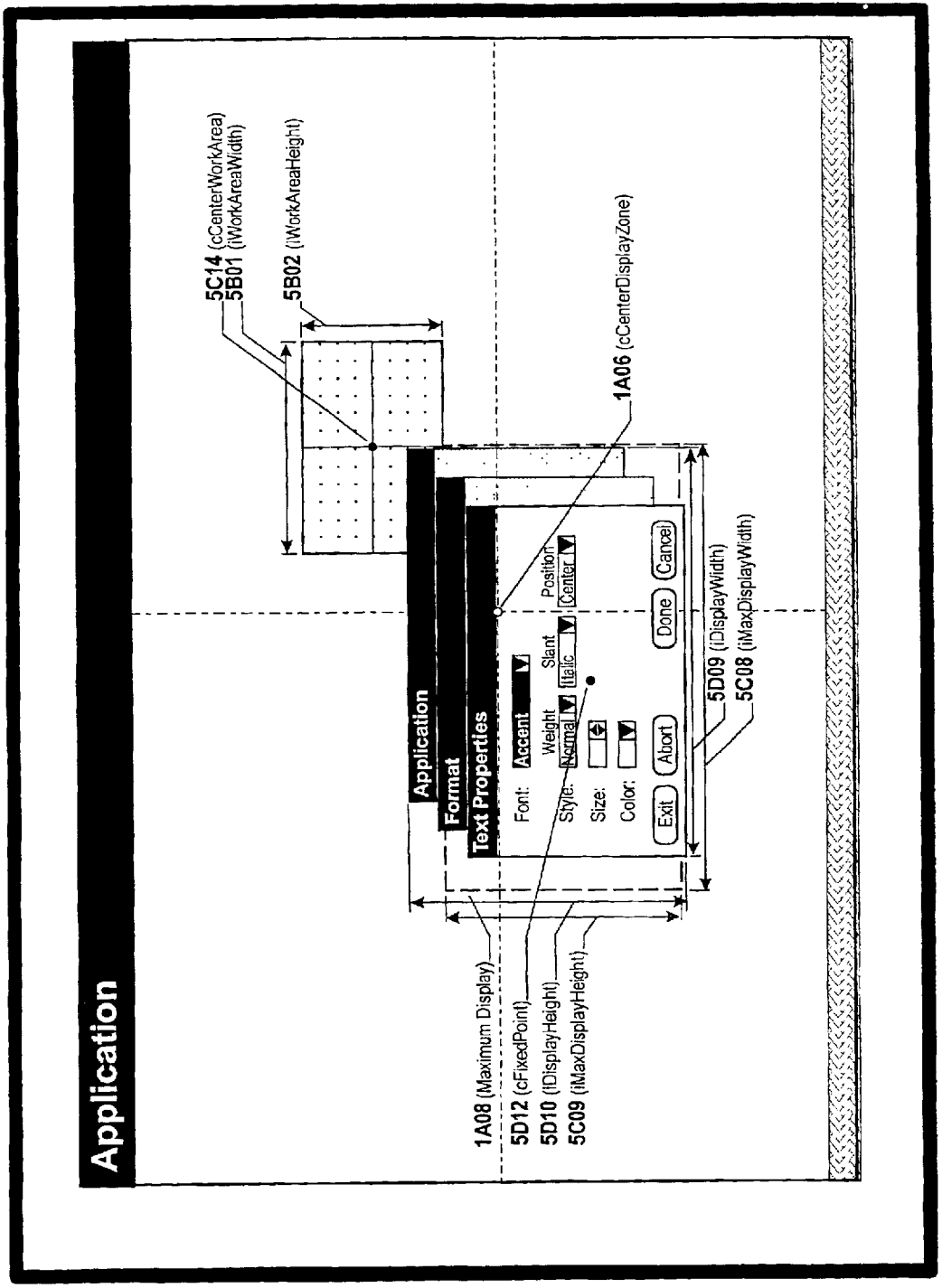
FIGURE 3A3

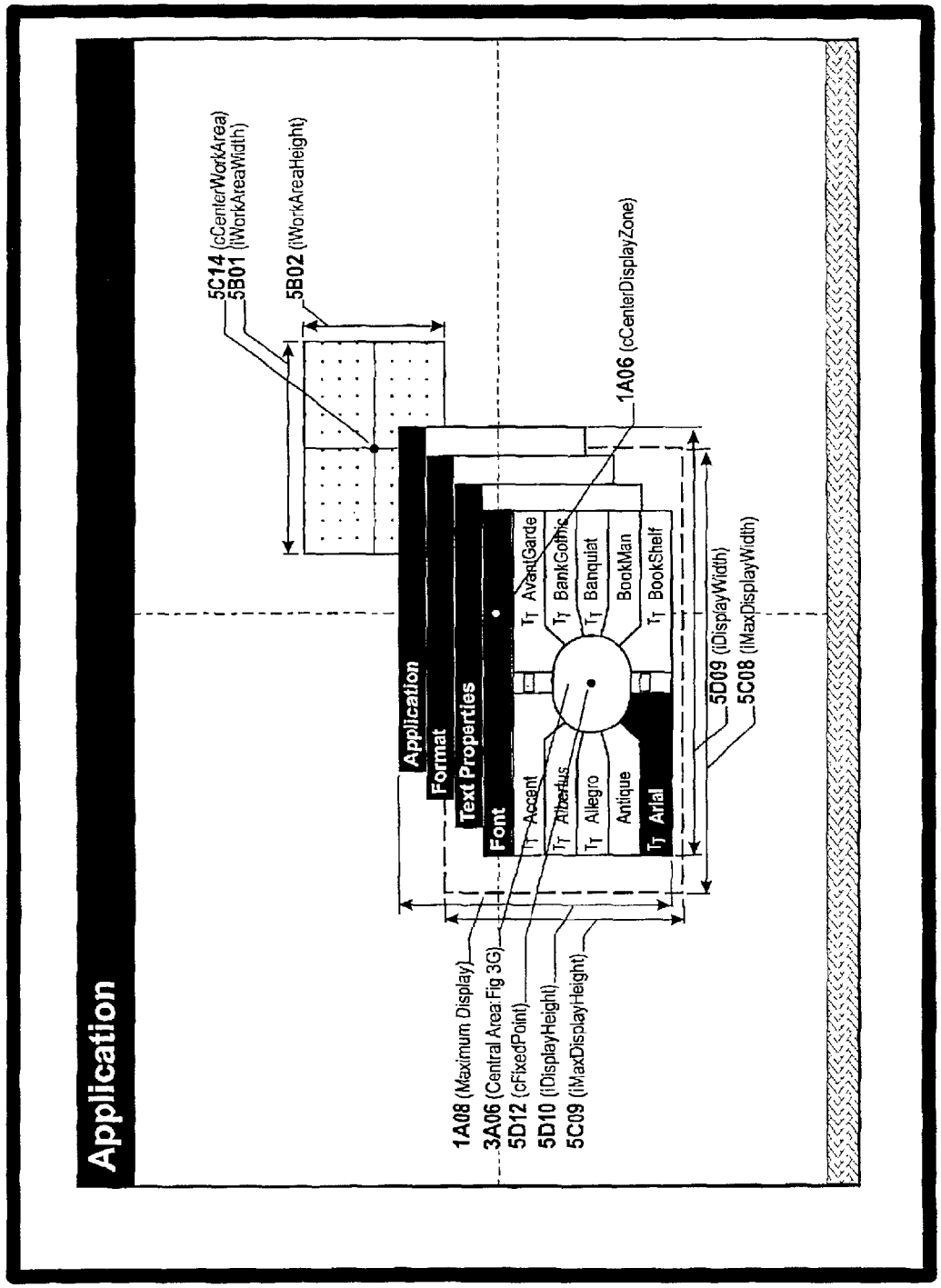
FIGURE 3A4

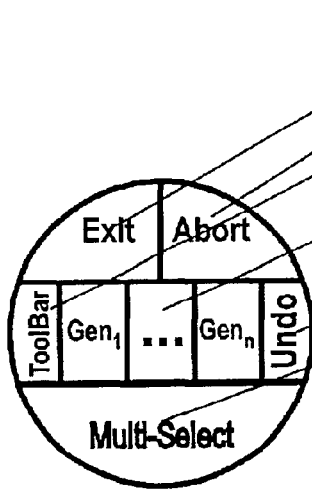
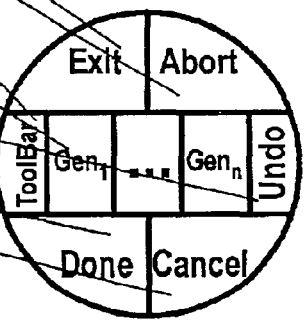
FIGURE 3B1  FIGURE 3B2
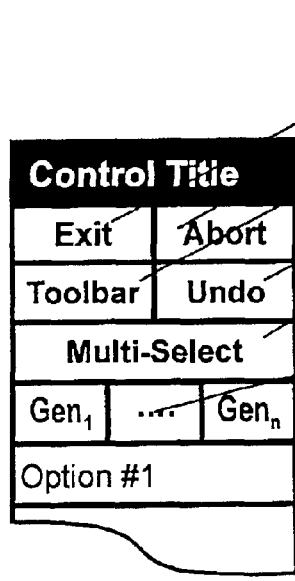
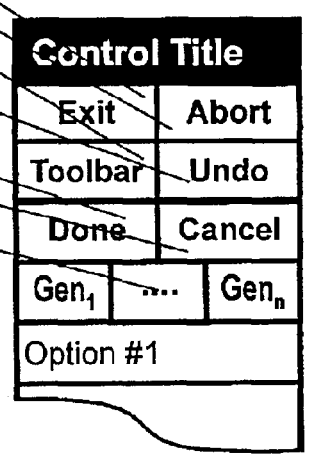
FIGURE 3B3  FIGURE 3B4

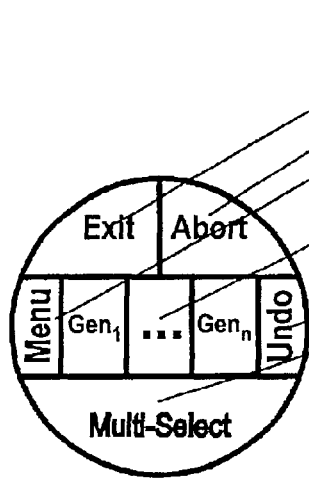
FIGURE 3C1
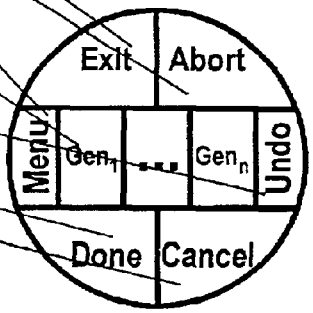
FIGURE 3C2
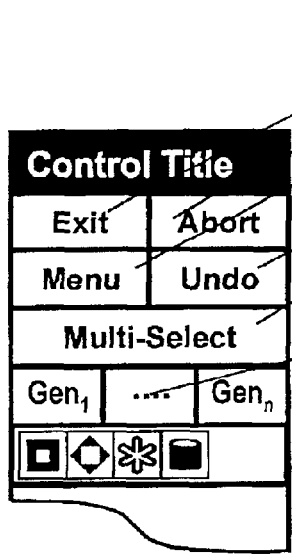
FIGURE 3C3
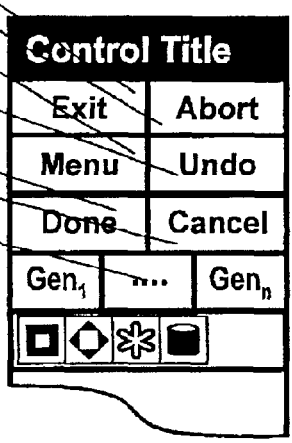
FIGURE 3C4

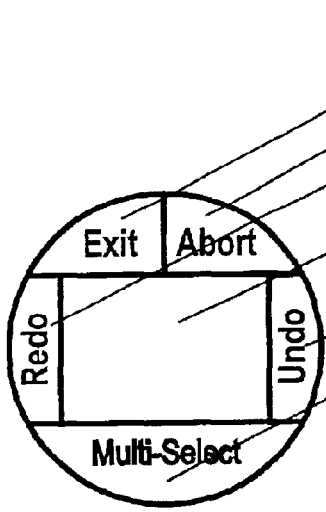
FIGURE 3D1
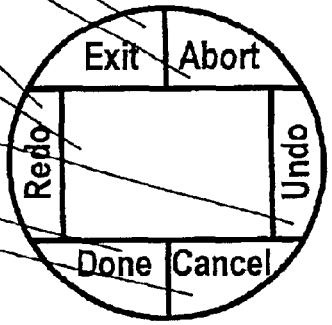
FIGURE 3D2
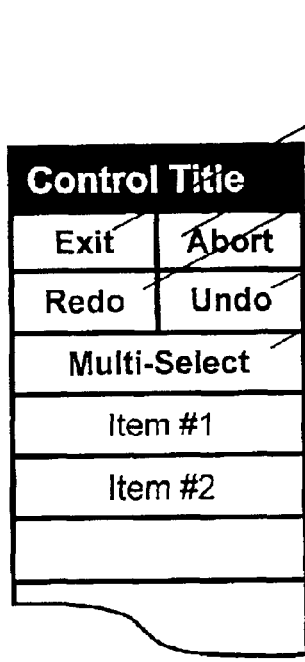
FIGURE 3D3
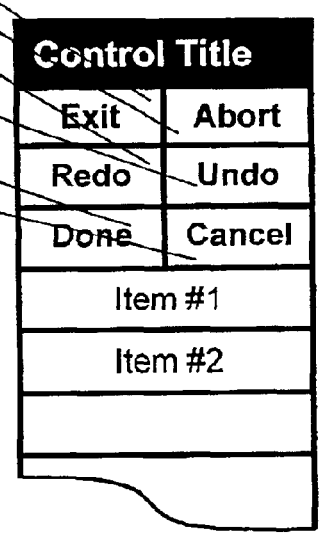
FIGURE 3D4

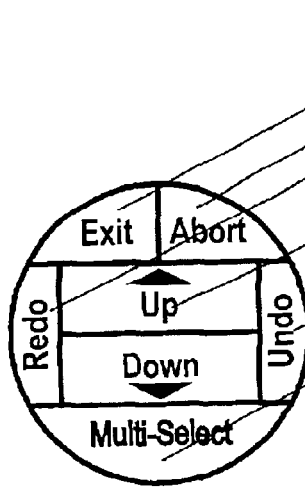
FIGURE 3E1
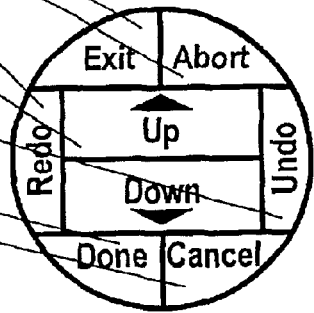
FIGURE 3E2
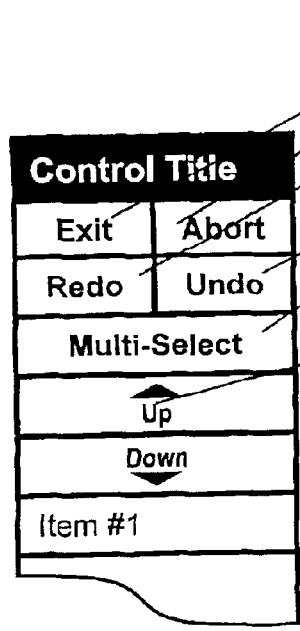
FIGURE 3E3
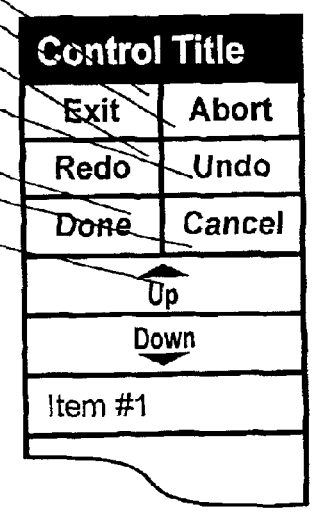
FIGURE 3E4

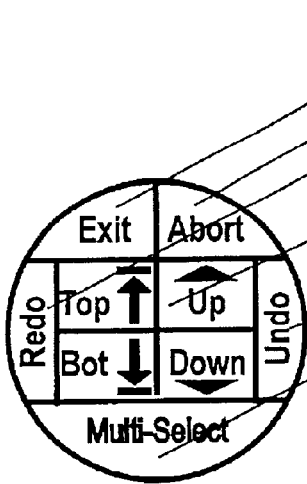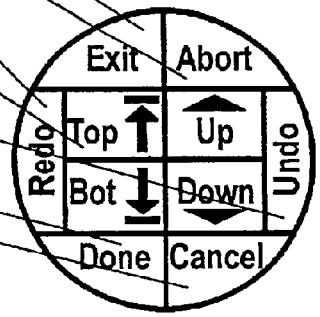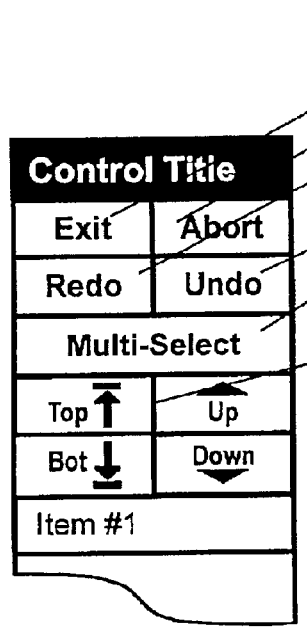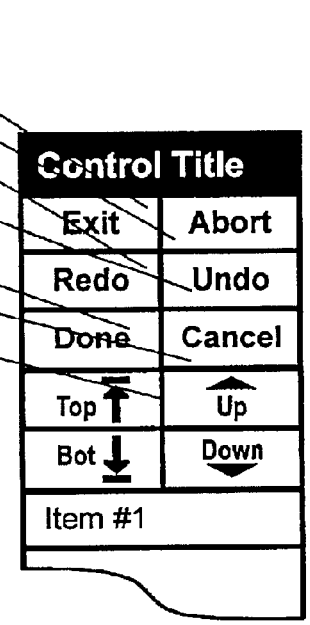
FIGURE 3F1
FIGURE 3F2
FIGURE 3F3
FIGURE 3F4

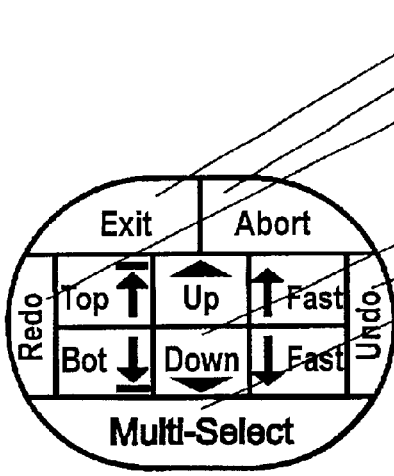
FIGURE 3G1
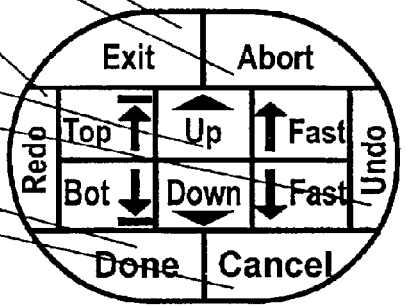
FIGURE 3G2
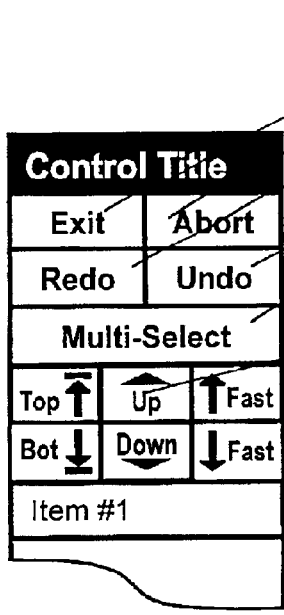
FIGURE 3G3
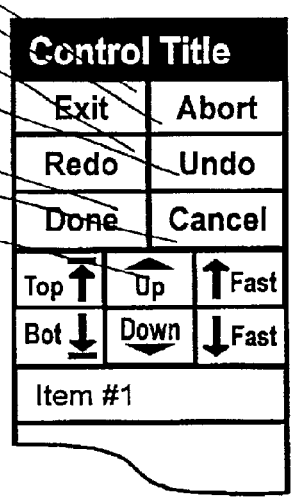
FIGURE 3G4 rDefaultParms — 5A00

| rCommon | aControl |
|---|---| rCommon

| | |
|---|---|
| 01 | iWorkAreaWidth |
| 02 | iWorkAreaHeight |
| 03 | rDisplayDisplace_X |
| 04 | rDisplayDisplace_Y |
| 05 | sFormat |
| 06 | iTitleBarHeight |
| 07 | iCascadeDisplace_X |
| 08 | iCascadeDisplace_Y |
| 09 | bCursorJump |
| 10 | rWAx/DZxRatio |
| 11 | rWAy/DZyRatio |
| 12 | bLikelyMaxDimensions |
| 13 | iMaxServices |
| 14 | (unused) | aControl[sControlType]

| |
|---|
| rVar[Menu] |
| rVar[ToolBar] |
| rVar[ListBox] |
| rVar[Dialog] |
| rVar[Other] | rVar

| | |
|---|---|
| 15 | iRegionHeight |
| 16 | iRegionsLimit |
| 17 | iIconWidth |
| 18 | iMaxLabelLength |
| 19 | iMaxKeyEquivLength |
| 20 | iInterGap |
| 21 | iMaxNumGenerations |
| 22 | rFixedPointDisplace_X |
| 23 | rFixedPointDisplace_Y |
| 24 | iMaxShellWidth |
| 25 | iMaxShellHeight |
| 26 | iMaxDisplayWidth |
| 27 | iMaxDisplayHeight |
| 28 | pBaseControlParms |
| 29 | iBaseShellWidth |
| 30 | iBaseShellHeight |
| 31 | iBaseDisplayWidth |
| 32 | iBaseDisplayHeight |

DEFINITIONS: See definitions of Figure 5B

FIGURE 5A rDisplayParms 5B00

| rCommon | aControl |
|---|---| rCommon

| | |
|---|---|
| 01 | iWorkAreaWidth |
| 02 | iWorkAreaHeight |
| 03 | rDisplayDisplace_X |
| 04 | rDisplayDisplace_Y |
| 05 | sFormat |
| 06 | iTitleBarHeight |
| 07 | iCascadeDisplace_X |
| 08 | iCascadeDisplace_Y |
| 09 | bCursorJump |
| 10 | rWAx/DZxRatio |
| 11 | rWAy/DZyRatio |
| 12 | bLikelyMaxDimensions |
| 13 | iMaxServices |
| 14 | (unused) | aControl[sControlType]

| rVar[Menu] |
|---|
| rVar[ToolBar] |
| rVar[ListBox] |
| rVar[Dialog] |
| rVar[Other] | rVar

| | |
|---|---|
| 15 | iRegionHeight |
| 16 | iRegionsLimit |
| 17 | iIconWidth |
| 18 | iMaxLabelLength |
| 19 | iMaxKeyEquivLength |
| 20 | iInterGap |
| 21 | iMaxNumGenerations |
| 22 | rFixedPointDisplace_X |
| 23 | rFixedPointDisplace_Y |
| 24 | iMaxShellWidth |
| 25 | iMaxShellHeight |
| 26 | iMaxDisplayWidth |
| 27 | iMaxDisplayHeight |
| 28 | pBaseControlParms |
| 29 | iBaseShellWidth |
| 30 | iBaseShellHeight |
| 31 | iBaseDisplayWidth |
| 32 | iBaseDisplayHeight |

FIGURE 5B1

DEFINITIONS rCommon: PARAMETER VALUES APPLICABLE TO ALL CONTROLS

| | | |
|---|---|---|
| 01 | iWorkAreaWidth | Width of implicit WorkArea. |
| 02 | iWorkAreaHeight | Height of implicit Work Area. |
| 03 | rDisplayDisplace_X | The per cent of one-half the work area width from which the reference corner of the maximim display is displaced from the Work Area center:<br>— Positive displacement is toward the Display Zone center.<br>— Negative displacement is away from the Display Zone center. |
| 04 | rDisplayDisplace_Y | The per cent of one-half the work area height from which the reference corner of the maximim display is displaced from the Work Area center.<br>— Positive displacement is toward the Display Zone center.<br>— Negative displacement is away from the Display Zone center. |
| 05 | sFormat | String identifying display format: "Traditional", "Spider", "Dialog" or "Other". |
| 06 | iTitleBarHeight | Height of title bar. |
| 07 | iCascadeDisplace_X | Horizontal displacement with which each successive ancestor of the control display is cascaded. |
| 08 | iCascadeDisplace_Y | Vertical displacement with which each successive of ancestorof the control display is cascaded. |
| 09 | bJumpCursor | Default disposal of cursor at termination of control display:<br>-- TRUE -> DO move cursor to cStartCurtsor coordinates.<br>-- FALSE-> DO NOT move cursor to cStartCurtsor coordinates. |
| 10 | rWAx/DZxRatio | Ratio of work-area/display-zone width that sets rDisplayDisplace_Y=0.0 and rDisplayDisplace_X=1.0; |
| 11 | rWAz/DZzRatio | Ratio of work-area/display-zone height that sets rDisplayDisplace_Y=1.0 and rDisplayDisplace_X=0.0; |
| 12 | bLikelyMaxDimensions | TRUE -> User supplies dimensions of likely largest control display,<br>FALSE -> User supplies dimensions of the absolutely maximum display. |
| 13 | iMaxServices | Maximum number of services that will ever ever requested during a Contro Subsystem activation. |

FIGURE 5B2

DEFINITIONS (Continued)

aControl[sFormat].rVar: PARAMETER VALUES SPECIFIC TO EACH CONTROL MANAGED

| | | |
|---|---|---|
| 15 | iRegionHeight | Height of area of display in which an item or a group of items is displayed. |
| 16 | iRegionsLimit | Max number of different items or groups of related items appearing on any single display. |
| 17 | iIconWidth | Width of any icon present. |
| 18 | iMaxLabelLength | Maximum length of any label appearing in a control. |
| 19 | iMaxKeyEquivLength | Maximum length of any key-equavilent symbols appearing in a control. |
| 20 | iInterGap | Spacing between identification elements in a region |
| 21 | iMaxNumGenerations | Maximum number of controls that can be present in a control path. |
| 22 | rFixedPointDisplace_X | Percent of iMaxShellWidth the cFixedFocusPoint.X is displaced rightward from top-left corner of the maximum shell. |
| 23 | rFixedPointDisplace_Y | Percent of iMaxShellHeight the cFixedFocusPoint.Y is displaced downward from top-left corner of the maximum shell. |
| 24 | iMaxShellWidth | Maximum width required for Menu & ToolBar shell. Null for other controls |
| 25 | iMaxShellHeight | Maximum Height required for Menu & ToolBar shell. Null for other controls. |
| 26 | iMaxDisplayWidth | Maximum width required for Menu & ToolBar display. Null for other controls |
| 27 | iMaxDisplayHeight | Maximum Height required for Menu & ToolBar display. Null for other controls. |
| 28 | pBaseControlParms | Pointer to the data structure defining the initial menu or toolbar displayed at control activation. This parameter is null for controls having parameters that can vary during different activations. |
| 29 | iBaseShellWidth | Width of initial Menu &r ToolBar shell. Null for other controls |
| 30 | iBaseShellHeight | Height of initial Menu & ToolBar shell. Null for other controls. |
| 31 | iBaseDisplayWidth | Width of initial Menu & ToolBar display. Null for other controls |
| 32 | iBaseDisplayHeight | Height of initial Menu & ToolBar display. Null for other controls. |

FIGURE 5B3

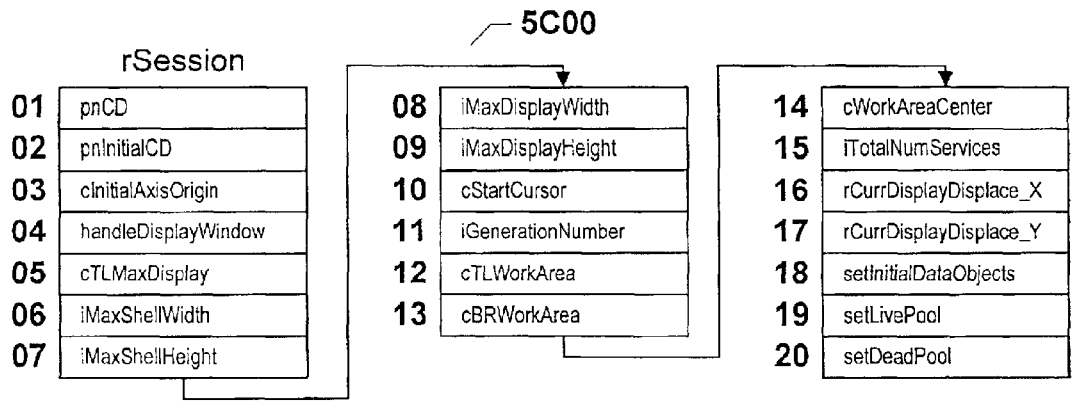

DEFINITIONS rCurrentSession: VARIABLES OF CURRENT ACTIVATION OF DISPLAY SUB-SYSTEM
- 01 pnCD — Pointer to node of llnCD storing values fo the current display.
- 02 pInitialnAC — Pointer to first node of the llnCD data structure.
- 03 cInitialAxisOrigin — Screen coordinate pair of defining the axis origin at control subsystem activation.
- 04 handleDisplayWindow — Pointer to data and procedures controlled by the operating system that manage the window containing the controldisplay.
- 05 cTLMaxDisplay — Coordinate pair defining best location of top-left corner of the maximum display.
- 06 iMaxShellWidth — Width of max shell that can be encountered given the initial display requested.
- 07 iMaxShellHeight — Height of max shell that can be encountered given the initial display requested.
- 08 iMaxDisplayWidth — Width of max display that can be encountered given the initial display requested.
- 09 iMaxDisplayHeight — Height of max display that can be encountered given the initial display requested.
- 10 cStartCursor — Coordinate pair defining the cursor location relative to cInitialAxisOrigin at control subsystem activation.
- 11 iGenerationNumber — Number of generations of current toolbar display.
- 12 cTLWorkArea — Coordinate pair defining the top-left corner of the current work area.
- 13 cBRWorkArea — Coordinates of bottom-right corner of the current work area.
- 14 cWorkAreaCenter — Coordinate pair defining the center of the current work area.
- 15 iTotalNumServices — Number of services performed during the current control subsystem activation.
- 16 rCurrDisplayDisplace_X — rDisplayDisplace_X parameter with allowance for extreme work area dimensions.
- 17 rCurrDisplayDisplace_Y — rDisplayDisplace_Y parameter with allowance for extreme work area dimensions.
- 18 setInitialDataObjects — Set of data objects existing control subsystem activated.
- 19 setLivePool — Accumulating set of data objects created by user manipulation of controls during current activation of the control subsystem.
- 20 setDeadPool — Accumulating set of data objects destroyed by user manipulation of controls during current activation of the control subsystem.

FIGURE 5C

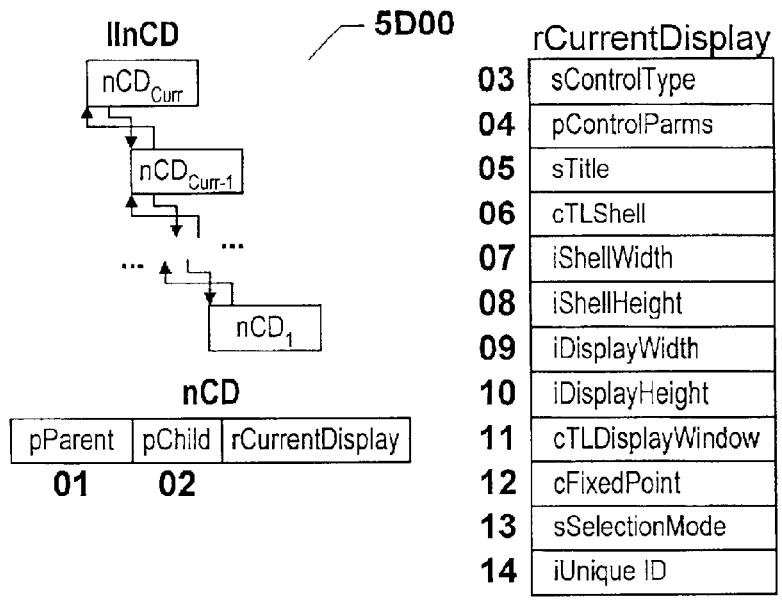

DEFINITIONS

| | | |
|---|---|---|
| 01 | pParent | Pointer to parent of current nCD node |
| 02 | pChild | Pointer to child of current nCD node. | rCurrentDisplay: VARIABLE VALUES TO MANAGE CURRENT DISPLAY

| | | |
|---|---|---|
| 03 | sControlType | Type of control managed by current llnCD node: "Menu", "ToolBar", "ListBox", "Dialog", "Other". |
| 04 | pControlParms | Pointer to system data structure defining parameters of the control identified by the current nCD node. |
| 05 | sTitle | String containing label appearing inTitleBar |
| 06 | cTLShell | Coordinate pair defining the top-left corner of the shell of the current control. |
| 07 | iShellWidth | Width of the current shell. |
| 08 | iShellHeight | Height of the current shell. |
| 09 | iDisplayWidth | Width of the current display. |
| 10 | iDisplayHeight | Height of the current display. |
| 11 | cTLDisplayWindow | Coordinate pair defining the top-left corner of the current display. |
| 12 | cFixedPoint | Coordinate pair defining the current fixed point. |
| 13 | sSelectionMode | Designates kind of selection from control is permitted<br>-- Single -> single selection is imposed by design.<br>-- User ->"MultiSelect" displayed.<br>    * If "Multi-Sect" not selected, user is constrained to single selection.<br>    * If "Multi-Sect" selected, the multi-select area is reconfigured to "Done\|Cancel", and the user is not constrained to single selection..<br>-- Multiple -> multiple selection is permitted. |
| 14 | iUniqueID | The unique identification number of specific control defined by current llnCD node. |

FIGURE 5D

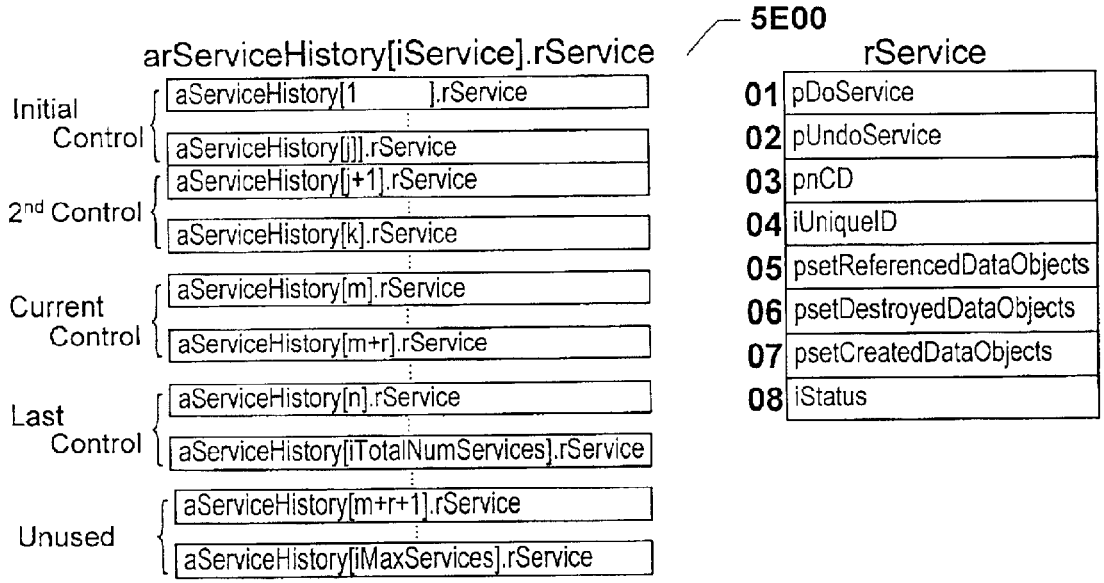

DEFINITIONS rService: VARIABLE VALUES TO MANAGE ARBITRARY UNDO 01 pDoService     Pointer to processes that perform the $X^{th}$ service of the current Control Subsystem activation.

02 pUndoService   Pointer to processes that perform the reverse capability of the $X^{th}$ service of the current Control Subsystem activation.

03 pnCD     Pointer to lInCD node defining the control from which the $X^{th}$ service of the current control subsystem activation was requested.

04 iUniqueID     Unique identification number of the control identified by the current node.

05 psetReferencedDataObjects
             Pointer to a set identifying all data objects utilized during performance of the $X^{th}$ service excluding reference to any data object(s) created by that service.

06 psetDestroyedDataObjects
             Pointer to a set identifying all data objects destroyed during performance of the Xth service.

07 psetCreatedDataObjects
             Pointer to a set identifying all data objects created during performance of the $X^{th}$ service.

08 iStatus     Indicator to the current state of the $X^{th}$ service:
             +1 -> service has not been reversed
             0 -> service is temporarily reversed
             -1 -> service currently reversed because of dependence on a one or more data objects created by prior service(s) that have been reversed.
             -2 -> service is permanently reversed

FIGURE 5E

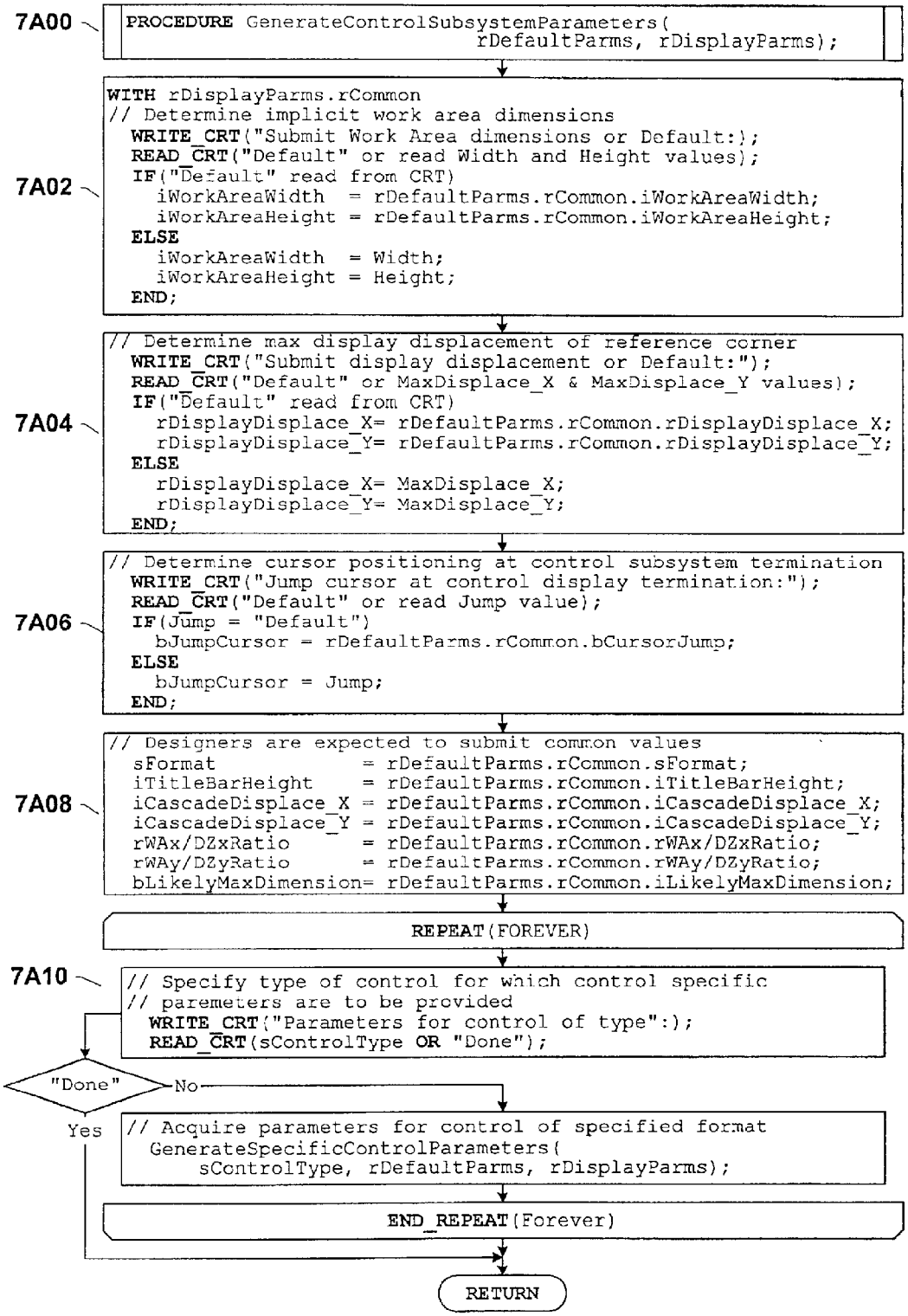
FIGURE 7A1

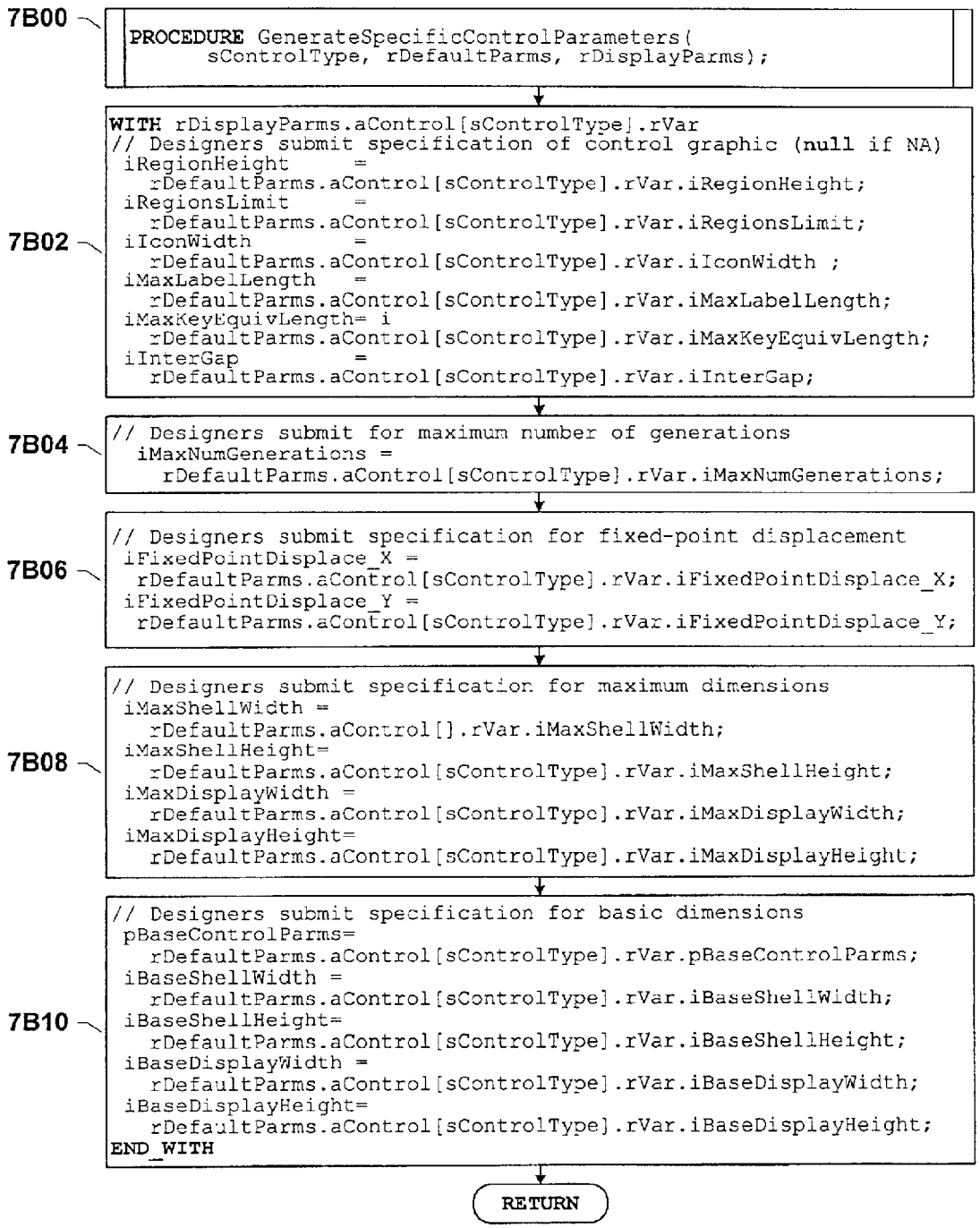
FIGURE 7B1

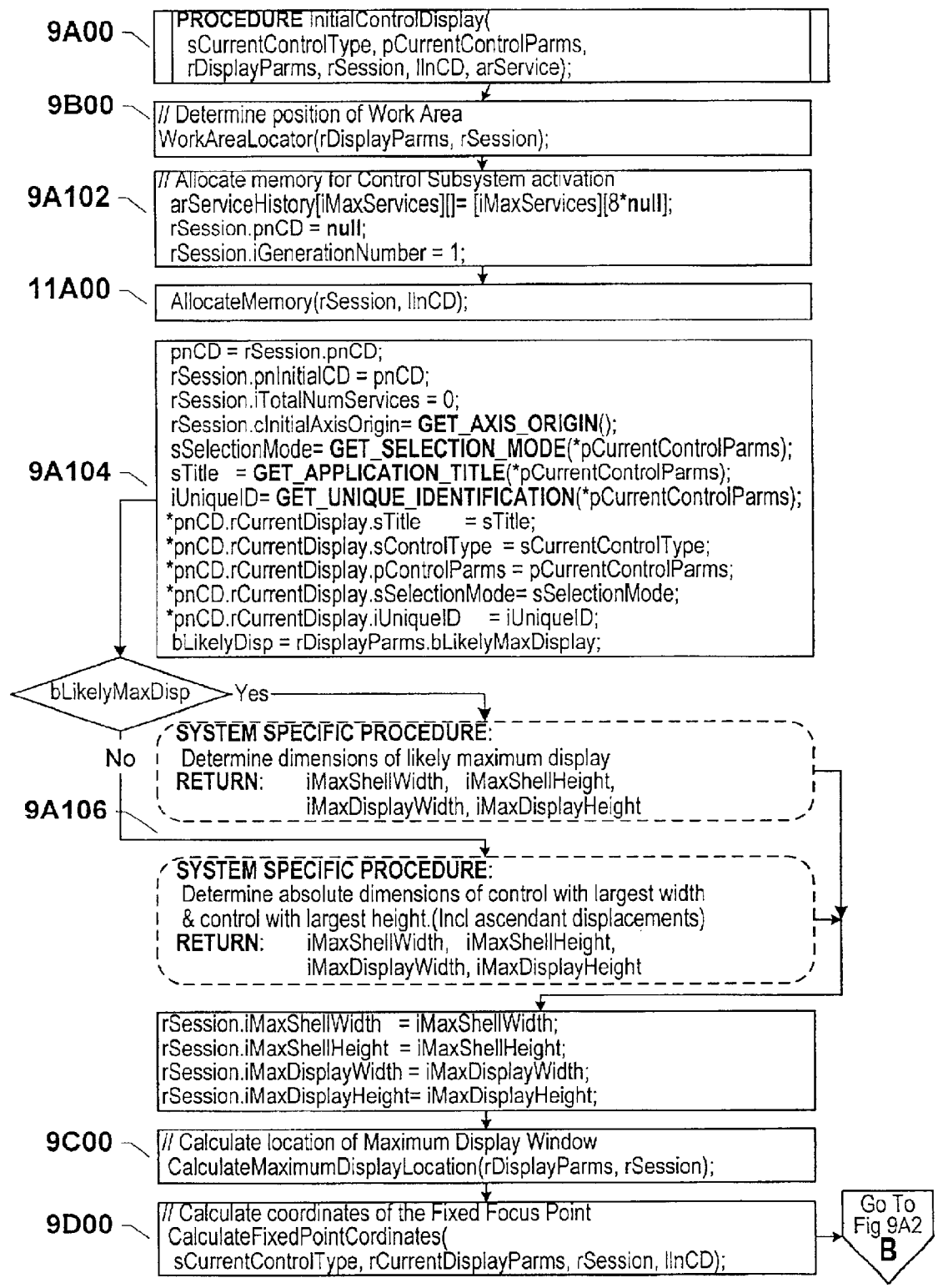
FIGURE 9A1

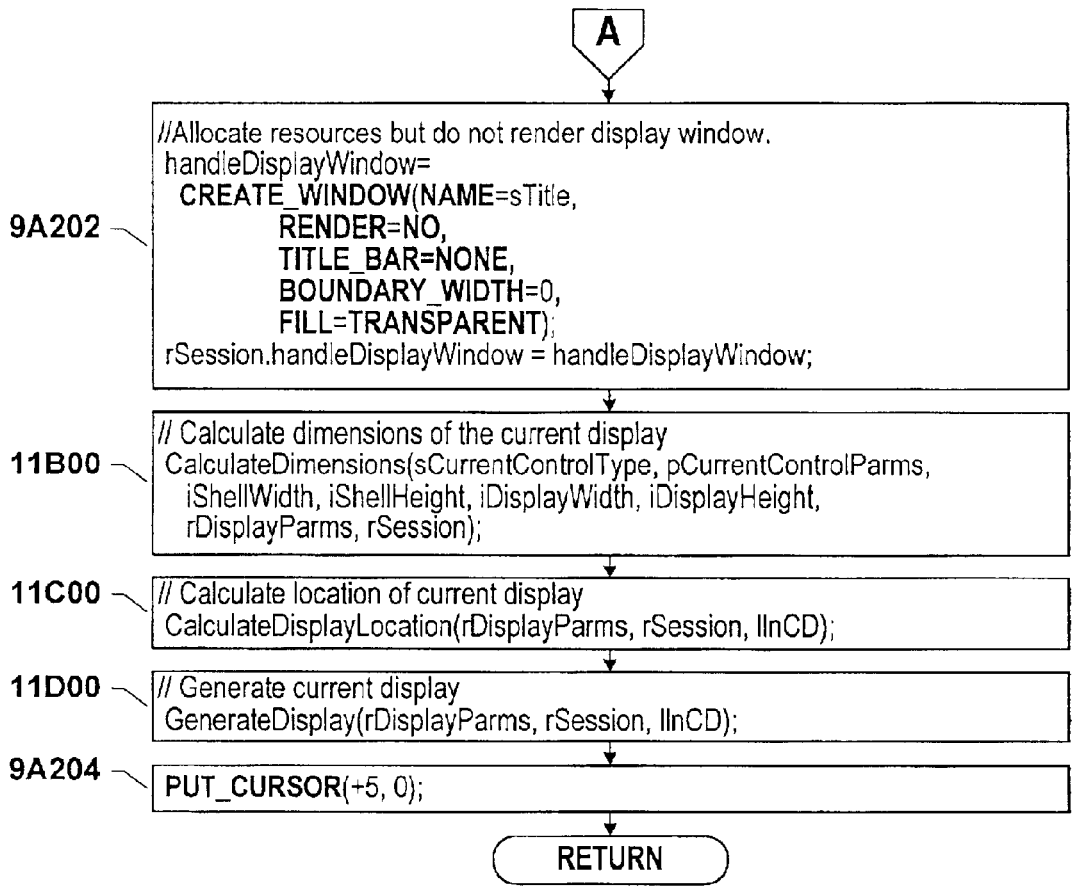
FIGURE 9A2

9C00 — PROGRAM CalculateMaximumDisplayLocation( rDisplayParms, rSession);

9C102
```
cTLDisplayZone   = GET_DISPLAY_ZONE_ORIGIN();
iDisplayZoneWidth = GET_DISPLAY_ZONE_WIDTH();
iDisplayZoneHeight= GET_DISPLAY_ZONE_HEIGHT();
cBRDisplayZone.X = cTLDisplayZone.X + iDisplayZoneWidth;
cBRDisplayZone.Y = cTLDisplayZone.Y - iDisplayZoneHeight;
```

9C104
```
//Determine paramaters to position Max Display reference corner
iMaxDisplayWidth  = rSession.cMaxDisplayWidth;
iMaxDisplayHeight = rSession.cMaxDisplayHeight;
cTLWorkArea       = rSession.cTLWorkArea;
cBRWorkArea       = rSession.cBRWorkArea;
iWorkAreaWidth    = cBRWorkArea.X - cTLWorkArea.X;
iWorkAreaHeight   = cTLWorkArea.Y - cBRWorkArea.Y;
rWAx/DZxRatio     = rDisplayParms.rCommon.rWAx/DZxRatio;
rWAy/DZyRatio     = rDisplayParms.rCommon.rWAy/DZyRatio;
IF(iWorkAreaWidth/iDisplayZoneWidth > rWAx/DZxRatio)
    rDisplayDisplace_X= 0.0;   rDisplayDisplace_Y= 1.0;
ELSEIF(iWorkAreaHeight/iDisplayZoneHeight > rWAy/DZyRatio)
    rDisplayDisplace_X= 1.0;   rDisplayDisplace_Y= 0.0;
ELSE
    rDisplayDisplace_X= rDisplayParms.rCommon.rDisplayDisplace_X;
    rDisplayDisplace_Y= rDisplayParms.rCommon.rDisplayDisplace_Y;
END_IF;
rSession.rCurrDisplayDisplace_X= rDisplayDisplace_X;
rSession.rCurrDisplayDisplace_Y= rDisplayDisplace_Y;
```

9C106
```
// Determine direction of Center Seeking:
IF((cWorkAreaCenter.X >= cDisplayZoneCenter.X) AND
   (cWorkAreaCenter.Y >= cDisplayZoneCenter.Y))
    sCenterSeeking= "DownLeft";
IF((cWorkAreaCenter.X >= cDisplayZoneCenter.X) AND
   (cWorkAreaCenter.Y <  cDisplayZoneCenter.Y))
    sCenterSeeking= "UpLeft";
IF((cWorkAreaCenter.X <  cDisplayZoneCenter.X) AND
   (cWorkAreaCenter.Y >= cDisplayZoneCenter.Y))
    sCenterSeeking= "DownRight";
IF((cWorkAreaCenter.X <  cDisplayZoneCenter.X) AND
   (cWorkAreaCenter.Y <  cDisplayZoneCenter.Y));
    sCenterSeeking= "UpRight";
```

9C108
```
// Calc optimum location of max control display reference corner
iDisplace_X= rDisplayDisplace_X*WorkAreaWidth/2;
iDisplace_Y= rDisplayDisplace_Y*WorkAreaHeight/2;
CASE(sCenterSeeking)
    "DownLeft":  cOpt.X= cWorkAreaCenter.X-iDisplace_X;
                 cOpt.Y= cWorkAreaCenter.Y-iDisplace_Y;
    "UpLeft":    cOpt.X= cWorkAreaCenter.X-iDisplace_X;
                 cOpt.Y= cWorkAreaCenter.Y+iDisplace_Y;
    "DownRight": cOpt.X= cWorkAreaCenter.X+iDisplace_X;
                 cOpt.Y= cWorkAreaCenter.Y-iDisplace_Y;
    "UpRight":   cOpt.X= cWorkAreaCenter.X+iDisplace_X;
                 cOpt.Y= cWorkAreaCenter.Y+iDisplace_Y;
END_CASE:
```

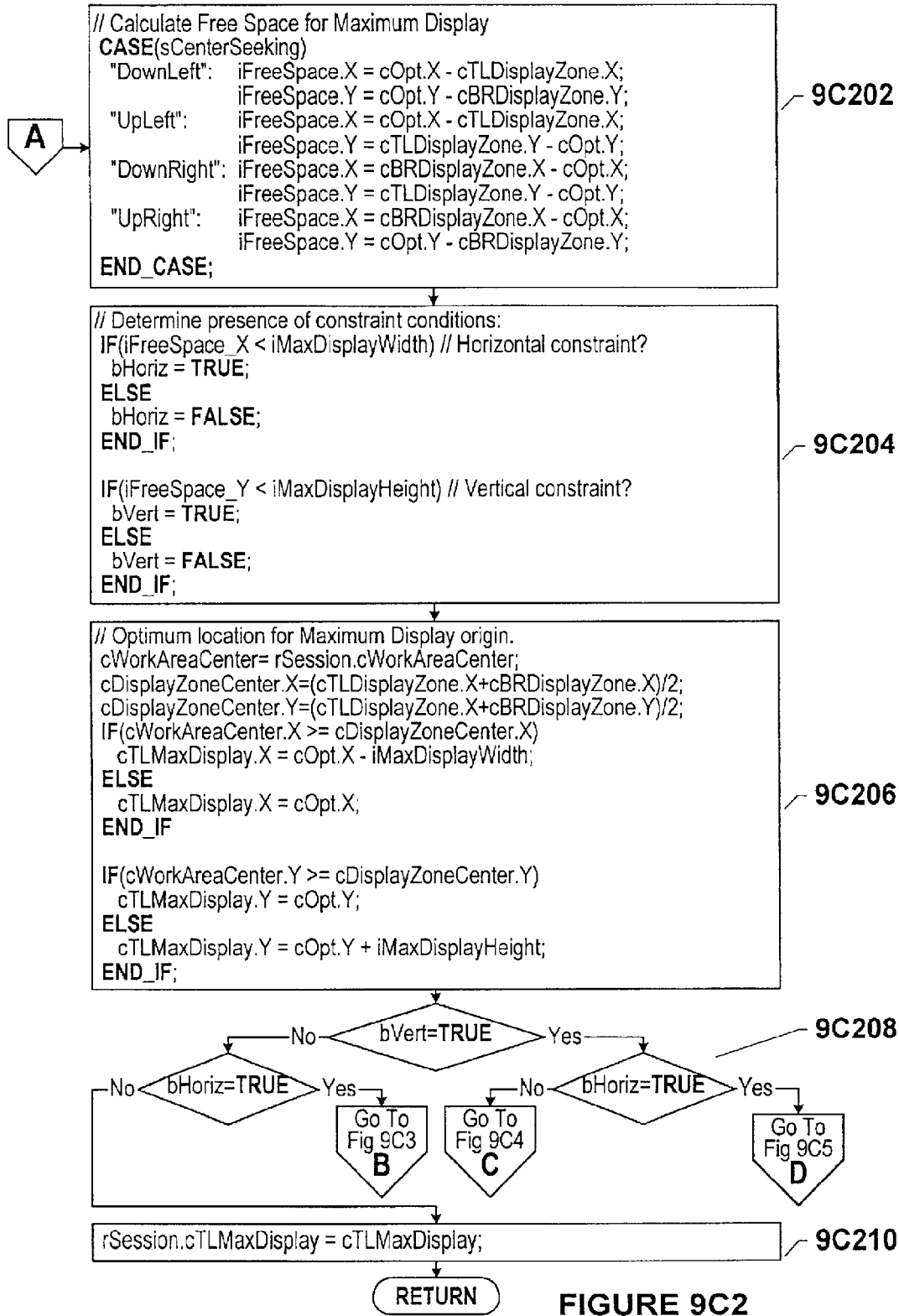
FIGURE 9C2

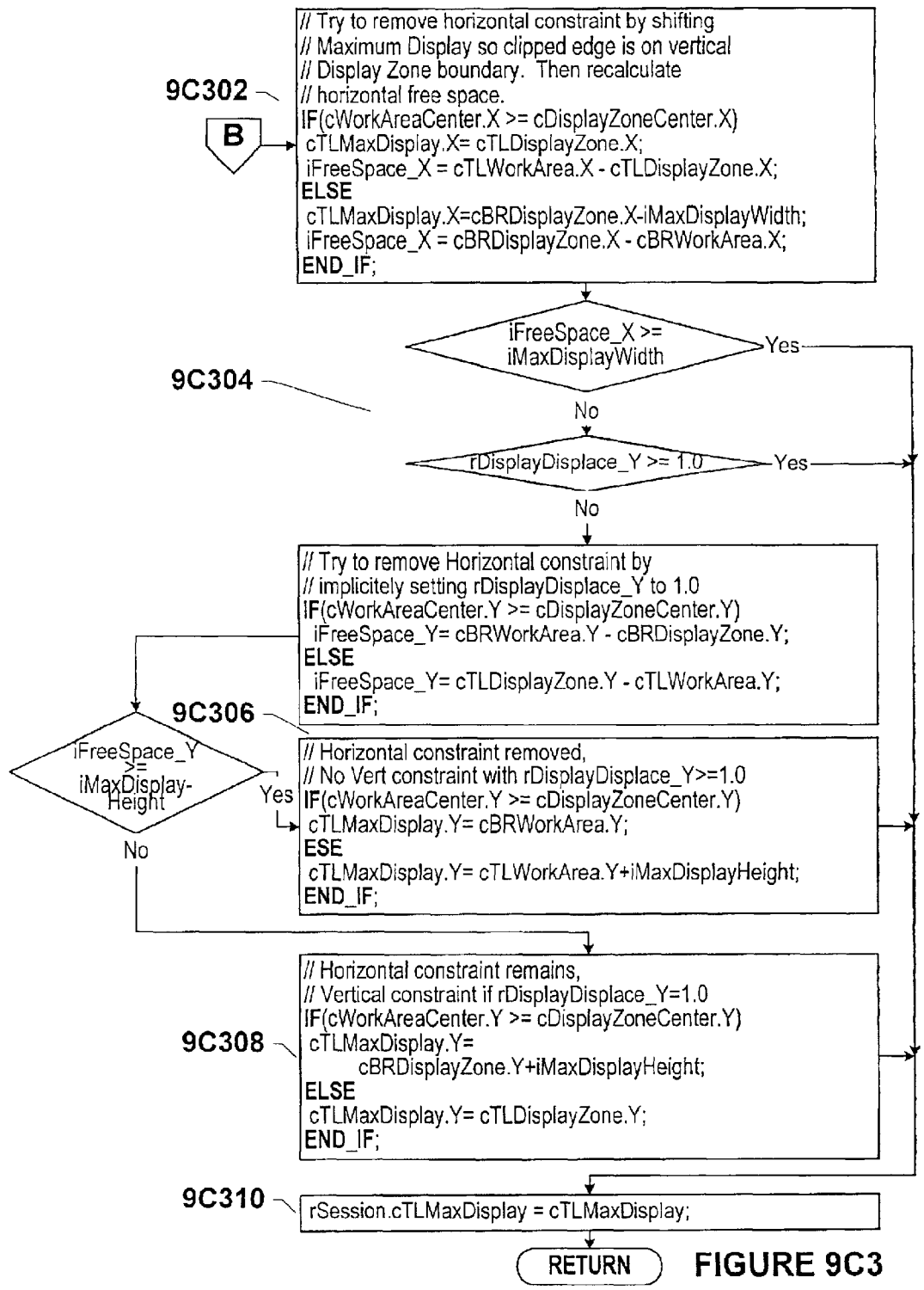
FIGURE 9C3

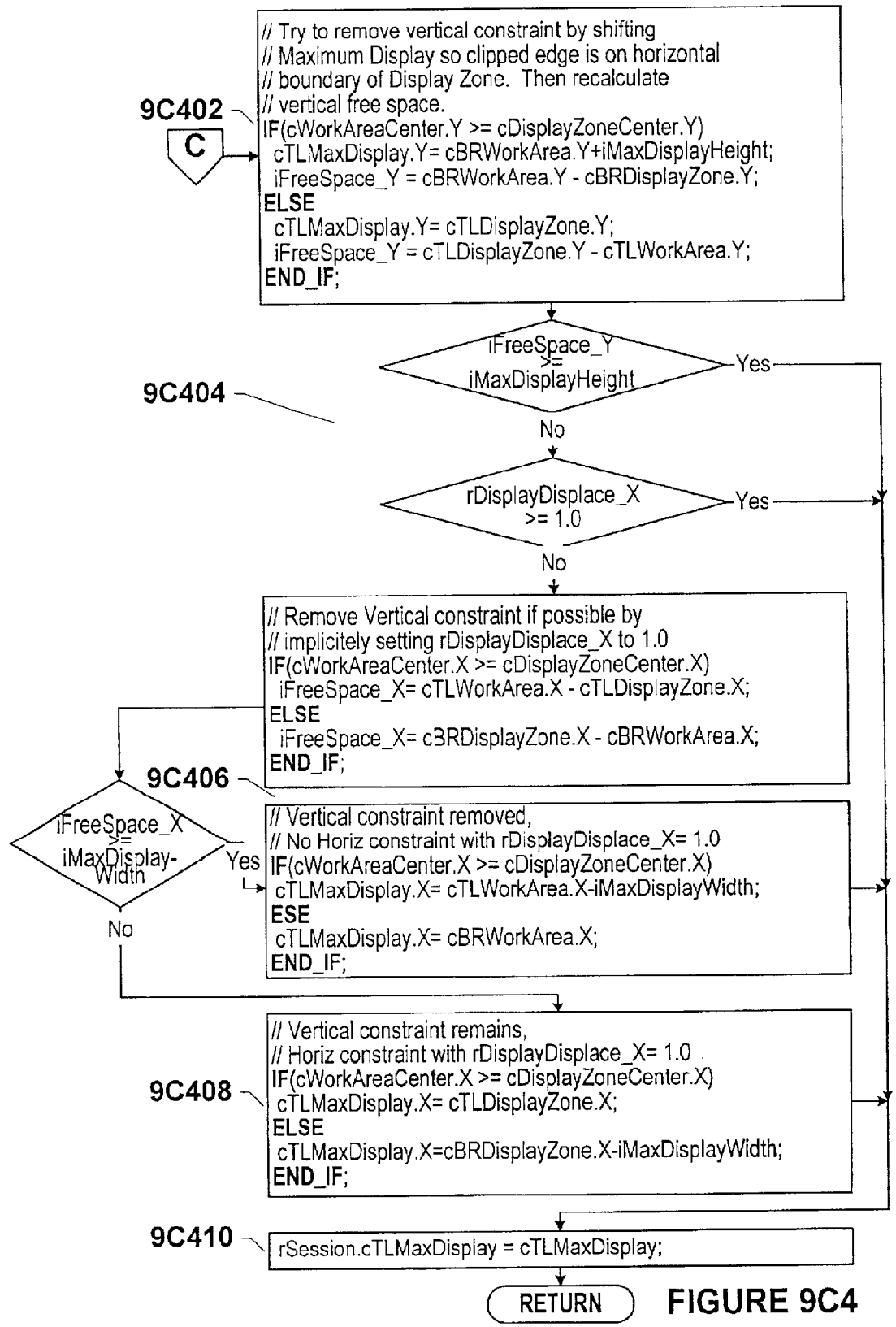
FIGURE 9C4

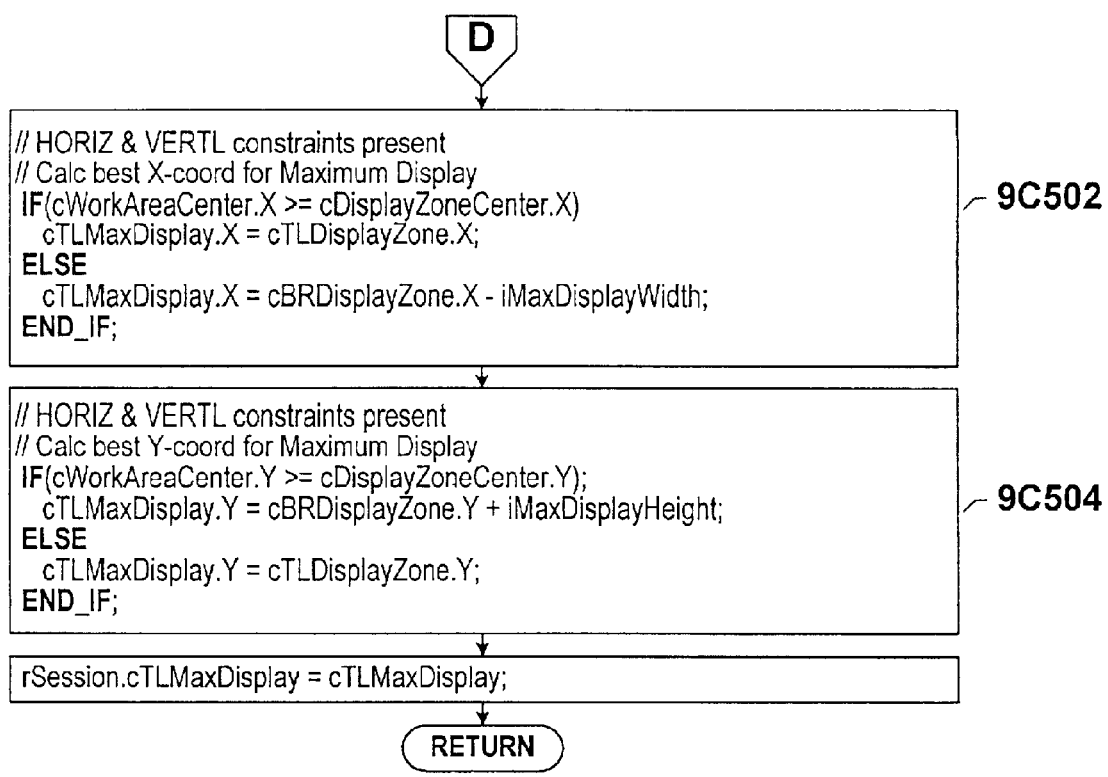
FIGURE 9C5

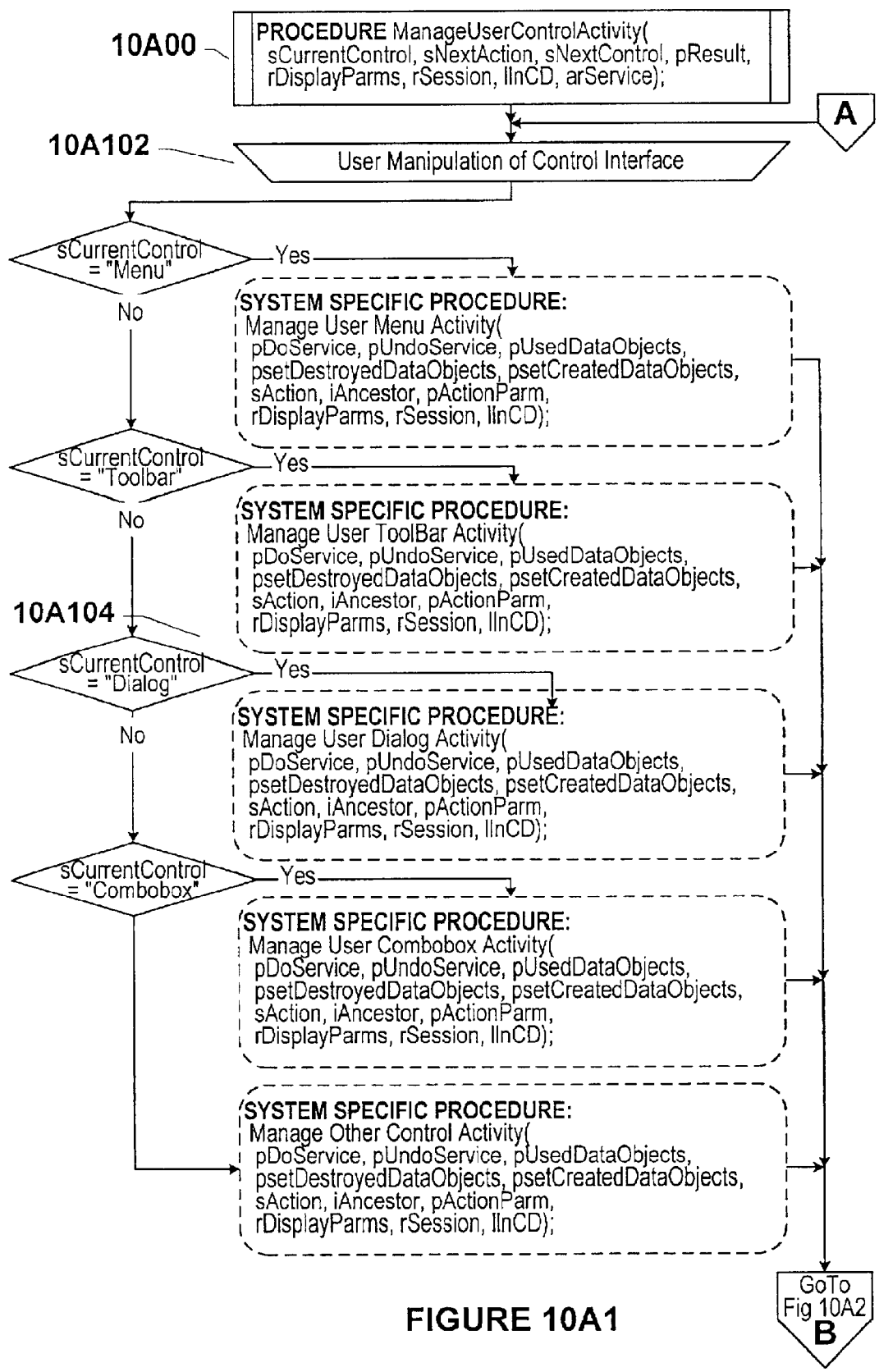
FIGURE 10A1

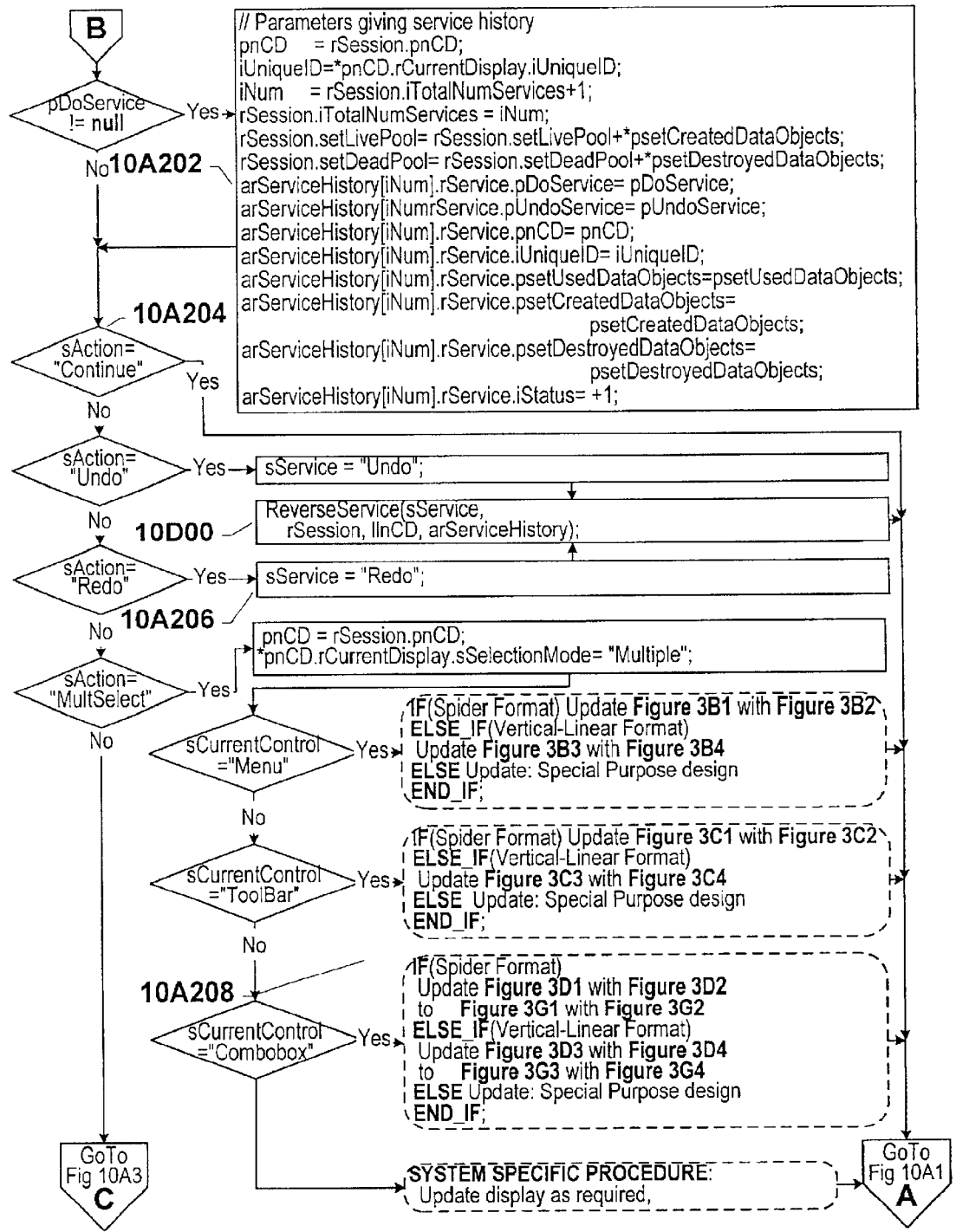
FIGURE 10A2

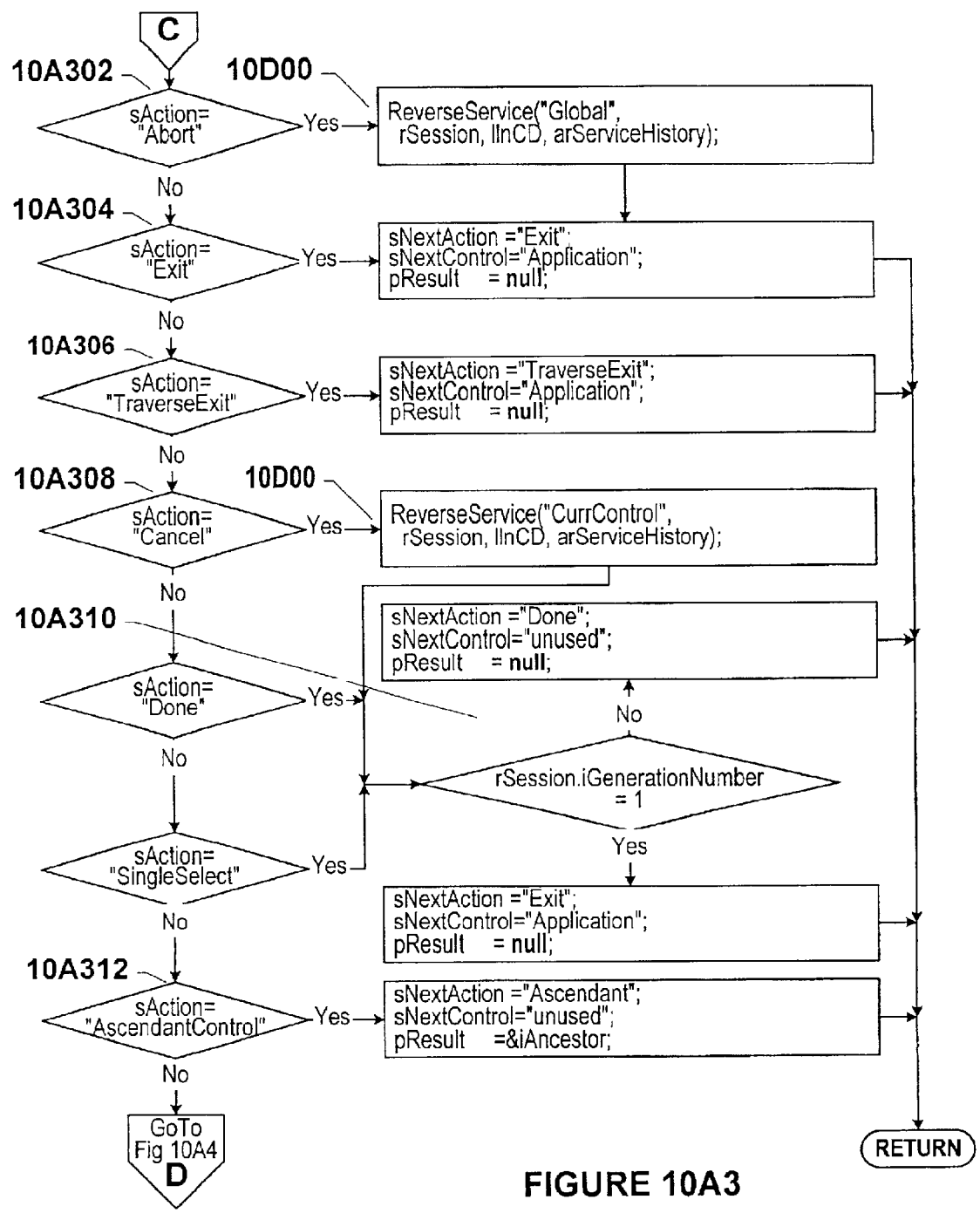
FIGURE 10A3

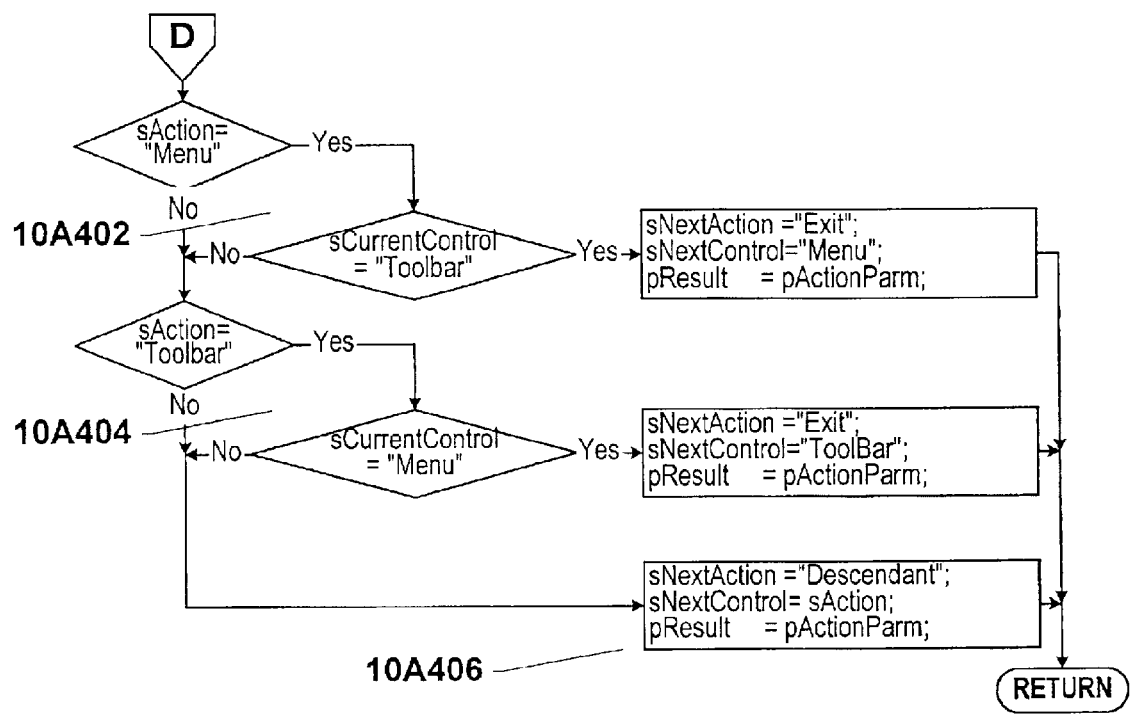
FIGURE 10A4

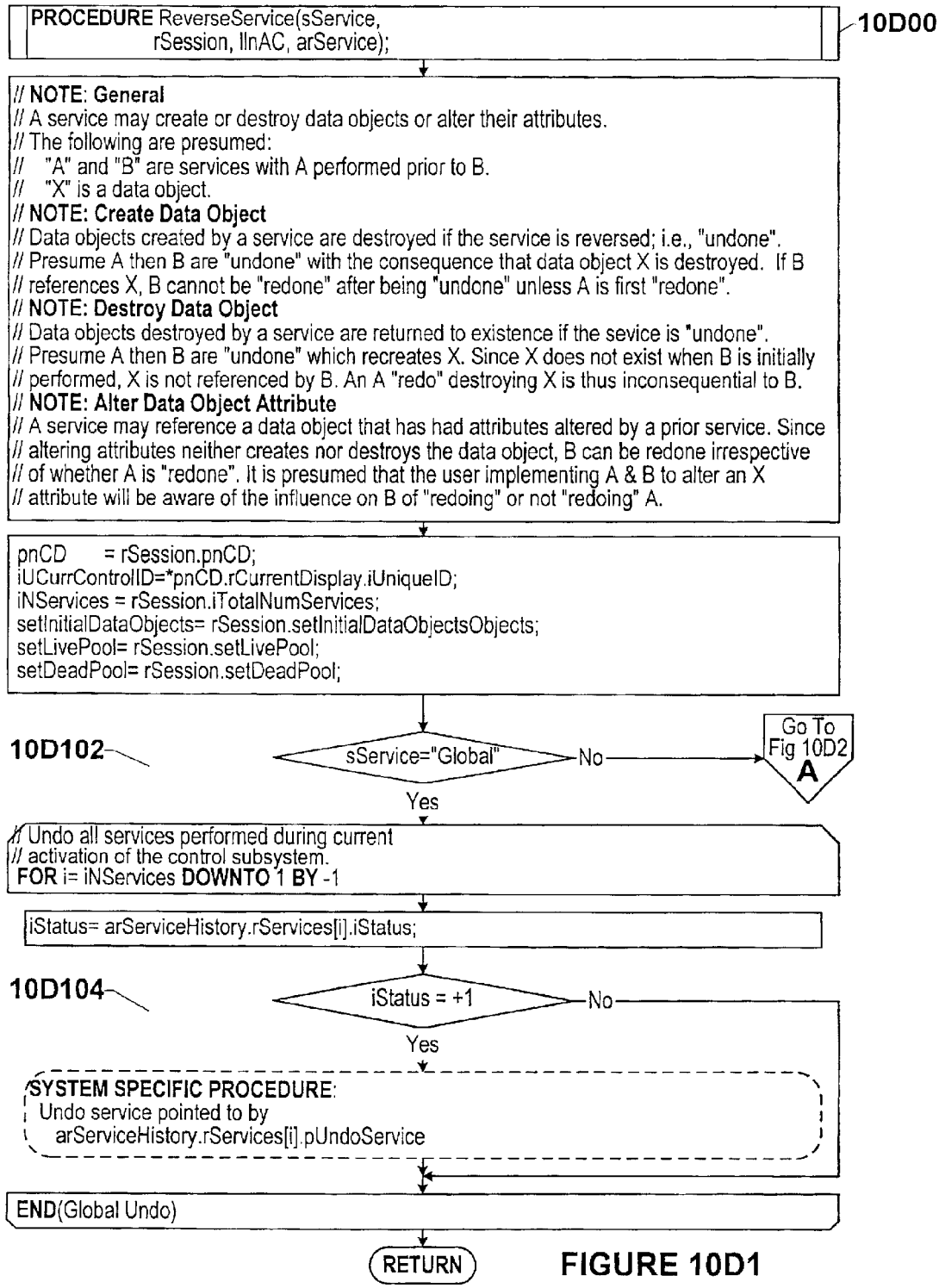
FIGURE 10D1

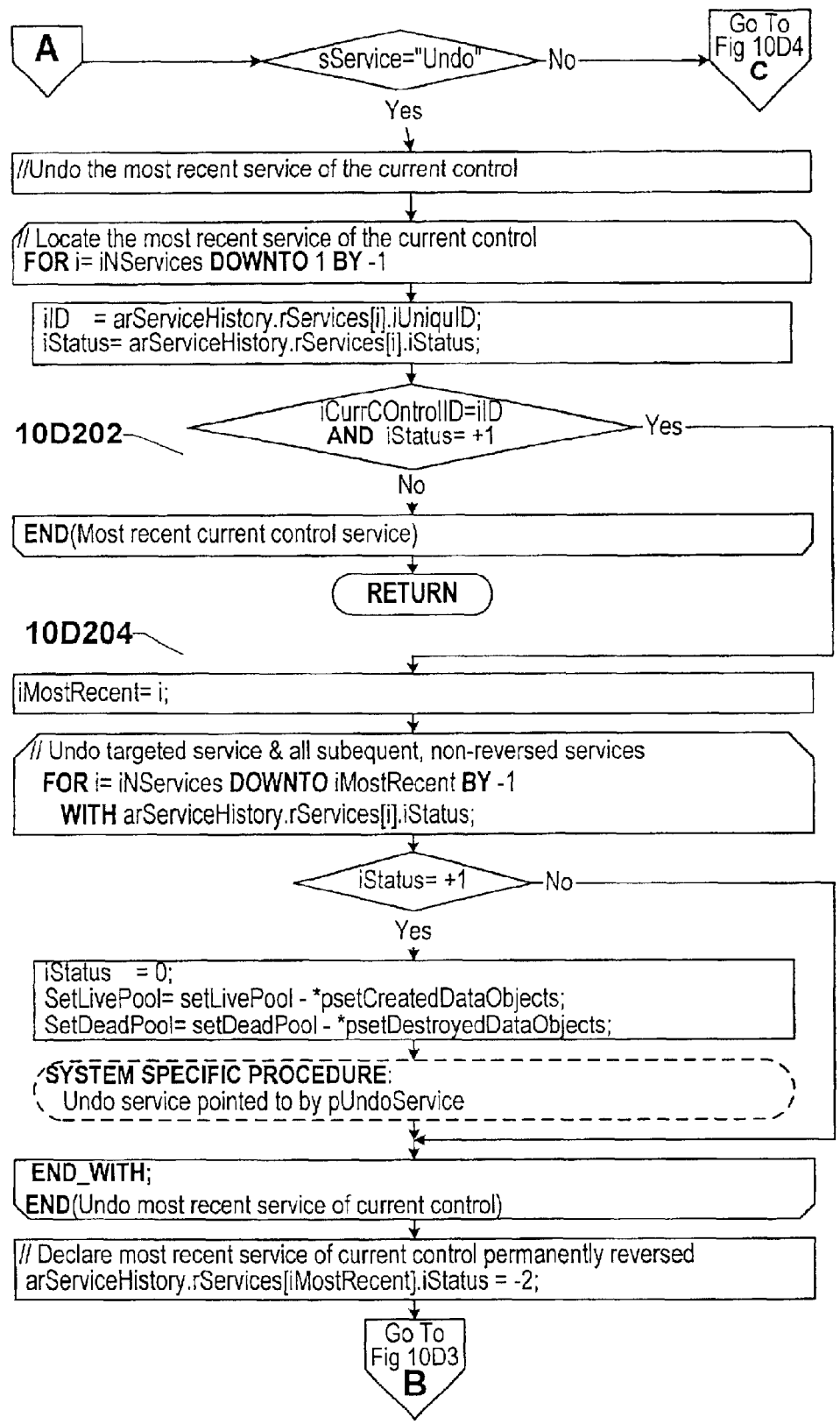
FIGURE 10D2

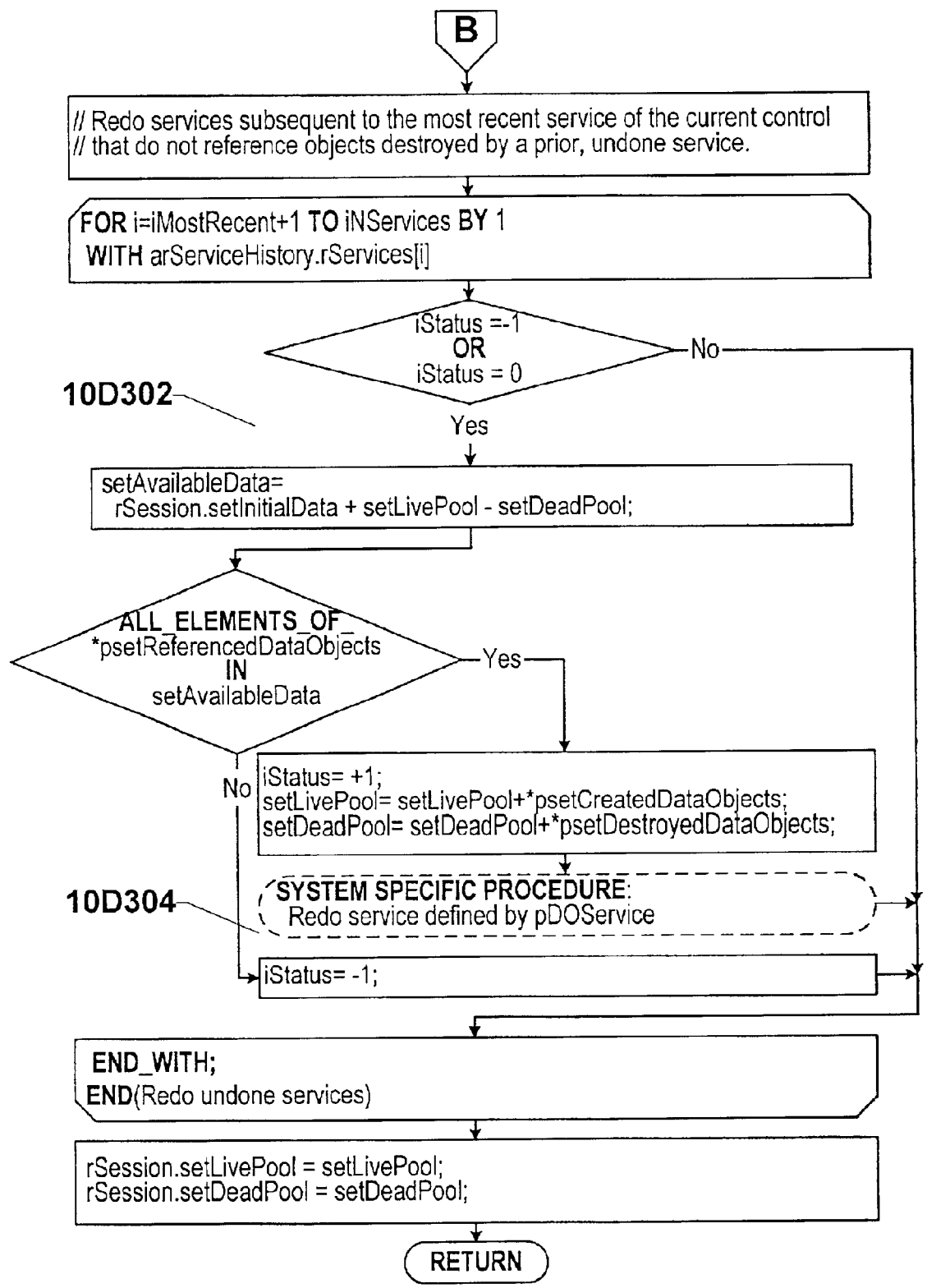
FIGURE 10D3

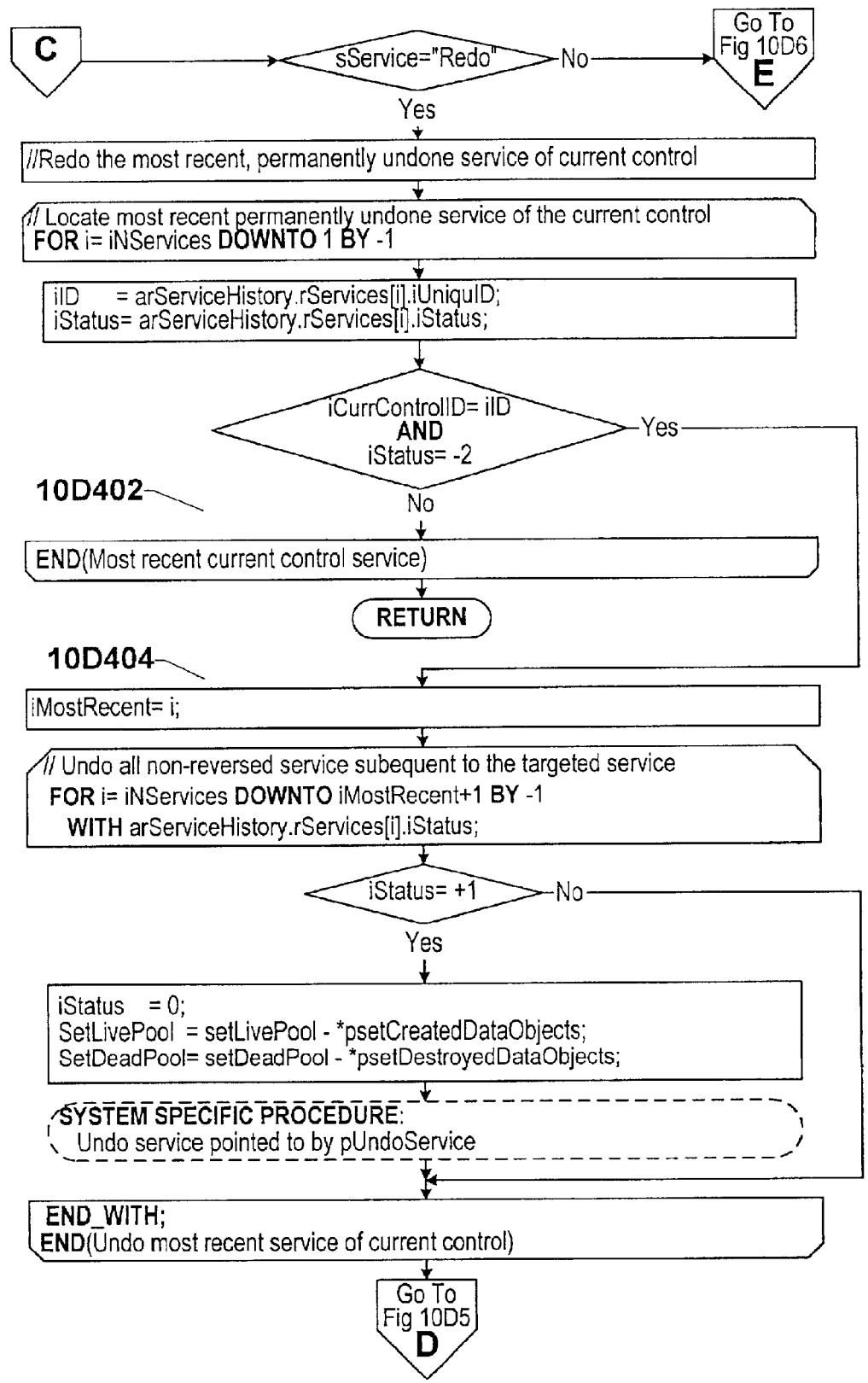
FIGURE 10D4

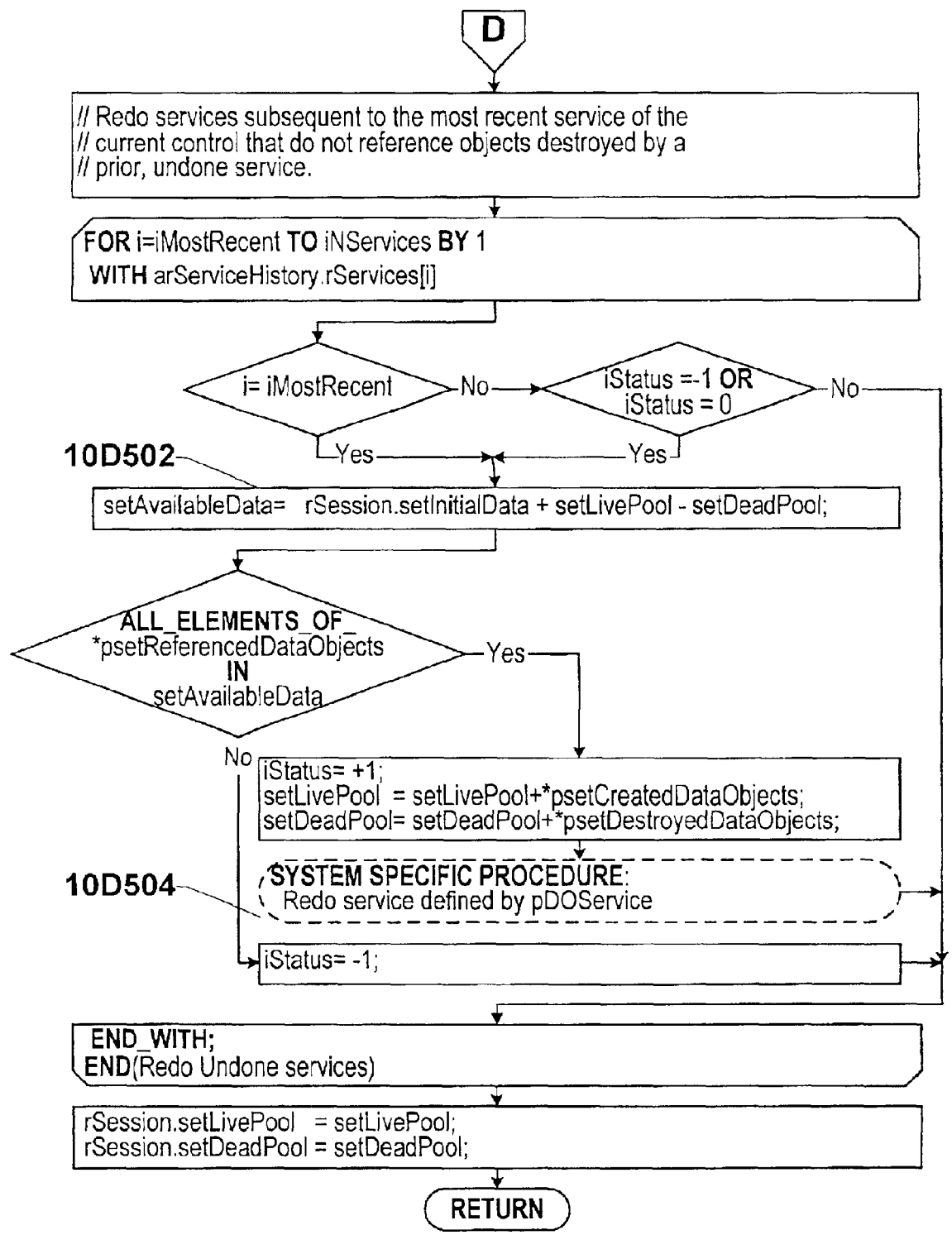
FIGURE 10D5

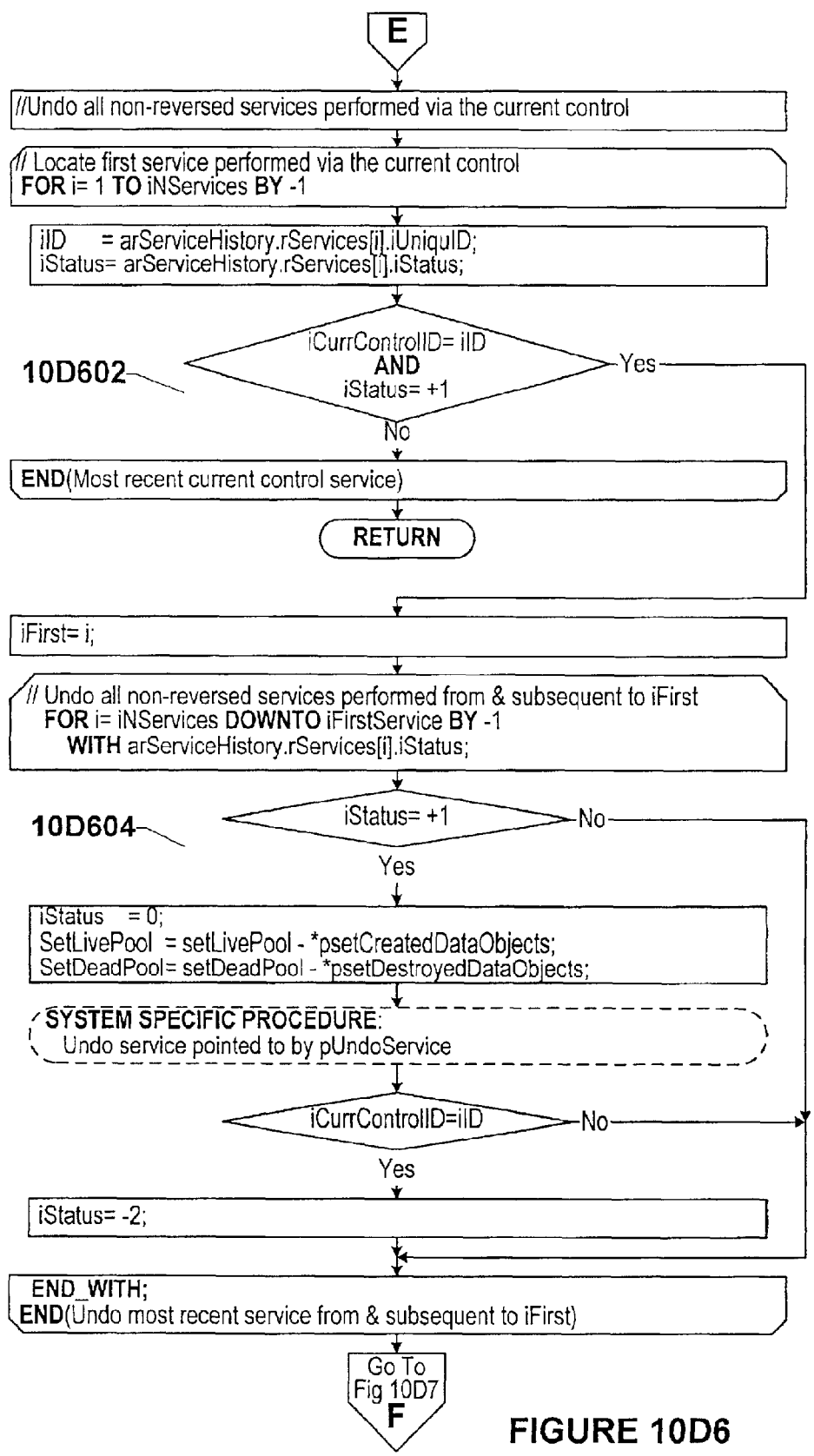
FIGURE 10D6

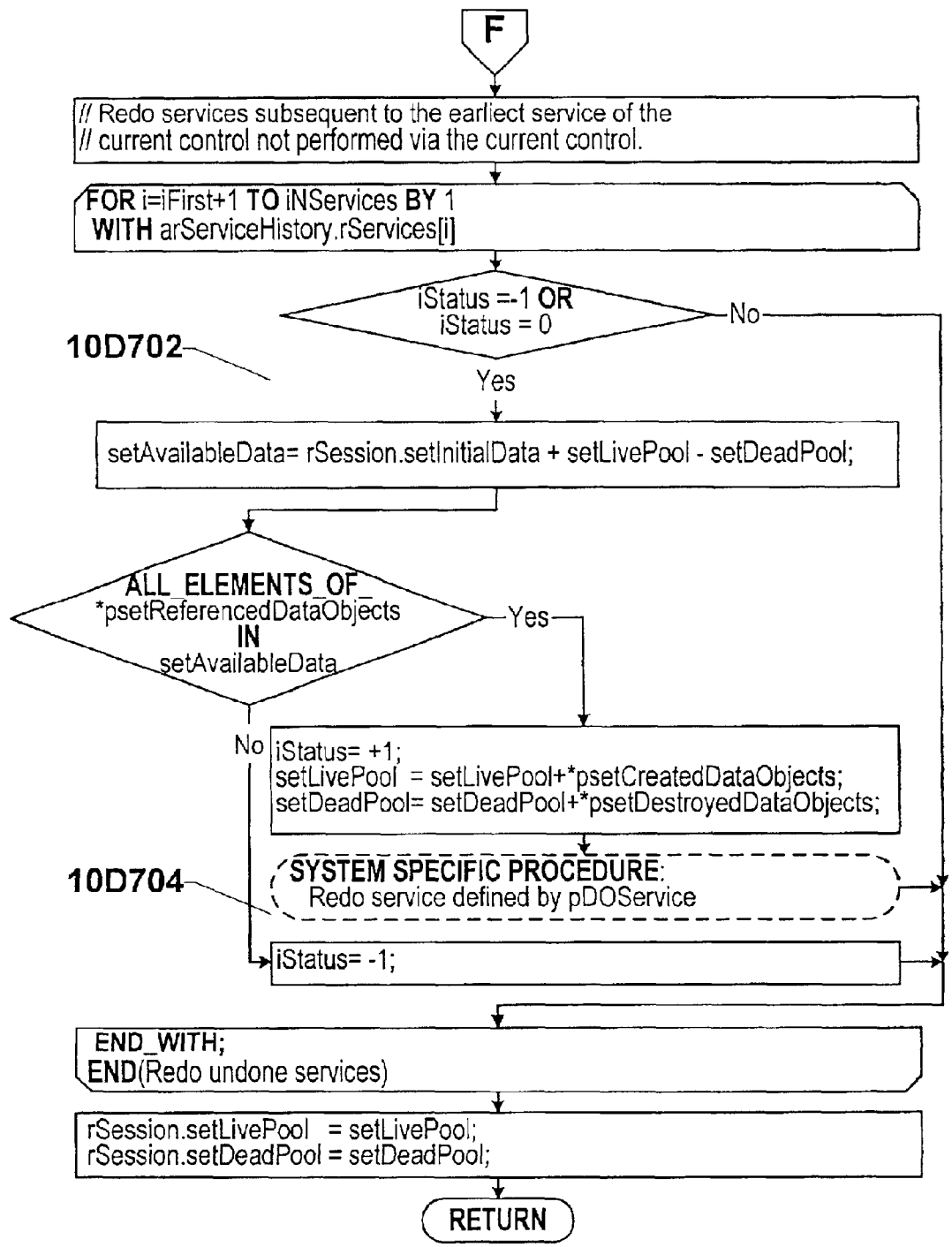
FIGURE 10D7

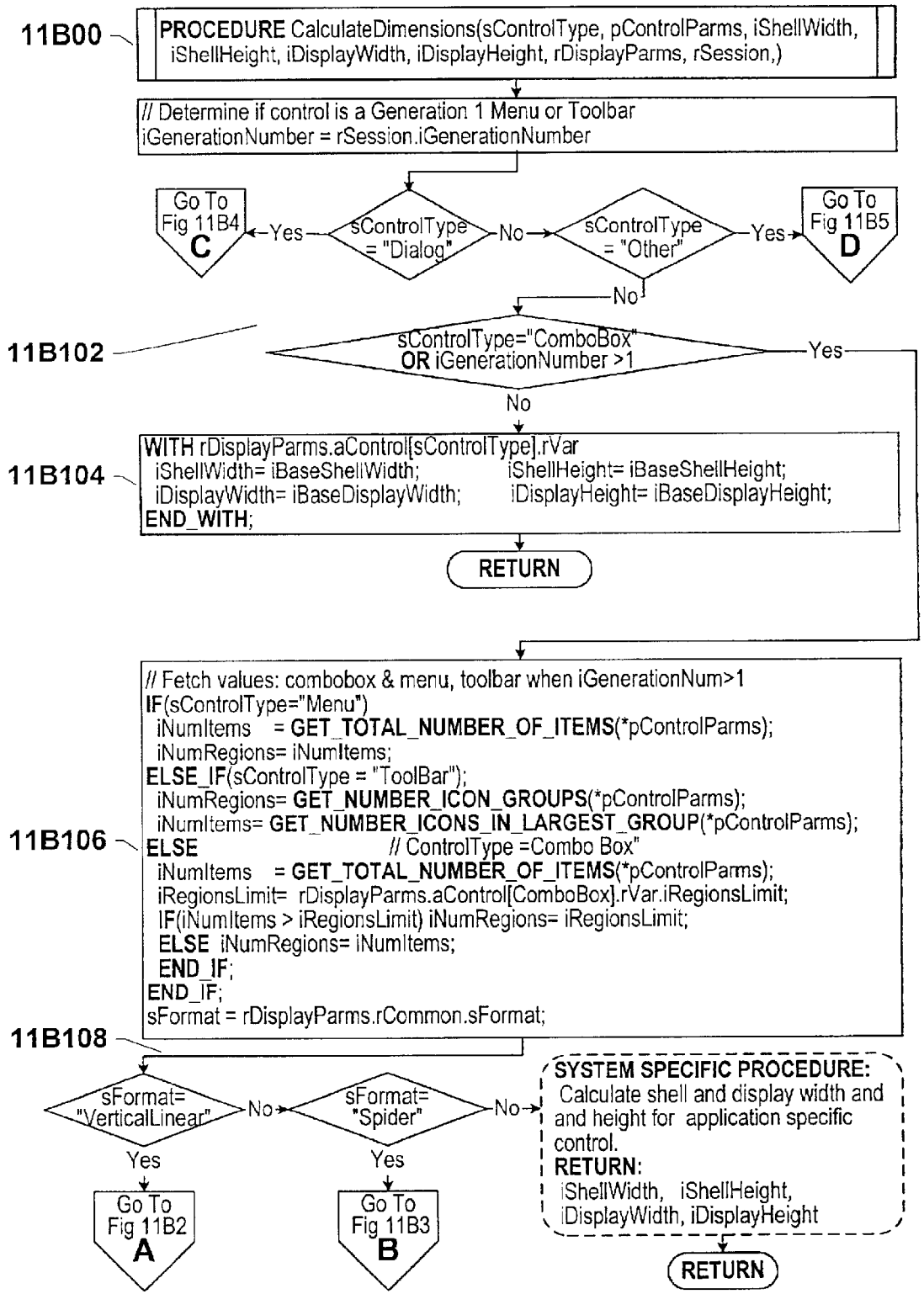
FIGURE 11B1

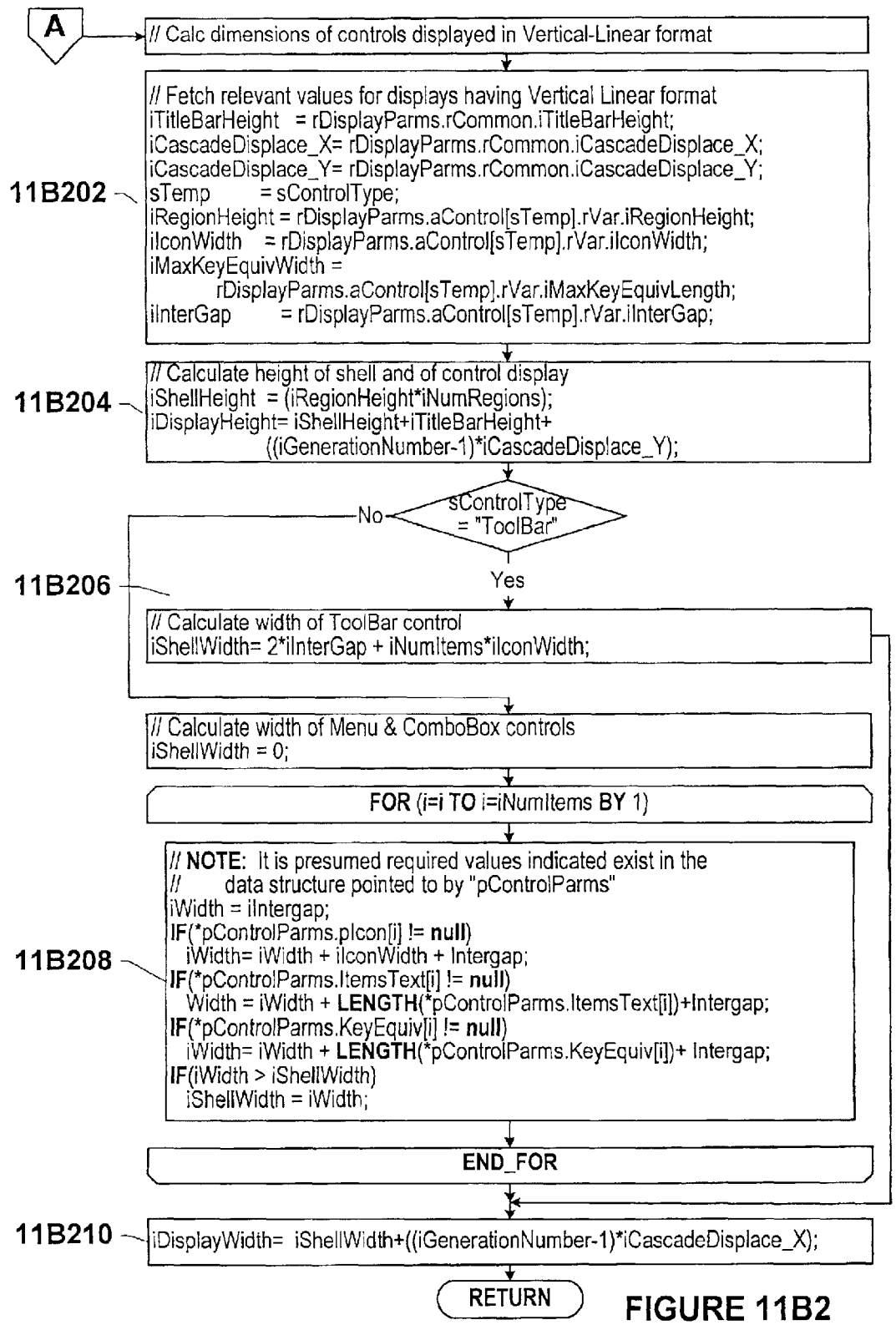
FIGURE 11B2

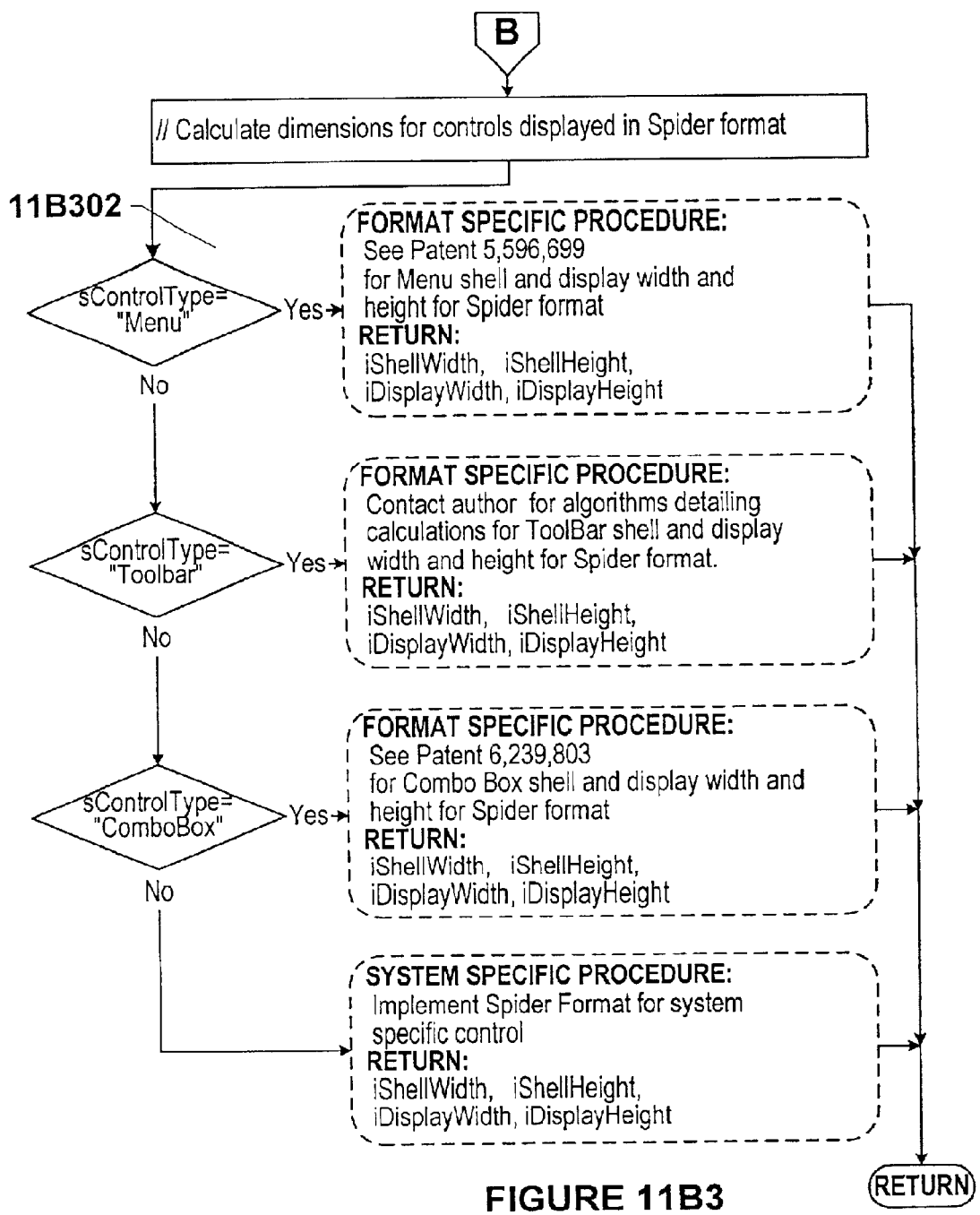
FIGURE 11B3

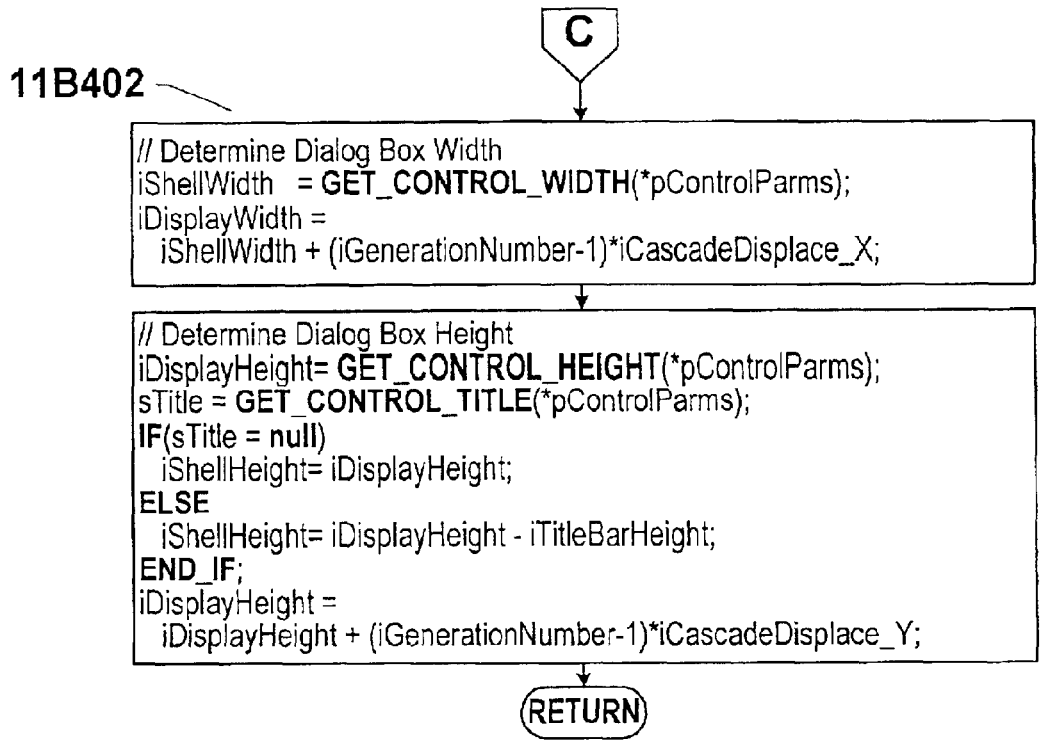
FIGURE 11B4
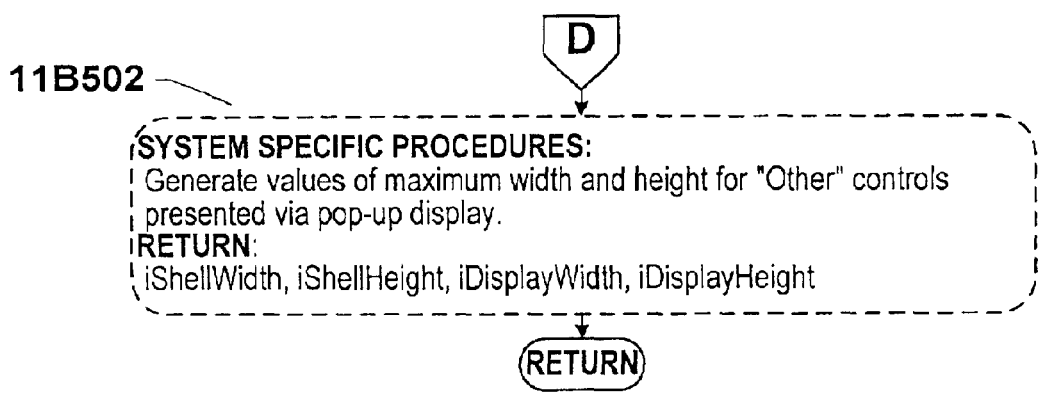
FIGURE 11B5

```
┌─────────────────────────────────────────────────────────────────────┐
│ PROCEDURE CalculateDisplayLocation( rDisplayParms, rSession, lInCD);│──11C00
└─────────────────────────────────────────────────────────────────────┘
                                  ↓
┌─────────────────────────────────────────────────────────────────────┐
│ // Extract required values from data structures                     │
│ pnCD = rSession.pnCD;                                               │
│ iGenNo = rSession.iGenerationNumber;                                │
│ sControlType =*pnCD.rCurrentDisplay.sControlType;                   │
│ iShellWidth=*pnCD.rCurrentDisplay.iShellWidth;                      │──11C02
│ iShellHeight=*pnCD.rCurrentDisplay.iShellHeight;                    │
│ iTitleBarHeight= rDisplayParms.rCommon.iTitleBarHeight;             │
│ iCascadeDisplace_X= rDisplayParms.rCommon.iCascadeDisplace_X;       │
│ iCascadeDisplace_Y= rDisplayParms.rCommon.iCascadeDisplace_Y;       │
│ rFixedPointDisplace_X= rDisplay.aControl[sControlType].rVar.cFixedPointDisplace_X;│
│ rFixedPointDisplace_Y= rDisplay.aControl[sControlType].rVar.cFixedPointDisplace_Y;│
└─────────────────────────────────────────────────────────────────────┘
                                  ↓
┌─────────────────────────────────────────────────────────────────────┐
│ // Determine cTLShell  NOTE: Axis origin translated to fixed-point coords by 9D08│
│ cTLShell.X = -(rFixedPointDisplace_X*iShellWidth);                  │
│ cTLShell.Y = +(rFixedPointDisplace_Y*iShellyHeight);                │
│ *pnCD.rCurrentDisplay.cTLShell.X = cTLShell.X;                      │
│ *pnCD.rCurrentDisplay.cTLShell.Y = cTLShell.Y;                      │──11C04
└─────────────────────────────────────────────────────────────────────┘
                                  ↓
┌─────────────────────────────────────────────────────────────────────┐
│ // Determine coords of top-left bottom-right corners of display     │
│ cTLDisplay.X = cTLShell.X;                                          │
│ cTLDisplayWindow.Y = iTitleBarHeight+cTLShell.Y+((iGenNo-1)*iCascadeDisplace_Y);│
│ cBRDisplay.X = cTLDisplay.X +(iShellWidth+((iGenNo-1)*iCascadeDisplace_X);│
│ cBRDisplay.Y = cTLDisplay.Y - (iLabelHeight+iShellHeight+((iGenNo-1)*iCascadeDisplace_Y);│
│ *pnCD.rCurrentDisplay.cTLDisplayWindow= cTLDisplay;                 │
│ *pnCD.rCurrentDisplay.cBRDisplayWindow= cBRDisplay;                 │
└─────────────────────────────────────────────────────────────────────┘
                                  ↓
┌─────────────────────────────────────────────────────────────────────┐
│ // Test if large display extends beyond display zone.               │
│ cTLDisplayZone  = GET_DISPLAY_ZONE_ORIGIN();                        │
│ iDisplayZoneWidth = GET_DISPLAY_ZONE_WIDTH();                       │
│ iDisplayZoneHeight= GET_DISPLAY_ZONE_HEIGHT();                      │
│ cBRDisplayZone.X = cTLDisplayZone.X + iDisplayZoneWidth;            │
│ cBRDisplayZone.Y = cTLDisplayZone.Y - iDisplayZoneHeight;           │
│ IF(cTLDisplayZone.X>cTLDisplay.X) iShift_X= cTLDisplayZone.X - cTLDisplay.X;│
│   ELSEIF(cBRDisplayZone.X < cBRDisplay.X) iShift_X= cBRDisplayZone.X-cBRDisplay.X;│──11C06
│   ELSE iShift_X = 0; END_IF                                         │
│ IF(cTLDisplayZone.Y > cTLDisplay.Y) iShift_Y= cTLDisplayZone.Y-cTLDisplay.Y;│
│   ELSEIF(cBRDisplayZone.Y < cBRDisplay.Y) iShift_Y= cBRDisplayZone.Y-cBRDisplay.Y;│
│   ELSE iShift_Y = 0; END_IF;                                        │
└─────────────────────────────────────────────────────────────────────┘
                                  ↓
┌─────────────────────────────────────────────────────────────────────┐
│ // Adjust fixed point as required to avoid clipping display         │
│ IF(iShift_X != 0 OR iShift_Y != 0)                                  │
│  WITH *pnCD.rCurrentDisplay                                         │
│   TRANSLATE_AXIS(                                                   │
│     FROM=cFixedPoint TO=rSessionParms.iInitialAxisOrigin);          │
│   cFixedPoint.X = cFixedPoint.X + iShift_X;                         │──11C08
│   cFixedPoint.Y = cFixedPoint.Y + iShift_Y;                         │
│   TRANSLATE_AXIS(                                                   │
│     FROM=rSessionParms.iInitialAxisOrigin TO=cFixedPoint);          │
│  END_WITH; END_IF;                                                  │
└─────────────────────────────────────────────────────────────────────┘
                                  ↓
                            ( RETURN )        FIGURE 11C
```

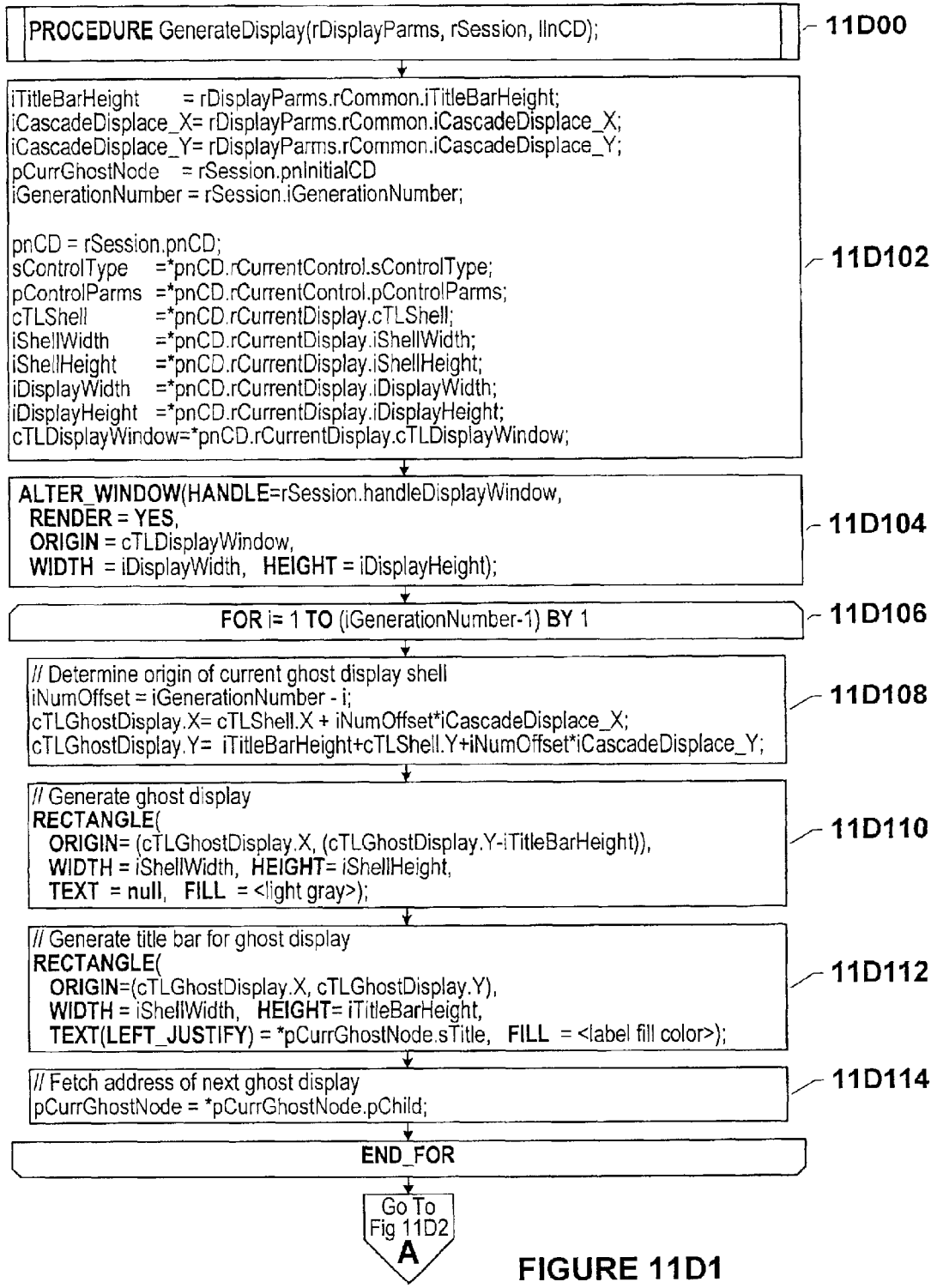
FIGURE 11D1

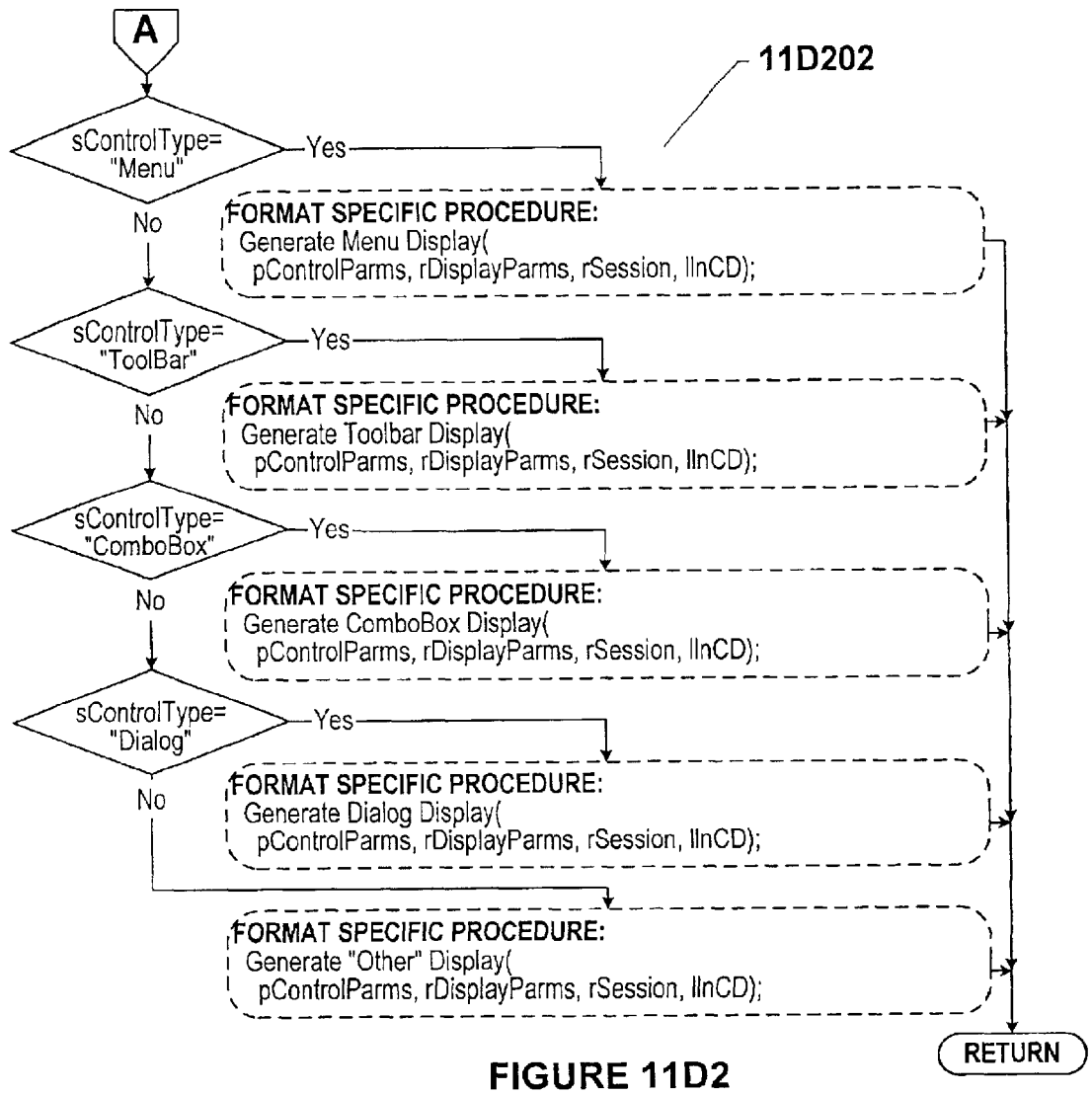
FIGURE 11D2

METHOD TO DISPLAY AND MANAGE COMPUTER POP-UP CONTROLS

BACKGROUND OF THE INVENTION

1. Field of the Invention

The present invention relates generally to the fields of operating systems, application software, and the positioning, formatting, and management of arbitrary pop-up controls to provide a more user-friendly computer human interface.

2. Description of the Prior Art

This invention deals with human-computer interface controls that are hereafter referred simply as controls. Controls are defined (Richard Simon, Windows 95, Win32 Programming API Bible, Book 1, 1996, p. 23) as graphic objects of the interface that enable the user to receive information from and provide input to the application. Each type of control is expressed by a graphic displayed on the CRT that provides the user with one or more function activations or attribute specifications. Since this invention is neither concerned with information received from or sent to the application nor with the functions requested or attributes specified as result of such information, the generic term "Service" will be employed to refer to whatever purpose a control serves.

Gittins (David Gittins, "Icon-based human-computer interaction", International Journal of Man-Machine Studies, 1986, pp. 519–543) states that computer interface designers have a " . . . tendency towards fixation on one particular design model " . . . which can result in . . . technical constraints and design prejudices . . . that [can] be carried over to other applications . . . ". Gittins further comments that this tendency may explain why many icon designs "bear striking . . . resemblance to . . . that of the Xerox 'Star'" (pp. 521–522). Shneiderman (Ben Shneiderman, Designing the User Interface: Strategies For Effective Human-Computer Interaction, 3rd ed, 1998) communicates that this tendency still prevails twelve years after Gittins since he can observe that " . . . pull-down menus are constantly available to . . . the Xerox Star, Apple Lisa and Apple Macintosh . . . and versions have become standardized with Windows, IBM OS/2, OSF/Motif." (p. 242). While this trend is not universal, as shown by the NeXT workstation of the late 1980's, the prevailing menu design currently remains some variant of the pull-down style. It may be asked whether the current, nearly universal style of a permanent display at the top of the computer screen is the result of Gittins' observed design inertia or whether this design possesses uniquely desirable human factor merit. Main arguments in defense of the prevailing pull-down design are that novice users find the permanent display of choice-selections easy to learn and that all users benefit from rapid access once the fixed locations of choice-selections have become familiar. The prior art concedes that such permanent displays require substantial screen real estate but contends that the fixed, relative locations of choice-selections in the pop-up sub-menus present user-friendly capabilities to the user.

An appraisal of the prior art of control display identifies several weaknesses present in the prior art that lead to sub-optimum display and management of controls. One such weakness is inadequate provision for the user to easily consult a generally small screen area of specific interest while making selections from a control. Research by Scott (D. Scott and J. M. Findlay, "Optimum display arrangements for processing status information", International Journal of Man-Machine Studies, 1991, pp. 399–407) investigates the benefits of displaying near the "point of regard" information needed to perform current activity. Shneiderman expands on desirable characteristics of pop-up control placement by contending that the pop-up controls should appear " . . . close to the current focus . . . to limit eye motion, but far enough away to avoid obscuring the current focus." (Shneiderman, op. cit., p. 453). The convention with pull-down designs is that the first submenu displayed is popped-up as a vertically aligned list of choice-selections (hereafter the Vertical-Linear format) immediately below the main menu selection. Each additional submenu is generally displayed abutting its parent submenu on the right. Study of placement strategies employed for display of other control types reveal that dialog boxes are typically displayed near the screen center irrespective of the location of the area of user interest. Closed combo boxes, which generally appear either in the toolbar or in a dialog box, drop-down their lists at the location of the parent graphic irrespective of the desirability of that location. In general, it must be concluded that the positioning strategy employed by current GUI designers give inadequate attention to user benefits that follow from juxtaposing the control and the area of user interest.

There does exist a class of pop-up controls unrelated to the pull-down menu that are not constrained by the traditions of the pull-down design. The Microsoft Windows context specific menu that displays when the user right-clicks on an identifiable screen object exemplifies this menu type. Conceptually this pop-up menu can be positioned anywhere within the "Display-zone"; i.e., the screen area into which a control is rendered. When space permits, Microsoft has chosen to position it with its top-left corner coincident with the cursor hot-spot. Since the screen object clicked is likely to be the area of current interest this display position often results in overlay of a portion of this area.

This invention differentiates between the concepts of the "Area of Current Focus" and the "Work-Area". The area of current focus is the area of the screen that is the actual area of immediate concern to the user. The work-area is defined as a screen area identified by the Control Subsystem to be the user's area of current focus. Ideally the work-area and area of current focus coincide but exigencies of a user task do not always make this possible, as is elaborated later.

In addition to determining the desirability of displaying a control near to but not overlaying the area of current focus, human factor experts have found that users expect consistency in the performance of the GUI. Machiraju (Vijay Machiraju, "A survey on research in graphical user interfaces", http://citeseer.nj.nec.com/cachedpage/180180/ 4, 1996, pp. 1–25) reviews several authorities to conclude that a consistent GUI: (1) permits users to anticipate system behavior, (2) fulfills user expectations, (3) aids in the development of automaticity, (4) has extensive commonality between diverse applications, and (5) is natural to the user's way of thinking. Hix (Deborah Hix and R. Rex Hartison, Developing User Interfaces: Ensuring Usability Through Produce & Process, 1993) promotes the "principle of least astonishment" by contending that " . . . consistency is one of the most significant factors affecting usability . . . [since] . . . users expect certain aspects of the interface to behave in certain ways, and when this does not happen, it can be very confusing." (pp. 34–35). When vendors do design a control to pop-up near the work-area consistency is normally sought by locating the control via some relation based wholly on the work-area location. Alternate positioning processes are implemented when the standard positioning algorithm positions control at a location causing the display-zone to clip the control display. One approach that avoids clipping is to shift the display to make the clipped edge coincide with the display-zone edge causing the clip. Sun (Sun Microsystems and AT&T, Open Look: Graphical User Interface Functional Specifications, 1989, pp. 336–338) employs this approach but, as shown below, not in a manner that assures minimization of work-area overlay. An alternate algorithm might position a control to the left rather than the right of the work-area; an approach that violates the principle of least astonishment.

These inadequacies of the prior art may represent further manifestations of Gittins observation that designers fixate on a particular model. While the pull-down main menu and pop-up context specific menus were developed prior to recent human factor studies, these styles still prevail in the face of research indicating the pull-down design contains features that can be improved. New art is needed that continues to avoid clipping, but also: (1) minimizes overlay of the area of current user interest, (2) juxtaposes the control and the area of current user interest, and (3) supports the principle of least amazement.

Another issue of concern with the prior art is the presumption implicit in the pull-down menu design that the usability of controls displayed in tiled format; i.e., multiple windows displayed in a manner such that no window overlaps another, is superior to alternate formats. This problem is exemplified by considering the usability of how a well known application software displays a "Control Path"; i.e., the ordered sequence of descendant controls leading from the initial control displayed to the current control. A left-click on the "Tools" choice-selection of the main menu displays the "Tools" submenu in Vertical-Linear format. Selection of the "Macros" choice-selection from the "Tools" submenu displays the "Macros" submenu positioned to the right of the "Tools" submenu with its top boarder aligned with the "Macros" region. A selection from the "Micros" submenu displays a third submenu positioned to the right of the "Macros" display with its top boarder aligned with the chosen selection. To navigate the three submenus of this control path, the user must perform several eye saccades to traverse a screen area that consumes approximately 20 percent of the total display-zone and extends diagonally over approximately one-half its vertical and horizontal dimensions. Finally, a selection from the final submenu removes the three levels of tiled submenus and displays a dialog box approximately at the CRT center.

To consider the usability aspects of this example it is appropriate to reference research comparing different styles of window displays. Davies (S. E. Davies, K. F. Bury, and M. J. Darnell, "An experimental comparison of a windowed vs. a non-windowed environment", Proceedings of the Human Factors Society 29th Annual Meeting, 1986, pp. 250–254) found that while users of a multiple window system make fewer errors than users performing the same task on a single window system, users of the single window system performed the assigned task more rapidly. This arose because of the time spent by users to position the windows of a multiple window system. Of relevance to this invention is that Davie also found that when window-positioning time is removed from total time, a multi-window environment is the faster to utilize. An investigation of overlapped versus tiled windows undertaken by Bly (S. A. Bly and J. K. Rosenberg, "A comparison of tiled and overlapped windows", CHI '86 Proceedings, 1986, pp. 101–106) compared a regular task to an irregular task. A regular task is defined as a task in which all necessary information is simultaneously available via a set of tiled windows while an irregular task requires windows be overlapped if all necessary information is to be available on the screen. Bly found that users performed regular tasks more rapidly with tiled windows but additionally found that when faced with irregular tasks requiring substantial window management users performed more rapidly with overlapped windows. Gaylin (Kenneth Gaylin, "How are windows used? Some notes on creating an empirically-based windowing benchmark task", CHI '86 Proceedings, 1986, pp. 96–100) measured the time spent at each task during start-up of a multiple window system and found that 65 per cent of start-up activity is spent performing the open, create, move, and resize management activities preparatory to undertaking production tasks. Once production commenced users spend 33 percent and 60 percent respectively of their time performing window management and navigation tasks. Since start-up time is generally small relative to production time, Gaylin recommends that system designers should emphasize making navigation as simple and as rapid as possible.

While these three investigations do not directly compare pull-down to overlapped control displays, aspects of each study have applicability to this comparison. It may appear that the prior art meets Davies' stricture of minimal windows management time and that tiled windows of the prior art should be more productive than overlapped displays since many commonly used controls generally conform to Bly's definition of a regular task. Additionally, based on menu research (see: Kent L. Norman, "Search behavior in hierarchical menu structures", The Psychology of Menu Selection: Designing Cognitive Control at the Human/Computer Interface, 1991, pp. 214–236) the prior art appears to meet Gaylin's recommendation that navigation time between controls be minimized. However, these studies generally investigate environments where the user must be able to reach any of multiple, independent windows from any other window in arbitrary order. This is in contrast to an environment containing multiple windows in which a given window can only be reached by traversing a fixed sequence of windows while not always having the ability to return to any arbitrarily ancestor window in the control path. Control management additionally imposes the constraint that a desired window not in the control path can only be reached by returning to an ancestor common to both the current and the desired window. Moreover, it is to be recalled that when the user need not perform the sizing and positioning of controls, Davies' finds the multi-window environment to be desirable. The fact that Davies' also found that multiple windows reduces the error rate enhances this result. Given Bly's finding that overlapped windows that display fixed, regular content can be utilize as productively as tiled windows, it can be concluded that since many control tasks generally conform to the definition of a regular task, controls displayed in overlapped format are not disadvantaged. In addition to fully automating display of controls—a capability in common with the prior art—the new art will be shown to permit more rapid physical navigation through the controls by notably reducing distances traversed.

Research additionally indicates that by employing paging rather than scrolling the new art will reduce the cognitive demands of managing controls that contain lists exceeding available display space of the control graphic. According to Piolat (A. Piolat, J. Roussey, and O. Thunin, "Effects of screen presentation on text reading and revising", International Journal of Human-Computer Studies, 1997, pp. 565–589) this can be attributed to " . . . page readers [having] a better grasp of text content due to . . . their use of spatial features of text . . . presented in page format" (p. 583). Piolat's results provide a cognitive explanation to the earlier Schwarz (E. Schwarz, I. Beldie, and S. Pastoor, "A comparison of paging and scrolling for changing screen contents by inexperienced users", Human Factors, 1983, pp. 279–282) conclusion that " . . . paging was clearly preferred for the reading of continuous text. . . ", (p. 281). Thus, paged windows accords with the Gaylin recommendation of optimizing navigational capabilities.

Another class of limitations of the prior art relates to how users of different skill levels navigate within the current control and between the different controls. Skilled users tend not to make many errors, but do find a control unfriendly if it fails to satisfactorily meet their needs for efficient control navigation. Novice users make frequent errors as they navigate controls because of uncertainty regarding services available, specifics of individual services, or the path to a desired service. Such users need the availability of "Full Reverse Traverse"; i.e., the capability to conveniently redisplay any arbitrary control of the control path. Full reverse traverse enables the user to expedite error correction and to more rapidly learn capabilities of the Control Subsystem.

The need to decide whether to provide for single or multiple selection from a control presents interface designers with three conundrums. Application designers need to correctly determine whether users will employ a control to mainly make single selections, mainly make multiple selections, or arbitrarily make either single or multiple selections. If it is decided that users will generally make multiple selections from a control, the control can explicitly provide a capability enabling the user to declare completion of service selection. Typically this capability takes the form of a button displayed within the control's graphic labeled with a synonymic term denoting the action "Done". If interface designers have correctly determined that multiple selections from a control will be the norm, the control will be perceived as user-friendly. However, if users normally select a single option from a control, a design that requires an explicit performance of "Done" after each selection will not be considered particularly user-friendly. The second conundrum arises when control designers decide that users will typically make a single selection from a control when in actuality users typically make multiple selections. To process a single selection, the Control Subsystem identifies a request for service, performs the service, and immediately executes an implicit "Done". If single selection is truly the norm, this design feature will be considered user-friendly since explicit termination of the Control Subsystem is not required. However, presenting the user with a single selection capability when multi-selection is the norm generally requires the user to regenerate the complete control path to affect each selection. This imposes a greater burden on the user than imposed by the burden of terminating a multi-selection capability when single selection is performed. Designers generally resolve these two conundrums by acquiring appropriate data via user activity logs, focus groups, or other observational approaches.

The third conundrum, not been fully resolved by the prior art, arises when users variably utilize a control for single selections and for multiple selections. Current versions of Macintosh software provided by the Apple Corporation implement what is termed "tear-off" in which a sub-menu is detached from its parent and dragged to a different location. Sun Microsystems provide a similar capability via the pinned menu while the NeXT workstation provided for a detached menu. Each of these commercially available approaches requires an initial manual action by the user with a subsequent traverse into the now permanently displayed submenu to affect closure. Since these techniques require the user to explicitly decide on a location for the control, they do enable the user to select an optimum location. Macloed (Miles Macloed and Penelope Tillson, "Pull-Down, HoldDown, or Staydown? A Theoretical and Empirical Comparison of Three Menu Designs", in D. Drapier, et al. (ed) Human-Computer Interaction—Interact '90, 1990, pp. 429–433) investigated the StayDown design in which an explicit user action, such as pressing a specified key, causes a menu to remain displayed until the explicit action is terminated. Macleod contends that users will accept and successfully perform the required explicit action. Other experts will contend that users commonly dislike control management that requires engaging one hand for what may be a protracted period.

Meeting novice user needs requires a user-friendly capability that enables the user to correct an erroneous selection and to browse available controls while learning. A major aspect of this capability is to enable the user to re-access an arbitrary ancestor control via provision of full reverse traverse capability. The prevailing pull-down menu design provides this capability for submenus via its tiled provision of each submenu selected. An unresolved problem of the current pull-down display is to permit continuance of tiled display when non-menu controls such as the dialog box are to be displayed. Rather than resolving this problem, the prior art typically ignores it by removing all menu controls before displaying a non-menu control. When portions of a control path are removed in this manner the user is unable to directly redisplay an arbitrary ancestor control and may be required to recommence the traverse from its beginning to affect the desired redisplay. Requiring the user to regenerate the control path for this reason is undesirable because it lowers productivity and makes learning the structure of interrelated controls more difficult.

Closely related to failure to provide full reverse traverse are limitations in the way the prior art provides the undo capability. In general, users are provided with linear undo; i.e., performance of undo in the reverse chronologic order in which services were performed. Given that it was advocated above that users be empowered to dynamically initiate multiple selection capability with the consequent possibility of multiple controls descending from a single ancestor, it can be anticipated that the user may desire undo services that have been initiated from an arbitrary control of the control path. There exists a substantial literature presenting desirable characteristics of arbitrary undo-redo. Yang (Yiya Yang, "Interface usability engineering under practical constraints: A case study in the design of undo support", in D. Diaper, et al. (ed), Human-Computer Interaction—INTERACT '90, 1990, pp. 549–554) summarizes this literature with focus on methods of linear undo. Berlage (Thomas Berlage, "A selective undo mechanism for graphical user interfaces based on command objects", ACM Transactions on Computer-Human Interaction, 1994, pp. 269–294) also provides an excellent review of technical literature on the art of undo with emphasis on the undoing of arbitrary services that have been performed. Myers (Brad A. Myers and David S. Kosbie, "Reusable Hierarchical Command Objects", Proceedings CHI '96: Human Factors in Computing Systems, 1996, pp. 260–267) provides a synopsis of Amulet, a set of software tools to aid the implementation of undo capability. While the preferred implementation presented below does suggest a basic undo capability that fulfills the needs of this invention, it is to be noted that the art disclosed herein only relates to the means of activating desired aspects of the undo capability. This invention does not offer any claims for new art relating to the technology of actually performing undo. What this invention discloses is a user friendly means of activating undo of arbitrary services.

The preceding review of the prior art of control usage reveals that usability problems fall into the categories of better positioning of the control display, better formatting when multiple controls are displayed, and the need to offer more user-friendly methods of control navigation. New art disclosed by this invention addresses these issues in ways that are in part novel and in part beneficial reconfigurations of prior art that have not heretofore been conceptualized by persons of normal skill in these arts.

The New Art of Control Positioning

While various definitions are equally applicable and obvious to those of normal skills in these arts, the top-left corner of a rectangle displayed on the CRT is defined by this invention to be its origin. While the origin of the screen axis system is normally presumed to be the lower-left corner of the display-zone, a person of normal skill can translate the origin of the coordinate system to any desired, alternate location. Entities within this axis system that relate to placement of controls are the display-zone, the work-area, and the cursor location. For purposes of this invention it is only consequential that the origin and dimensions of the display-zone are made available to the Control Subsystem; how these values are acquired is not consequential.

It is presumed the work-area is identified either explicitly or implicitly. An explicit work-area is identified by underline, highlight, marque, or other visual effect with examples being: a word, sentence, or table in a word processor; a geometric shape, line, or text block in a graphics system; a cell or row in a spread sheet application. In the absence of an explicit work-area, the Control Subsystem will identify an implicit work-area by determining a screen area, which, ideally, will coincide with but at least include the area of current user interest. A recommended but not exclusive approach to identifying an implicit work-area is to consider it to be an area of predefined dimensions centered on the cursor at the moment of Control Subsystem activation. If an implicit work-area is identified in this manner, when the cursor is located close to a display-zone boundary a portion of the presumptive, implicit work-area may exceed the display-zone bounds. In this case the work-area location may be shifted in a manner to be wholly contained within the display-zone.

As noted, Gittins found that software designers tend to fixate on one particular design model. It was concluded in the preceding review of prior art that designers possibly have fixated on the pull-down design to display the main menu, on the permanently displayed toolbar, and on a fixed relation to the work-area to position context specific controls. This invention surmounts these possible fixations by disclosing a three-step process that calculates a position for the initial control displayed at activation of the Control Subsystem that is based on the location of the center of the work-area relative to the center of the display-zone. The first step introduces the concept of "Center-seeking" which appraises the location of the work-area center relative to the center of the display-zone and determines the direction that is away from the work-area center and toward the display-zone center. It is to be understood that the step of center-seeking only provides the predictable direction in which the control display will appear relative to the work-area. The second step of control positioning determines the optimum coordinates in the direction of center-seeking for the origin of the control based on user specified offsets from the work-area center. Since the optimum location may result in clipping of the control display, the third step determines whether the control's optimum location produces clipping and, if so, calculates an alternate best location. The best location for a control is defined to be that location that avoids clipping while positioning the control's origin such that the maximum display minimally overlays the work-area.

Calculations subsumed by these three steps may be performed in various ways. The direct approach is to perform calculations for the actual quadrant containing the work-area center. This approach requires that unique, albeit similar, procedures are available to individually handle each of the four quadrants defined when the axis origin is translated to the display-zone center. An alternate approach is to employ quadrant symmetries to mathematically translate the work-area to a predetermined quadrant, employ a single procedure for the desired calculations, and once calculations are complete transform coordinates of the control's location back to the originating quadrant. Another approach is to systematically proceed through calculations required to position the control display and perform conditional tests to determine the appropriate calculation when consideration of the direction of center-seeking is required. The preferred implementation applies this latter approach. It is to be noted that this invention presupposes an ability to access coordinates and dimensions of a work-area. Thus, the applicability of this invention is not predicated on how the work-area is identified and quantified. Also, applicability of this invention is in no way predicated on employment of the preferred implementation since the procedures disclosed herein have already indicated the necessary calculations can be performed in various ways.

To implement the three-step control locating sequence, the concept of the "Maximum Display Region" (hereafter commonly called the Maximum Display) is introduced as the basis for positioning the initial control and any descendant controls present. To understand implications of the maximum display we first consider the components of a control. The purpose of such controls as the menu, combo box, check boxes, radio buttons, or other control displaying choice-selection lists is to make available a defined set of services. A unique "Region" identifies each service available for activation via the control. A region is defined as the screen area that activates the related service when selected by the user. The design of such controls as the toolbar can present sub-regions within a region in a manner to group related services. This invention defines the set of contiguous regions displayed by such controls as the "Shell", 2A201. The width of a control, 5D07, is defined to be the width of the shell with the height of a control, 5D10, defined as the height of the shell, 5D08, plus height of the title bar, 5B06. If the number of choice-selections does not exceed some maximum number, it is possible to display all choice-selections via a single page. Otherwise the choice selections are divided into multiple pages using an algorithm appropriate to the task that for controls displayed via the Spider format is recommended to be the page-managing algorithm disclosed by U.S. Pat. No. 6,239,803. For controls such as the dialog box that can contain multiple controls of differing type displayed in non-contiguous locations, the bounding rectangle defines the shell dimensions.

When a control display comprises a current control with ascendant controls, calculation of the maximum control's absolute maximum width requires referencing each possible control that can descend from the initially requested control and determine the control having the greatest width. To this is added a horizontal displacement for each ascendant control of the current control. The absolute maximum width of the maximum display is the width of that control plus displacement for its ancestors that is the greatest. The absolute maximum height of the control display is similarly calculated but additionally includes the height of any title bars. FIG. 1A illustrates the distinction between the maximum display, 1A08, the maximum shell, 1A10, the current display, 1A11; and the current shell, 1A12.

This invention recognizes that the control responsible for greatest absolute width need not be the control responsible for greatest absolute height. It is also recognized that the control responsible for greatest absolute width and the control responsible for greatest absolute height may each have a low likelihood of being displayed. If display of controls responsible for the greatest dimensions is unlikely, exigencies of an application may suggest that height and width values be chosen that are less than the absolute maximums. This approach will result in the control display being positioned closer to the work-area than occurs when absolute maximum control dimensions are used thus better meeting Shneiderman's recommendation of juxtaposing the area of user interest and the control display. On balance, juxtaposing the display and work-area in this manner can be expected to be considered the more user-friendly approach even though the location calculated may on occasion result in greater overlay of the work-area than is minimally required. Under circumstances where the work-area is large and located near the display-zone center and with dimensions of the selected control greater than the dimensions declared for the maximum display, the control positioning procedures here disclosed may result in clipping of the control display. Processes 11C06 and 11C08 of the preferred implementation present a means to avoid this contingency. Whether dimensions of the maximum display are based on the absolute greatest, the likely greatest, or some other appropriate application specific criterion, the source of these dimensions does not generally influence the procedures for calculating the best location for the maximum display. Consequently, this invention presupposes that these dimensions are determined by procedures exogenous to this invention.

Although coordinates of its origin specify the position of the maximum display, this result is achieved only after a sequence of calculations determines the best location for a "Reference Point". The reference point employed by this invention is identified by presuming the origin of the coordinate system to be coincident with the center of the work-area and that the maximum display is positioned in the quadrant containing the display-zone center such that two of its sides are coincident with the axis of the coordinate system. The reference point is the corner of the maximum display coincident with the origin. Because the implementation presented below always references a corner of the maximum display during its positioning sequence, the reference point will hereafter be termed the reference corner. Center-seeking is the repositioning of the maximum display from this initial position such that the reference corner is moved away from the work-area center and toward the display-zone center. FIG. 1A illustrates a work-area, 1A24, located in quadrant #3; i.e., the quadrant down-and-left of the display-zone center, 1A06. For a work-area in quadrant #3 the direction of a center-seeking maximum display, 1A08, is up-and-right of the work-area with the reference corner being the lower-left corner, 1A22, of the maximum display. Step two of the calculations indicated above determines the optimum location for the display by positioning the reference corner at coordinates calculated relative to the center of the work-area using parameters rDisplayDisplace__X, 5C16, and rDisplayDisplace$_{13}$ Y, 5C17. These two parameters specify the percent of one-half their respective work-area dimension that the reference corner is to be displaced from the work-area center in the dimension denoted by the "$_{13}$X" and "$_{13}$Y" designations. A positive value for these variables is in the direction of center-seeking with a negative value being in the direction away from center-seeking. FIG. 1A illustrates the case of rDisplayDisplace__X=+0.5 and rDisplayDisplace__Y=+1.0. FIG. 2A1 illustrates the case of a work-area located in quadrant #1 with both the rDisplayDisplace__X and rDisplayDisplace__Y set to +1.0. For this latter scenario the reference corner is the top-right corner, 1A22, of the maximum display, 1A08.

Initial calculations of step three determine whether it is possible to position the reference corner at the coordinates specified by rDisplayDisplace__X and rDisplayDisplace__Y without clipping by comparing dimensions of the maximum display to "Free Space." Horizontal free space is defined as the distance between the X-coordinate of the optimally located reference corner and the most distant vertical boundary of the display-zone. Vertical free space is analogously defined as the distance between the Y-coordinate of the optimally located reference corner and the most distant horizontal boundary of the display-zone. The values of horizontal and vertical free space represent the maximum width and height respectively of any display that can be rendered to the screen without clipping when the reference corner is positioned as specified by rDisplayDisplace__X and rDisplayDisplace__Y. Visual interpretation of horizontal and vertical free space is graphically provided in FIG. 1A by and respectively. Constraint occurs in a dimension when that dimension of the maximum display exceeds the free space available for its display. There are thus four possible constraint conditions: (1) no constraint, (2) horizontal constraint, (3) vertical constraint, and (4) simultaneous horizontal and vertical constraint. The diagrams of FIG. 1B depict these four possible constraints for a Vertical-Linear formatted control referencing a work-area having its center in quadrant #3. FIG. 1C similarly depicts the four possible constraints for a Spider formatted display referencing a work-area with its center in quadrant #1.

It will be uncommon to encounter constraint conditions with active displays common to notebook and desktop computers for work-areas that are, say, two-inches wide and one-inch tall. Consider an application having a typical display-zone of 11.5-inch width and 6.25-inch height, a two-inch wide work-area, and values of 1.0 and 0.0 for rDisplayDisplace__X, 5B03, and rDisplayDisplace__Y, 5B04, respectively. For horizontal constraint to even be possible with this scenario, the maximum display width must exceed ((display$_{13}$ zone$_{13}$ width)−(work$_{13}$ area$_{13}$ width))/2= (11.5−2.0)/2=4.75 inches.

Even when the maximum display width exceeds 4.75 inches, adjustments detailed below effectively reset rDisplayDisplace__Y to 1.0. Unless this resetting of rDisplayDisplace__Y creates vertical constrained, the full 11.5-inch width of the display-zone can be employed to render the control display. While work-areas approximating the size suggested will be common for many types of application usage, work-areas of larger dimensions will be encountered. The preferred implementation replaces user specified values for the rDisplayDisplace parameters with values more conducive to usability when the ratio of the work-area height to CRT height or the ratio of work-area width to CRT width exceed a value specified by the parameters and 5B11.

When a single constraint exists in a dimension for which rDisplayDisplace>1.0, the value of that rDisplayDisplace is implicitly reset to 1.0 and the maximum display re-tested for constraint. If the constraint has been removed the issue is resolved. If the constraint remains and if the other dimension has a rDisplayDisplace<1.0 the rDisplayDisplace of this other dimension is implicitly set to 1.0 and the maximum display re-tested for constraint. Again, if the constraint has been removed the issue is resolved. If constraint remains, procedures discussed below that manage dual constraint are implemented. To illustrate the four constraint scenarios consider FIG. 1B for the values of rDisplayDisplace_X=1.0 and rDisplayDisplace_Y=0.0. For the work-area locations and the display-zone dimensions depicted, these rDisplay-Displace values result in optimum positions that clip the maximum display in the manner depicted by the dotted rectangles extending beyond the display-zone. Avoidance of the horizontal constraint depicted by FIG. 1B2 implicitly resets rDisplayDisplace_Y to 1.0 and the test for vertical constraint repeated. If setting rDisplayDisplace_Y to 1.0 does not create vertical constraint, aligning the right edge of the maximum display with the right boundary of the display-zone avoids clipping, avoids work-area overlay, and minimally displaces the reference corner from its optimum location. Avoidance of clipping in FIG. 1B3 only requires that the rDisplayDisplace_Y value be allowed to float to permit aligning of the top edges of the maximum display and display-zone. Only when both dimensions remain constrained after adjustments that assure both rDisplayDisplace_X and rDisplayDisplace_Y equal 1.0 is it necessary to overlay a portion of the work-area to avoid clipping. FIG. 1B4 makes it visually apparent that under double constraint the amount of work-area overlay is minimized when the top-right corners of the maximum display and display-zone coincide. It may appear that the specifications provided by Sun (Sun Microsystems and AT&T, op. cit., pp. 337–338) to avoid clipping employ the approach just disclosed. This conclusion is incorrect. This invention determines a control's location based on a relation of the work-area and the display-zone that results in the control always being positioned to maximize free space. The Sun algorithm positions the control relative only to the work-area, which does not assure a control location that guarantees maximum free space. Thus, while the Sun positioning algorithm can maximize the control's distance from the display-zone borders to result in the positioning disclosed by this invention, Sun's positioning algorithm will do so an expected fifty percent of the time.

Symmetry between quadrants becomes apparent when FIG. 1C is compared with FIG. 1B. In FIG. 1C the work-area appears in quadrant #1 with the direction of center-seeking being down-and-left. As with FIG. 1B, when the dimensions do not exceed their respective free space constraint does not exist and the reference corner can be positioned at its optimum location. FIG. 1C2 illustrates the case where horizontal constraint is removed by floating the rDisplayDisplace_X value while FIG. 1C3 removes vertical constraint by resetting rDisplayDisplace_X to 1.0 and letting rDisplayDisplace_Y float. As with FIG. 1B4, FIG. 1C4 depicts that with double constraint it is not possible to avoid clipping of the maximum display without at least some overlay of the work-area.

Preceding disclosures reveal the four major benefits that accrue from the new art of control positioning; namely: (1) center-seeking strategy always displays the control at a generally predictable location, (2) except for special cases, the control will be displayed at the optimum center-seeking location specified by the user, (3) when the optimum location would cause clipping, a best location closest to the optimum location is determined, and (4) if overlay of the work-area cannot be avoided, the best location avoids clipping in a manner that overlays the smallest percent of the work-area.

The New Art of Multiple Control Display

This invention discloses a novel form of cascaded, overlapped windows. Since the concept of cascading itself is not innovative, a review of the history of window technology will show that the formulation of the cascade style disclosed herein is truly novel. Englebart first proposed multiple windows in 1968. Smalltalk, the first programming language to support overlapped and pop-up windows, was used to program the Xerox Star graphic user interface introduced in 1981. Multiple windows appeared commercially with the Apple Lisa in 1982, followed by the Apple Macintosh in 1984. Microsoft Windows and IBM OS/2 appeared shortly thereafter but did not initially support overlapped windows. The X Windows system, developed by MIT and introduced in 1984, is generally considered the definitive statement on overlapped window technology. (Brad Myers, "A brief history of human computer interaction technology", ACM Interactions, 1998, pp. 44–54; Jeff Johnson, Teresa Roberts, et al., "The Xerox Star: A Retrospective", IEEE Computer, 1989, pp. 11–29; R. Perkins and D. S. Keller, "Inventing the Lisa User Interface" http://developer.java.sun.com/developer/techDocs/hi/papers/Lisa/Interactions_96.html).

The idea of cascading display was introduced early in the history of graphic user interface technology with the means of its generation recently expressed by Shneiderman (Shneiderman, op. cit., pp.457–458) as: " . . . a sequence of windows from the upper left down to the lower right . . . successive windows are offset below . . . and to the right to allow each window title to remain visible". Galitz (Wilber Galitz, The Essential Guide to User Interface Design: An Introduction To GUI Design Principles And Techniques, 1997), another recent authority, devotes a single short paragraph (p. 223) to cascade display that effectively restates Shneiderman's description.

To the extent operating system vendors support automated cascade generation, reference to their style manuals shows that cascaded windows employs the style defined by Shneiderman. In a document of June 1992 the IBM Corporation (IBM Reference: IBM TDB n1a 06–92 p.174–175 available by searching http://m.spi.org) entitled "Determining where to place panels in a windowed environment" states that to create a window cascade " . . . indent the new panel . . . and place it just below the Action Bar of the owner panel (cascading) . . . If there is no Action Bar . . . the new panel will be cascaded just below the Title Bar of the owner." Although the Sun user interface specifications do not explicitly mention the cascade format, the concept is implied in "Displaying Submenus" (Sun Microsystems and AT&T, op. cit., p. 145).

It is not the concept of cascading, per se, that this invention posits as novel. What is novel is the new manner in which a windows cascade is generated to provide usability benefits not heretofore contemplated. This invention defines cascaded windows generated by the prior art as the "Forward Cascade" style. With the forward cascade, an initial window is displayed at some screen location. At display of a child window, the position of the parent window remains fixed with the top edge of the child window's title bar positioned at or slightly below the bottom edge of the parent window's title bar. In this manner, each subsequent child window is displaced downward from the location of its parent window. A lateral displacement of each child window minimizes the effort required to access an arbitrary prior window. The relevant characteristic of the forward cascade is that once a window is displayed at a location, that location remains unchanged.

This invention discloses the "Backward-Cascade". A backward-cascade is based on identifying a unique, non-varying screen coordinate called the "Fixed Point" relevant to the purpose of the user's task and an "Anchor-Point" defined relative to the origin of each window available for display in a cascade. How the fixed point and anchor-points are determined is disclosed below. With backward-cascade, windows are positioned such that each successive "Current Window" has its anchor-point coincident with the fixed-point creates the backward-cascade. As generation of a backward-cascade proceeds, each ancestor window is shifted upward such that the bottom edge of the title bar of any given window is at or near the top edge of the title bar of its immediate successor. A lateral displacement results in the overall cascade direction being either up-and-right or up-and-left. To present a more systematic display to the user, the dimensions of each ancestor window in the backward-cascade are adjusted to equal the dimensions of the current window irrespective of the dimensions of said current window. For reasons detailed below, simultaneous with the window re-dimensioning, the invention deletes all data of each ascendant control other than the content of the title bar. Because the resulting ascendant windows are more apparitions than substance, they are given the appellation "Ghost Windows."

Research by Berlyne (D. E. Berlyne, Aesthetics and Psychobiology, 1971) investigated characteristics that influence how users orientate and navigate a document. Of the characteristics identified by Berlyne it can be argued that differences of comparative complexity are most likely to be greatest between documents displayed in tiled format and documents displayed in backward-cascade format. Two aspects of complexity of most relevance are the number of individual groupings and the positioning of the groups relative to each other. Tullis (Thomas Tullis, "The Formatting of Alphanumeric Displays: A Review and Analysis", Human Factors, 1983, pp.657–682) quantifies both of these aspects by defining a group to be: " . . . any interconnected set of characters . . . separated by less than a threshold value. . . " (p. 671). Tullis contends that displays with fewer groups are the less complex and that less complex documents are less difficult to navigate than documents that are more complex. Because of the removal of informational content of all ancestor windows, users facing windows displayed in backward-cascade only face groups contained in the current window while users of tiled windows face the aggregate groups contained in all windows. Tullis additionally argues that " . . . based on knowledge of the location of some [groups] . . . one should be able to predict the locations of others" (p. 674). Tullis quantifies the complexity of relative group locations by defining arbitrarily positioned horizontal and vertical datum lines and then counts the number of different distances in the horizontal and vertical directions. Horizontal distances are counted from the vertical datum to a left vertical edge of the bounding rectangle of each group. Vertical distances are similarly counted from a horizontal datum to a horizontal edge of the bounding rectangle of each group. Applying Shannon's Information Theory (reference U.S. Pat. No. 6,295,509 for application of Information Theory to computer-human interfaces), Tullis determines the number of bits of information required to identify the position of each group relative to the position of other groups and defines this result to be the measure of inter-group complexity. When used to compare a tiled to a backward-cascade display, the backward-cascade requires fewer "bits" of information to communicate group location than does the equivalent display in tiled format. In consequence, the backward-cascade confronts the user with less complexity.

A less abstract appraisal of the user-friendliness of the backward display is implicit in the work of Mori (Hirohiko Mori and Yoshio Hayashi, "Visual interference with user's tasks on multi-window system", Human-Computer Interaction: Software and Hardware Interfaces, 1993, pp. 80–86). Mori compares windows having irrelevant information displayed near the window of interest to the same window in which irrelevant, nearby information is suppressed. He finds that users make fewer errors and perform more rapidly when extraneous information does not appear near the area of user interest. Research by Zhai (Shumin Zhai, Julie Wright, et. al., "Graphical means of directing users' attention in the visual interface", Human-Computer Interact: INTERACT'97, 1997, pp. 59–66) supports Mori with empirical evidence that shows a darkening or obliterating non-important information, as occurs with the ghost windows, helps focus user attention on the relevant information.

In preceding disclosures of the backward-cascade, the presentation was in general terms to communicate that its applicability is not confined to the display of controls. We now apply the backward-cascade to the display of multiple controls and adopt the term "Ghost Control" to denote ascendant controls with information empty shells. When the up-and-right direction is employed for the backward-cascade, the bottom-left corner of the maximum shell will coincide with the bottom-left corner of the maximum display as is shown in FIG. 1 at 1A22. This places the maximum shell origin on the left edge of the maximum display. Parameters rFixedPointDisplace$_{13}$ X, 5B22, and rFixedPointDisplace_Y, 5B23, contain values representing the percent of width and height respectively that the fixed-point is displaced from the origin of the maximum shell. When the Spider format is employed to display a control, the center of the central area is declared the anchor-point. This is illustrated by FIG. 2A. If a control path is displayed using the traditional Vertical-Linear format the anchor-point will normally be defined as either the center of the title bar or the center of the top-most region. If, however, a Vertical-Linear format of the style depicted by FIGS. 3C is employed the recommended location of anchor-points will place the center of the first region displaying a choice-selection at the fixed point. It is appreciated and therefore subsumed by this invention that a variation of the above approach permits an anchor-point to be determined for a leftward displacement of the ascendant controls.

The major usability benefit of the backward-cascade arises because each successive control displayed is positioned with its anchor point coincident with the fixed-point. The result is that each successive control is displayed at an unvarying location juxtaposed with the work-area. In this way the user can view each control at a secondary, fixed-location "control work-area" that is calculated to be close to the application work-area. This is in accord with Shneiderman's recommendation to "limit eye motion [while not] obscuring the " point of regard'". This is very different from the prevailing pull-down menu display where the user is required to view each separate control at a different location with each such control positioned by dictates of a placement algorithm that need not meet Shneiderman's recommendation.

The four diagrams that comprise FIG. 2 illustrate how positioning of the maximum display, the fixed-point, the anchor-points, the standardized dimensioning, and the ghost controls determine the location and appearance of a multi-control display. Note that diagrams of FIG. 2 communicate only those illustrative services needed for the example or to illustrate the possibility of a toolbar containing embedded list boxes, etc. Also note that FIG. 2 defers reference to the content of the central area, 2A202, 2A302, and 2A402, until disclosures by the next section, "The New Art of Control Navigation". FIG. 2A1 depicts the state of the Control Subsystem after positioning of the maximum display and calculation of the fixed-point, but before the initial control has been rendered to the screen. FIG. 2A2 duplicates FIG. 2A1 except the initial control is now displayed. Note that in FIG. 2A2 the shell center coincides with the fixed-point, 5D12, and that the width of the current shell, 5D07, is presented as being less than the width of the maximum display, 5C08. The dark area labeled "Lbl 1.3.2" in FIG. 2A2 denotes that when this option is selected FIG. 2A3 results. FIG. 2A3 illustrates two notable points. First, toolbars frequently do not have descendants and when descendants do occur commonly present fewer options than does the parent. Second, FIG. 2A3 presents the case of the control of greatest width also being the control of greatest height. This illustrates how a maximally dimensioned, second-generation control can be displayed close to the work-area while avoiding any overlay. FIG. 2A3 additionally depicts conversion of the initial control displayed, 1A11 in FIG. 2A2, to ghost format as 2A201 in FIG. 2A3. This illustrates that at conversion to ghost format, the control is resized to the dimensions of the current control and its shell emptied of informational content. Selection of the area labeled "Lbl 2.5.5" displays FIG. 2A4. This again illustrates the unvarying position of the central area. Note that the height of the "Lbl 2.5.5" control is two region widths less than the height of its parent, which was stipulated to possess absolute maximum dimensions. This results in space appearing at the top and bottom bounds of the maximum display with at least a portion of the top-most of these spaces being occupied by a title bar.

It was shown above that, although possible, it is unlikely that under typical conditions the maximum display will overlay all or part of the work-area. It can now be shown that even if the maximum display does overlay the work-area, when dimensions of the maximum display derive from descendant controls that are seldom selected it is even less likely that a portion of the work-area will be overlaid. FIG. 1C4 illustrates a case in which the calculated best location results in the maximum display overlaying most of the work-area but because current control dimensions are less than maximum display dimensions the current display will overlay a smaller portion of the work-area than does the maximum display. An implication of this is that under certain circumstances it is possible that a currently displayed control can appear excessively far from the work-area. To exemplify, consider a control path in which a dialog box having large dimensions is displayed at the end of a traverse of menu controls having small dimensions. If dimensions of the maximum display are based on dimensions of the dialog box, the dialog box will be positioned in close proximity to the work-area. But because the menu controls will be centered on the fixed-point and have small dimensions, they may appear excessively distant from the work-area. Conversely, if dimensions of the maximum display derive from menu dimensions the best location for the maximum display will result in a fixed-point relatively close to the work-area. Although this displays the menu controls close to the work-area the dialog box will overlay at least a portion of the work-area. FIGS. 3A3 and 3A4 depict a fixed-point location determined from dimensions of the menu. As is illustrated by FIG. 3A4, this can result in the dialog box encroaching into the work-area.

The backward-cascade also resolves a problem of the pull-down control design that commonly results in forcing the user to perform extra manipulations. It is typical that with pull-down menu designs all ancestor controls are removed before display of a non-menu type child control since non-menu controls cannot be assigned a position in the manner of pop-up tiled submenus. Deferring disclosures of central area detail until later, FIG. 3 illustrates how the backward-cascade applied to display of multiple controls formatted in Spider style handles a display of mixed type controls. FIG. 3A1 displays an initial main menu at the location determined by the fixed-point, 5D12, of a maximum display, 1A08, assigned its best position by methods disclosed above. Selection of the "Format" option in FIG. 3A1 generates the child menu displayed by FIG. 3A2. Selection of the "Text Properties" of FIG. 3A2 produces the dialog box displayed in FIG. 3A2. This invention treats the dialog box of FIG. 3A3 as the current control of a control path containing two ascendant menu controls that have been converted to ghost format. Finally, selection of the "Font" region in FIG. 3A3 generates the list box of FIG. 3A4. It is to be noted that this list box is displayed centered at the same fixed-point coordinate as the initial main menu. FIG. 3A4 illustrates the resulting control path of mixed control types, which contains two menu ghost controls, one dialog ghost control, and a list box current control.

Clipping can occur when employing the preferred implementation if the dimensions used for the maximum display are less than the absolute maximum dimensions. The circumstances in which this is most likely arise when: (1) a dimension of the control requested exceeds that of the declared maximum display dimension, (2) the control dimension exceeds half the dimension of the display-zone, and (3) the work-area is relatively close to the center of the display-zone. These circumstances will normally not be common but when they do occur, the preferred implementation discloses processes to remove the clipping based on shifting the fixed-point. Such an action, to a greater or lesser degree, violates Hix's Principle of Least Amazement and must be considered undesirable.

It is better to address the issue of clipping at the design stage by designing controls that assure that the bounding rectangle of no control display has dimensions exceeding one-half the difference between the display-zone and work-areas of likely dimensions. Design specifications can require the set of controls available to an application to have dimensions that do not vary by more than a stated amount. Actions conducive to this are: complete paths to data files should seldom be displayed; succinct but real-world labels should be chosen for item labels; dialog boxes should seldom include the permanent display of controls containing lists of arbitrary length; icon groups should be of similar size.

The New Art of Control Navigation

This invention has now disclosed procedures by which: (1) a non-clipped control display can be positioned in a manner that is predictable, juxtaposed with the work-area, and does not or minimally overlays the work-area, (2) assures that the positioning of successive current controls is unvarying irrespective of control path length, and (3) offers a display that is parsimonious of screen real estate. There remain the three problems of: (1) empowering the user to redisplay an arbitrary ancestor, (2) providing a user-friendly recovery from selecting an undesirable service, and (3) empowering the user to select multiple services when desired but not perform unnecessary manipulations when single selection is desired.

Resolution of the first of these three problems is critical since this invention proposes that the initial menu and toolbar controls are to be popped-up upon user demand. Given that users will frequently make multiple selections from the initial control, provision of a user-friendly capability for its re-display that does not require the user to exit then re-activate the Control Subsystem is desirable. It is also expected that users will sometimes desire to redisplay other than the initial control. As the user redisplays an ancestor control it can be presumed the user is primarily concerned with identifying the control desired and is generally indifferent to constraints of display technology that require different graphics for different types of choice-selections. Because the only information contained in a ghost control is the identifying title bar and the control's relative position in the control path, ghost controls contain precisely the information needed to identify a desired ancestor control. It is disclosed in U.S. Pat. No. 5,506,699 that with the Spider format the user may redisplay any arbitrary ancestor control in either of two ways: (1) click on any visible portion of the appropriate ghost control and (2) click the appropriate location of the central area.

A control that can reduce even this level of explicit user action to redisplay an ancestor control will be even more user-friendly. Before disclosing how this third method of ancestor redisplay is achieved it is first necessary to consider the special purpose function areas within the control graphic which will hereafter be termed the "Management Area"; i.e., the portions of a control graphic shell not displaying choice-selections. FIGS. 3B through 3G illustrate configurations of the management area of Spider and Vertical-Linear formatted controls that are recommended for management of the menu controls, toolbar controls, and controls that provide lists of arbitrary length. Several aspects of FIGS. 3B through 3G relating to the Spider format have been previously disclosed, perhaps with different labeling, in U.S. Pat. Nos. 5,596,699 and 6,239,803. These previous disclosures are ascendant control redisplay, 3B08, page management for controls containing lists, 3D08, toggle between menu and toolbar controls, 3B06, and "Exit", 3B02, to return the user directly to the application program.

Other aspects of the management area are novel. Paired with the "Exit" capability is the "Abort", 3B04, capability that reverses all services performed during the current Control Subsystem activation before returning the user to the application program in the manner of "Exit." The invention also discloses the "Done", 3B14, and "Cancel", 3B16, capabilities. As justified and elaborated below, "Done" parallels the "Exit" capability except it returns processing to the most recent ancestor control containing the explicit "Done" capability. The "Cancel" capability reverses services performed by the current control before performing as the "Done" capability. To permit user declared multiple selection from a control, the invention provides the "Multi-Select" area, labeled with either this or a synonymic phrase. When the user selects "Multi-Select," 3B12, the "Multi-Select" area is dynamically converted to the "Done" and "Cancel" areas. If application designers know that they have correctly identified a control that will generally be used for multiple selections they will provide a graphic that explicitly provides the "Done" and "Cancel" areas. Obversely, if application designers know that they have correctly identified a control that will be used for single selection they will display a graphic that provides for single-selection by removing the "Multi-Select" label, display the "Multi-Select" label in light gray, or via some alternate visual effect to denote single selection. For controls that designers have determined to be employed at arbitrarily times for both single and multiple selections, designers present the "Multi-Select" capability in a manner to denote its active status. When the user observes an active "Multi-Select" area and desires a single selection, the "Multi-Select" area is ignored, the user selects the desired service, and the Control Subsystem responds as disclosed below. If, however, the user desires multiple services the "Multi-Select" area is selected to generate the "Done" and "Cancel" areas, the user makes multiple service selections, a termination capability is selected, and the Control Subsystem responds as disclosed below.

How the control responds to activation of the "Exit", "Abort", Done", "Cancel", and "Undo" capabilities determines how the control performs variations of reverse traverse. It is noted above that when "Exit" is selected the Control Subsystem is terminated and the user returned to the application program with all services maintained that have been selected. When "Abort" is selected all services selected during the current Control Subsystem activation are reversed, the Control Subsystem is terminated, and the system returns to the state existing at the time the Control Subsystem was activated.

Known art provides for the concepts of "Undo" and "Redo". The new art now disclosed relates to managing the undo of arbitrary services. Reference to the literature cited communicates that the prior art of undo does not offer user-friendly mechanisms that initiate the undo of arbitrary services performed during the current Control Subsystem activation. The "Undo", 3B10, and "Cancel", 3B16, capabilities are disclosed to provide the means for reversing arbitrary selections made during the current Control Subsystem activation. Subject to qualifications noted below, when the "Undo" area of a current control management area is selected, the last service performed by that current control is reversed. This differs from the "Undo" normally found as an option in a submenu of the main menu, which reverses the chronologically last user action. While also subject to qualifications noted below, when the "Cancel" portion of the management area is selected all services performed by selections from the currently displayed control containing the activated "Cancel" are reversed. This differs from the "Abort" capability, which reverses all services performed during the current Control Subsystem activation.

To introduce the added capabilities of "Done" and "Cancel" the concept of "Staged Reverse Traverse" is disclosed. It has been noted that selection of a ghost control or a control identification in the management area, 3B08, enables the user to explicitly redisplay an identified ancestor control. Staged reverse traverse provides the user with a knowable, predefined reverse traverse. Under staged reverse traverse termination of any control by either an explicit or implicit "Done" results in the Control Subsystem traversing through ancestor controls in reverse order of age seeking the most recent ancestor containing an explicit "Done". If found this ancestor is redisplayed. Only if no prior control contains an explicit "Done" does the Control Subsystem terminate and return the user to the application in the manner of "Exit". After control specific reversing of services is complete, the "Cancel" capability performs exactly as does the "Done" capability. Activation of a control's "Undo" does not initiate any reverse traverse.

The example of three menus and a dialog box presented above illustrates the benefits of staged reverse traverse. Presume the main menu and all submenus are displayed in pop-up style. Assume further that the main menu provides the "Done" capability as does the "View" submenu and the "Toolbar" submenu of the "View" submenu. With these opportunities the user can select the "View" option from the main menu then select the "Toolbar" option from the popped-up View submenu which presents the user with a submenu that contains a vertical list of check boxes labeled with the names of basic toolbars. The user checks or unchecks as many basic toolbars as desired. When selection is complete the "Done" capability is activated. Rather than terminating the Control Subsystem, the View control is redisplayed. The user may now select the Header/Footer option, select "Page Number", select "Date", and then select "Done". The View control is again displayed and the user may select the "Ruler" option. As Ruler does not display a child control the service is performed and the View control continues to display. If the user is finished with the View submenu, "Done" is selected which redisplays the main menu. If desired, the user may now undertake an additional main menu selection. At any time during these manipulations, the user may select the "Exit" capability to maintain all services thus far performed, terminate the Control Subsystem, and immediately return to the application program.

SUMMARY OF THE INVENTION

This invention details a method of display for a graphical user interface of a computer that comprises identifying a maximum display in which a size of the maximum display is based at least in part on at least one of a probable-largest required size and an absolute-largest required size. The method of display also comprises positioning the maximum display in a best manner such that: (1) the maximum display minimally overlays a work area of a display zone of an active display, (2) the maximum display does not extend outside the display zone, and (3) subject to the first two criteria, the maximum display is minimally distant from a user specified optimum display location. The method of display involves the ability to identify a plurality of permitted, generation ordered, sequences of differing controls, wherein a control corresponds to a displayable graphic having at least a shell area for presentation of at least one of choice selections and textual matter. The method of control display enables the user to select from the plurality of possible control paths a desired control path for resulting in a display based at least in part on a position of the maximum display, wherein the control path does not extend outside the display zone; the display zone corresponding to a delimited area of the active display within which the control path may be rendered. The work area referenced above corresponds to an area of the display zone presumed to be of interest to the user.

The method of display introduced by this invention further comprises the steps of identifying a center of the work area, identifying a center of the display zone, translating an origin of a coordinate system of the active display to coincide with the center of the work area, identifying a quadrant of the coordinate system containing the center of the display zone, and positioning a reference point, which will normally be a corner, of the maximum display within the quadrant of the coordinate system containing the center of the display zone.

An alternate approach to achieving the purpose of the preceding paragraph is to utilize the steps of identifying a center of the work area, identifying a center of the display zone, translating an origin of a coordinate system of the active display to coincide with the center of the display zone, identifying a quadrant of the coordinate system containing the center of the work area, and positioning a reference point, which will normally be a corner of the maximum display, within the quadrant of the coordinate system containing the center of the work area.

Irrespective of which of the two preceding axis translations is employed, the maximum display is positioned within the display zone based at least in part on a plurality of at least one user supplied parameters. This positioning is performed in a manner such that the maximum display is positioned within the display zone based at least in part on a first user-supplied percentage parameter applied to a horizontal dimension of the work area and a second user-supplied percentage parameter applied to a vertical dimension of the work area. This method further comprises the step of selectively overriding the plurality of at least one user supplied parameter to ensure that the maximum display does not extend outside the display zone.

The initial control displayed and subsequently manipulated by a user has an associated control subsystem that remains active during an activation interval controlled by the user and during which a succession of control instances may be displayed corresponding to a permitted control path. The approach employed by the control subsystem comprises defining a maximum shell within which is defined a fixed coordinate that remains fixed during the activation interval unless the size of the maximum display is insufficient to permit display of the control path in the best manner in which the control display does not extend outside the display zone. All controls displayed during the activation interval subsequent to the initial control instance are displayed relative to the fixed coordinate.

The maximum shell is defined in a manner such that the maximum shell definition comprises the steps of identifying a shell having a first greatest requirement associated with a first dimensional characteristic of the control shell and identifying a shell having a second greatest requirement associated with a second dimensional characteristic of the control shell. The first dimensional characteristics and second dimensional characteristics of control shells correlate to describe areas of control shells. The first dimensional requirement and second dimensional requirement are determined based at least in part on at least one of a majority of the control shells and all of the control shells. Within this maximum shell, definition method the first dimensional characteristic is height and the second dimensional characteristic is width. The first greatest requirement is the greatest height, and wherein the second greatest requirement is the greatest width.

There is also defined an anchor-point for each of a plurality of at least one control type based on a plurality of at least one user supplied parameters. This anchor-point is positioned within a shell of each of a plurality of at least one differing control types based at least in part on a first user-supplied percentage parameter applied to the first dimensional characteristic of the shell and a second user-supplied percentage parameter applied to the second dimensional characteristic of the shell.

The method of creating a control display further entails the step of defining an anchor-point for each of a plurality of at least one control type based on a plurality of at least one user supplied parameters. Based in part on these parameters the associated control subsystem produces the control display. This rendering of the display is performed in a manner that positions the anchor point of a current control to coincide with the fixed point. The current control is defined to be the control of a control path that is the control most recently displayed.

Processes performed by the associated control subsystem affect repositioning of an ancestor display instance of an ancestor control associated with a control path of the current control. This repositioning of the ancestor display instance affects a lateral repositioning a predetermined distance to a side of a child display instance of a child display instance of a child control associated with the ancestor control. A vertical displacement is also performed that is a second predetermined distance in relation to the child display instance with the ancestor being displayed behind the display of its child. The current display instance and each ancestor display instance has a title bar display that at least in part determines the vertical displacement of the ancestor display instance; the vertical displacement upward in relation to the child display instance being not less than the height of the title bar display such that the title bar display of the current display instance and each ancestor display instance is simultaneously visible.

The method of generating a control display additionally re-dimensions each ancestor display instance to the dimensions of the current display instance. An additional action of the associated control subsystem is to provide each extant ancestor display instance with a predetermined visual treatment that communicates an absence of display content.

The method for generation of a control display contains various capabilities that permit the user to manage what controls are displayed and how the control path is displayed. There is proposed a capability that provides a current control with an exit capability that results in removal of a graphical display that results from rendering the control path to the active display. An aspect of the exit capability is a return of subsequent computer processing to a calling application. The current control corresponds to the control of a control path that is the control most recently displayed.

There is proposed a capability wherein a current control has an abort capability that permits a reversal of each service performed during a current activation of a control subsystem. The abort capability additionally initiates removal of a graphical display that results from rendering the control path to the active display then returns subsequent computer processing to a calling application. The reversal of services affects a return of the calling application without provision of any services selected during manipulation of the control path to a system state existing immediately prior to performance of a choice selection.

There is proposed a capability wherein the current control has a done capability, wherein the done capability of the current control has either an explicit and implicit done capability. The done capability of the current control permits a search for an ancestor control associated with a control path of the current control that is a most recent ancestor control having the explicit done capability. The done capability of the current control permits removal of all controls descending from the most recent ancestor control with subsequent display of the most recent ancestor control and its antecedents. If the search for an explicit done capability among ancestors of the current control is not successful, the control display is removed and the done capability of the current control affects return of subsequent computer processing to a calling application.

There is proposed a capability wherein a current control has a cancel capability. The cancel capability permits reversal of all services in a plurality of services performed by a control subsystem, wherein the plurality of services were performed by the control subsystem in response to manipulation of the current control by the user. The cancel capability of the current control permits removal of all controls descending from the most recent ancestor control with subsequent display of the most recent ancestor control and its antecedents. If the search for an explicit done capability among ancestors of the current control is not successful, the control display is removed and the cancel capability of the current control affects return of subsequent computer processing to a calling application.

There is proposed a capability wherein a current control has a multi-select capability, wherein the multi-select capability permits the user to convert to a multiple selection mode from a single selection mode at an option of the user wherein the multiple selection mode permits the user to perform multiple selections from the current control. This means that a multi-select capability within the current control is configurable by the user for permitting the user to perform multiple selections There is proposed a capability wherein a current control has an undo capability. The undo capability permits a reversal of a last service performed by a control subsystem in response to user manipulation of a current control or manipulation a redisplayed ancestor control that has become a current control.

The apparatus for this invention comprises a user-interface for use with a computer that provides an operating system, an input means in communication with said operating system for accepting input from a user, an active display in communication with the operating system, a plurality of controls in communication with the operating system. The plurality of controls referenced corresponds to graphics displayable to the active display. Each of these graphics has a shell area for presentation of at least one of choice-selections and textual matter. There exists at least one control path associated with said plurality of controls, each such control path corresponding to a permitted, generation ordered sequence of said controls. There is also a display zone associated with the active display that corresponds to a delimited area of the active display for rendering said control path as a control display to the active display. The said control path has a first dimensional characteristic and a second dimensional characteristic in which the first dimensional characteristic and the second dimensional characteristic correlate to describe an area of the control display. There is also a work area associated with the display zone, the work area corresponding to an area of the display zone of interest to the user. Within this apparatus the operating system manages the input means, the active display, and the plurality of controls in a best manner to achieve a best rendering of an entirety of the control display specified by the user within the display zone in which the control display minimally overlays said work area.

The operating system employs a display method for achieving the best rendering. The display method which provides the best rendering comprises identifying a maximum display, wherein a size of the maximum display is based at least in part on at least one of a first greatest requirement associated with the first dimensional characteristic of a selectable control and a second greatest requirement associated with a second dimensional characteristic of a selectable control. Positioning the maximum display in the best manner, entails positioning the maximum display to minimally overlay said work area of said display zone of said active display, and wherein the maximum display does not extend outside said display zone. The best display of the said control path selected by the user is based at least in part on a position of the maximum display region in which the said control path does not extend outside said display zone, the control display as near the work area as possible while achieving a minimal overlay of the work area.

To affect the preceding positioning entails the display method further comprising the steps of identifying a center of the work area, identifying a center of the display zone, translating an origin of a coordinate system of the active display to coincide with the center of the work area, identifying a quadrant of the coordinate system containing the center of the display zone, and positioning a reference point of the maximum display within the quadrant of the coordinate system containing the center of the display zone. Generally, the reference point is a corner of the maximum display.

The preceding positioning can alternatively entail a display method further comprising the steps of identifying a center of the work area, identifying a center of the display zone, translating an origin of a coordinate system of the active display to coincide with the center of the display zone, identifying a quadrant of the coordinate system containing the center of the work area, and positioning a reference point of the maximum display within the quadrant of the coordinate system containing the center of the work area. Generally, the reference point is a corner of the maximum display.

A current control corresponding to the control of a control path that is the control most recently displayed has navigation capabilities that include at least one of a multi-select capability and an undo capability. The multi-select capability permits the user to select a plurality of services from the current control for performance by a control subsystem. The undo capability permits a reversal of at least one of a last service and a last plurality of services performed by a control subsystem in response to user manipulation from at least one of the current control and a previously current control.

A current control corresponding to the control of said control path that is the control most recently displayed has navigation capabilities that include at least one of an exit capability a done capability. The exit capability permits removal of the control display and return to the calling application. A done capability permits at least one of: (1) removal of all controls descending from a most recent ancestor control explicitly having the done capability with display of the most recent ancestor control and its antecedents, and (2) removal of the control display and return to a calling application. If the done capability performs an unsuccessful search for the most recent ancestor control, the done capability performs removal of the control display and return to the calling application.

A current control corresponding to the control of said control path that is the control most recently displayed has navigation capabilities include at least one of an abort capability and a cancel capability. The abort capability permits reversal of all services performed during a current activation of an associated control subsystem of the current control, removal of the control display, and return to a calling application. The cancel capability permits reversal of all services performed during a current activation of an associated control subsystem of the current control and at least one of: (1) removal of all controls descending from a most recent ancestor control explicitly having the done capability and display of the most recent ancestor control and its antecedents, and (2) removal of the control display and return to a calling application. If the cancel capability performs an unsuccessful search for the most recent ancestor control, it performs removal of the control display and return to the calling application.

The apparatus of this invention permits a control display to be rendered in a manner permitting display of the current control in reference to a fixed point. Each ancestor control is displayed behind its child control and at least one of offset in a first direction relative to its child control and offset in a second direction relative to its child control. The fixed point remains fixed during an activation interval of an associated control subsystem unless repositioning of the fixed point is required to facilitate the best rendering.

An additional capability of the apparatus for performing the display method comprises the step of defining an anchor-point for each of a plurality of at least one control type based on a plurality of at least one user supplied parameters. The anchor-point is positioned within a shell of each of a plurality of at least one differing control types based at least in part on a first user-supplied percentage parameter applied to the first dimensional characteristic of the shell; and a second user-supplied percentage parameter applied to the second dimensional characteristic of the shell.

It was stated above that the size of the maximum display is based at least in part on a first greatest requirement and on a second greatest requirement. The first greatest requirement and the second greatest requirement are determined based at least in part on dimensional characteristics of all control paths selectable by the user. The first greatest requirement and the second greatest requirement are additionally determined based at least in part on dimensional characteristics of a majority of control paths selectable by the user, wherein a small population of control paths selectable by a user having exceptionally large requirements regarding at least one dimensional characteristic are excluded from the majority.

A probable determination can be employed to determine the first greatest requirement and the second greatest requirement wherein the determination is based on dimensional characteristics of all control paths selectable by the user. A probable determination of the first and the second greatest requirement is determined based on dimensional characteristics of a majority of control paths selectable by the user in which a small population of control paths selectable by a user have exceptionally large requirements regarding at least one dimensional characteristic are excluded from the majority. The size of the maximum is to be based on the probable determination unless the size of the maximum display is insufficient to permit display of the control path in a best manner whereby the size of the maximum display is based on the absolute determination it the size of the maximum display is insufficient to permit display of the control path in the best manner.

BRIEF DESCRIPTION OF THE DRAWINGS

FIG. 1 contains nine diagrams that visually depict various parameters employed by the invention and illustrate the concepts of center seeking and constraint conditions.

FIG. 1B1 is a diagram of unconstrained maximum display positioned up-and-right of the work area.

FIG. 1B2 is a diagram of a horizontally constrained maximum display positioned up-and-right of the work area.

FIG. 1B3 is a diagram of a vertically constrained maximum display positioned up-and-right of the work area.

FIG. 1B4 is a diagram of a horizontally and vertically constrained maximum display positioned up-and-right of the work area.

FIG. 1C1 is a diagram of an unconstrained maximum display positioned down-and-left of the work area.

FIG. 1C2 is a diagram of a horizontally constrained maximum display positioned down-and-left of the work area.

FIG. 1C3 is a diagram of a vertically constrained maximum display positioned down-and-left of the work area.

FIG. 1C4 is a diagram of a horizontally and vertically constrained maximum display positioned down-and-left of the work.

FIG. 2 contains four diagrams that illustrate the fixed point, backward cascade aspects of this invention.

FIG. 2A1 is a diagram that illustrates the relation between the work area and maximum display resulting from implementing the center seeking and fixed point aspects of this invention.

FIG. 2A2 is a diagram that illustrates the relation between the maximum display and a first generation current control display.

FIG. 2A3 is a diagram that illustrates the relation between the maximum display and a second-generation current control display that illustrates the backward cascading aspects of this invention.

FIG. 2A4 is a diagram that illustrates the relation between the maximum display and a third generation current control display that further illustrates the backward cascading aspects of this invention.

FIG. 3 contains twenty-eight diagrams that illustrate the handling of different control types during a single activation of the control subsystem.

FIG. 3A1 is a diagram that illustrates a first-generation menu control with position based on the fixed-point.

FIG. 3A2 is a diagram that illustrates a second-generation sub-menu of the menu illustrated by FIG. 3A1.

FIG. 3A3 is a diagram that illustrates the positioning of a dialog box that results from a menu leaf selection.

FIG. 3A4 is a diagram that illustrates the positioning of the list box that results from a selection of a dialog box.

FIGS. 3B1 and 3B2 are two diagrams that illustrate the central area of a menu control displayed using Spider format that support full reverse traverse with user determination of whether multiple service selections will be permitted.

FIGS. 3B3 and 3B4 are two diagrams that illustrate a menu control displayed using Vertical-Linear format that support full reverse traverse with user determination of whether multiple service selections will be permitted.

FIGS. 3C1 and 3C2 are two diagrams that illustrate the central area of a toolbar control displayed using a Spider format that supports full reverse traverse with user determination of whether multiple service selections will be permitted.

FIGS. 3C3 and 3C4 are two diagrams that illustrate a toolbar control displayed using a Vertical-Linear format that supports full reverse traverse with user determination of whether multiple service selections will be permitted.

FIGS. 3D1 and 3D2 are two diagrams that illustrate the central area of a list box control for a one page display using a Spider format that supports full reverse traverse with user determination of whether multiple service selections will be permitted.

FIGS. 3D3 and 3D4 are two diagrams that illustrate a list box control for a one page display using a Vertical-Linear format that supports full reverse traverse with user determination of whether multiple service selections will be permitted.

FIGS. 3E1 and 3E2 are two diagrams that illustrate the central area of a list box control for a three page display using a Spider format that supports full reverse traverse with user determination of whether multiple service selections will be permitted.

FIGS. 3E3 and 3E4 are two diagrams that illustrate a list box control for a three page display using a Vertical-Linear format that supports full reverse traverse with user determination of whether multiple service selections will be permitted.

FIGS. 3F1 and 3F2 are two diagrams that illustrate the central area of a list box control for a five page display using a Spider format that supports full reverse traverse with user determination of whether multiple service selections will be permitted.

FIGS. 3F3 and 3F4 are two diagrams that illustrate a list box control for a five page display using a Vertical-Linear format that supports full reverse traverse with user determination of whether multiple service selections will be permitted.

FIGS. 3G1 and 3G2 are two diagrams that illustrate the central area of a list box control requiring more than five pages to display the item list using a Spider format that supports full reverse traverse with user determination of whether multiple service selections will be permitted.

FIGS. 3G3 and 3G4 are two diagrams that illustrate a list box control requiring more than five pages to display the item list using a Vertical-Linear format that supports full reverse traverse with user determination of whether multiple service selections will be permitted.

FIG. 4 contains seven flowcharts disclosing the high level preferred implementation of this invention.

FIG. 5 contains five diagrams that disclose the data structures and definitions of variables contained therein that are employed by the preferred implementation of the invention.

FIG. 5A is a diagram that discloses the data structure and definition of default variables recommended by the preferred implementation.

FIGS. 5B1, 5B2, and 5B3 comprise a single diagram that discloses the data structure and definitions of variables that do not change during a computer session.

FIG. 5C is a diagram that discloses the data structure and definitions of variables relevant to any given activation of the control subsystem.

FIG. 5D is a diagram that discloses the data structure and definitions of variables relevant to the display of any requested control during any given activation of the control subsystem.

FIG. 5E is a diagram that discloses the data structure and definitions of variables relevant to the undo capability of this invention.

FIG. 7 contains two flowcharts that disclose the processes that generate the data structure.

FIG. 7A is a flowchart that discloses the processes that determine values of the rCommon array of the FIG. 5B data structure.

FIG. 7B is a flowchart that discloses the processes that determine values of the rVar arrays of the FIG. 5B data structure.

FIG. 9 contains four flowcharts that disclose the processes that display the initial control.

FIGS. 9A1 and 9A2 comprise a single flowchart that discloses the calling processes that manage determination of the best location and subsequent rendering of the initial control display.

FIGS. 9C1 through 9C5 comprise a single flowchart that discloses the processes that determine the coordinates of the maximum display window

FIG. 10 contains four flowcharts that disclose the management of user activity on the current control display.

FIGS. 10A1 through 10A4 comprise a single flowchart that discloses the processes that determine appropriate response to user manipulation of the current control, responses to user requests for control subsystem termination, display of ascendant controls, display of descendant controls, and performance of services.

FIGS. 10D1 through 10D7 comprise a single flowchart that discloses processes that perform four different strategies for reversing the services performed by controls of a control path.

FIG. 11 contains six flowcharts that disclose the processes that support processes of FIGS. 6 through 10.

FIGS. 11B1 through 11B5 comprise a single flowchart that suggests processes that determine the dimensions of displays of the different types of control.

FIG. 11C is a flowchart that discloses the processes that determine the coordinates of a requested control given knowledge of the coordinates of the fixed point.

FIGS. 11D1 and 11D2 comprise a single flowchart that suggests the processes to be employed for the generation of a current display.

DESCRIPTION OF THE PREFERRED EMBODIMENT

TERMINOLOGY AND NOTATION

Figure 1A:
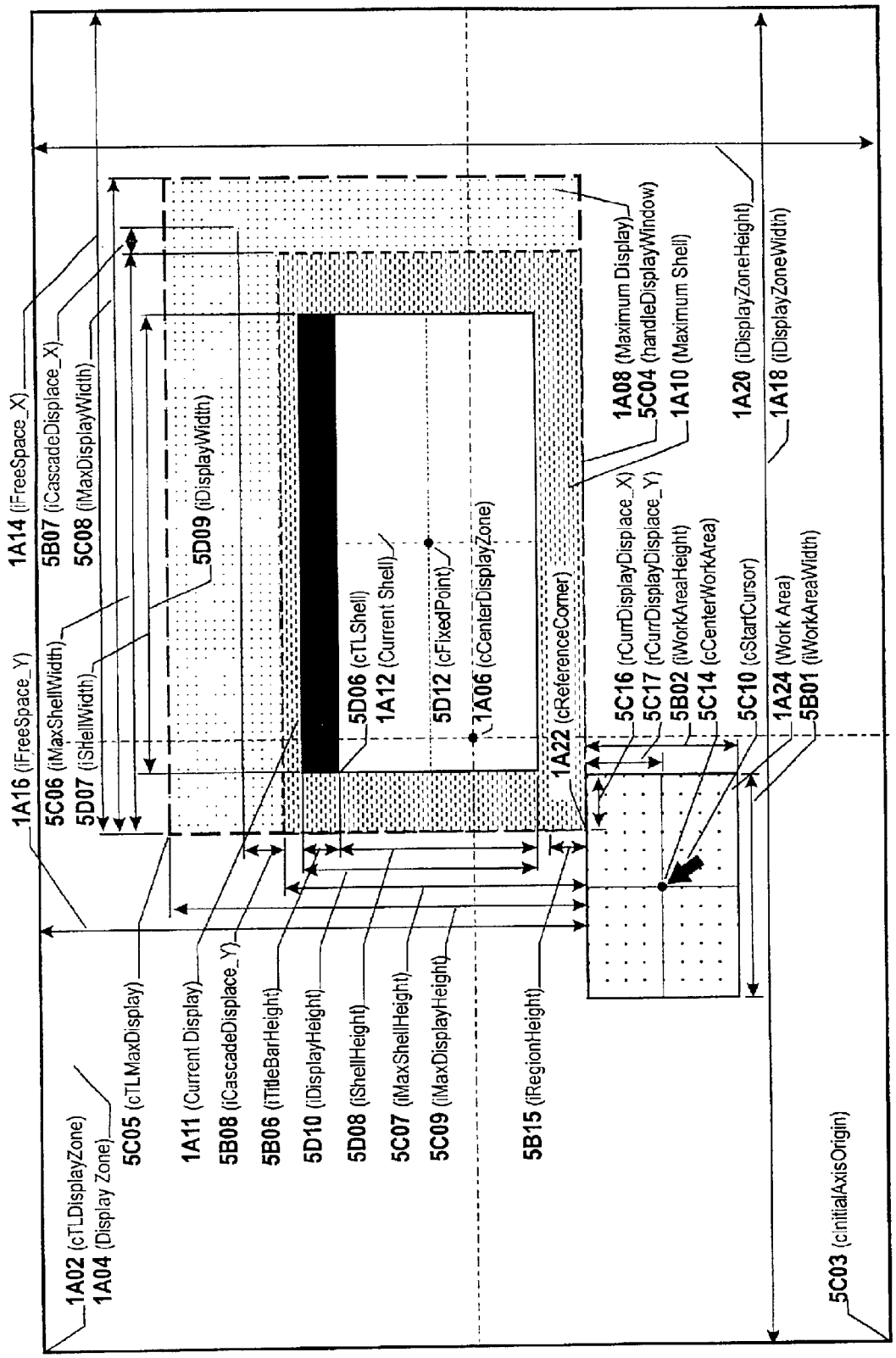
FIG. 1A is a diagram depicting the interrelation between the work area, maximum display, maximum shell, and current shell with relevant parameters identified

Data structures of FIG. 5 disclosed by the preferred implementation define terminology for many specialized concepts of this invention. The following definitions cover concepts not expressed as elements of the data structures:

Anchor-point A coordinate of each control specified relative to the origin of each different control type used to position the control when displayed.

Abort The management area capability that reverses all services performed during the current activation of the Control Subsystem, unpaints the control display, returns the user to the calling application, and terminates the Control Subsystem.

Active display Any device capable of providing visual display of the control paths and subsequent user interaction with these controls. Commonly an active display will be a CRT or plasma display.

Ascendant control An ancestor control; i.e., a control that has been previously displayed during a current activation of the Control Subsystem.

Best location The location of the maximum display closest to the optimum location that avoids clipping.

Backward cascade A format for display of ascendant controls in which the anchor-point of each successive current control is superimposed on the fixed-point. Each ascendant control is displayed up, to the side, and behind its child control.

Cancel The management area capability that reverses all services performed by the current control and returns the user to the most recent ancestor control containing Done. If no ancestor control contains Done processing transfers to the calling program.

Center-seeking The positioning of the maximum display so the reference-corner is generally moved away from the center of the work-area and toward the center of the display-zone.

Control Any graphic of a User Graphics Interface that receives or provides data.

Control display All graphics visible at any given moment of a Control Subsystem activation that displays the current control and any ascendant controls.

Control path The ordered, permitted sequence of controls that extends from an initial specified control to a most recent requested control.

Control Subsystem The procedures that contain computer instructions that display control paths and respond to user manipulation of these controls.

Current control The most recently displayed control of a control path.

Descendant controls Progeny of any given control.

Display window The window into which the control display is rendered.

Display-zone Any delimited area of the CRT screen within which the display window can be rendered.

Done The management area capability that identifies the most recent ancestor containing the Done capability, unpaints all descendants of this ancestor and redisplays this identified ancestor If no such most recent ancestor is identified the action is equivalent to Exit.

Exit The management area capability that unpaints the control display, returns the user to the calling application, and terminates the Control Subsystem.

Fixed-point The coordinate from which the location of each control of a control display is determined.

Free-space The distance between a coordinate of the reference corner and the most distant border of the display-zone in the relevant dimension.

Ghost control A partially overlaid, ascendant control containing no detail other than its identity and position within the control path to reveal its purpose and generation number.

Management area Choice-selections within a control that assist the user in navigation of the control display.

Maximum display A hypothetical bounding rectangle having dimensions derived from dimensions and generation number of the larger controls that could be displayed during any given activation of the Control Subsystem.

Maximum shell The shell having dimensions that are either the absolute or expected maximum dimensions to be encountered during a current control subsystem activation.

Optimum location The location of the maximum display when positioned in center-seeking direction according to the user supplied parameters rDisplayDisplace_X, 5B03, and rDisplayDisplace_Y, 5B04, Origin The upper-left corner of the display window.

Pseudo-Message A self-defining expression of FIGS. 6 through 11 that refers to whatever code is required by the operating system's Graphic User Interface programming language to accomplish the intent of the pseudo-message.

Reference point The corner of the maximum display closest to the center of the (or reference corner) work-area when the maximum display is in center-seeking position.

Region A delimited area of various shapes within a control that displays a single choice-selection as illustrated by the menu and combo box controls or one or more related targets as illustrated by the toolbar.

Reverse service Return to the system state that existed prior to performance of the service being reversed.

Reverse traverse The progression from the current control backward through the control path.

Spider format The format of control display illustrated by FIGS. 2A3, 3A1, and 3A4. These illustrations require inclusion of a management area as suggested by the generally circular or oval centers of FIGS. 3B through 3G.

Service A generic reference to any of the individual activities that may be performed via a control.

Shell The set of contiguous regions of a control or the bounding rectangle that encompasses a set of related, disjoint controls.

Vertical-Linear format A control presenting a vertically aligned column of equal-sized rectangular regions.

Work-area The area of the screen determined to be of current interest to the user at the time the Control Subsystem is activated. The work-area may be either explicitly identified by delimiting marks such as highlighting, underline, etc., implicitly identified by the area surrounding the cursor, or by other appropriate means.

Strings in bold font represent reserved words that either identifies data types or functions presumed available to the implementing program language or suggestive of names of messages presumed available to the operating system. Strings not in bold font employ conventions to aid their interpretation. Longer strings commonly contain embedded capital letters. Such strings comprise concatenated substrings that start with capitalized words or abbreviations selected to suggest their purpose. Strings that commence with capital letters identify procedures or functions. Data types are named via strings that commence with one or more lower case identifying letters:

| | |
|---|---|
| a | → array |
| b | → Boolean |
| c | → (X,Y) i.e., an array containing the coordinates of a screen location. |
| i | → integer |
| handle | → the window created during each Control Subsystem activation in which the current display is rendered. |
| ll | → linked list |
| n | → node of a linked list |
| p | → pointer |
| *p | → reference to variable pointed to by "p" |
| r | → a record or real variable (context will identify usage) |
| s | → string of characters |
| set | → a related grouping of objects |

Data types are combined into data structures with component parts designated using dot notation, ".". Thus, rDisplayParms.aControl[Menu].rVar.ilconWidth, 5B12, references the ilconWidth integer variable in the "Menu" th rVar record of the aControl array of the rDisplayParms data structure.

Reference numbers in the figures are formatted according to the notation template "cSpxx". The left-most integer, "c," numerically identifies one of the eleven categories of figure; each category dedicated to illustrating or disclosing an aspect of the invention. Categories are, in turn, divided into related but separate subjects identified by a capitalized letter represented by "S" in the notation template. When presentation of the material of a subject requires more than one page, the "p" in the notation template identifies the page of a subject. If disclosure of a subject requires a single page, the "p" is deleted for succinctness to give a notation template of "cSxx". The "xx" identifies a particular item within the page. The "xx" values on a page carry no implication except for the notation "00" which denotes the beginning of a subject within a category.

FIG. 5 applies this convention in an implicit manner to provide an equivalent reference capability without the repetitive appearance of the full template notation. In FIG. 5 each variable of the five data structures disclosed by the preferred implementation is identified via a two-digit string commencing with "01" for each data structure; the "cS" portions of the template notation being implied by the page identification. However, when reference is made to variables of FIG. 5 the appropriate "cS" notation is prefixed. An example of this notational approach appears with the reference of FIG. 1A. FIG. 1A visually depicts and provides the informative label, "cTLShell," to denote that this variable represents coordinates of the top-left corner; i.e., the origin, of the graphic object "current shell," 1A12. FIG. 5D explicitly shows that 06 is the coordinate array of the "rCurrent-Display" record of a node, nCD, of llnCD, 5D00; a linked list data structure. The precise definition of 5D06 is provided in the lower portion of FIG. 5D under "Definitions."

FIG. 4 is a series of diagrams and FIGS. 6 through 11 are a series of flowcharts that commence with highest-level disclosure and devolve into detailed disclosure. When the diagram is not at the most detailed level of disclosure, an oval shape is employed to communicate that the disclosure identified within the oval is expanded into greater detail in a subsequent figure. Rectangular shapes represent the most detailed level of disclosure. Boundaries of these shapes are either solid or broken. Solid line boundaries denote that the disclosure is complete and subsumed by this invention unless sub-processes with broken lines appear within the related flowchart. Broken line boundaries communicate one of two interpretations. The first interpretation is that further disclosure regarding the purpose of the shape can only be affected through procedures specific to a particular computer on which the invention is implemented. The second interpretation is that the current invention does not subsume the capabilities specified; these capabilities being indicated only to provide the reader with better understanding of how the invention interacts with the host computer. The applicable interpretation is provided by context.

OVERVIEW

The invention discloses that display of a control commences with determination of the maximum shell dimensions shown in FIG. 1A by 5C06 and 5C07. The number of descendants that can be encountered is then determined and employed in conjunction with work-area location, 5C12 and 5C13, and coordinates of its center, 5C14, to determine the best location for the maximum display 1A08. While encompassing the use of explicitly defined work-areas, this preferred implementation illustrates the work-area concept via an implicit work-area centered on the location of the cursor hot-spot, 5C10, at the time of Control Subsystem activation. This approach makes the cursor location coincident with the work-area center, 5C14. Processes within allocate resources for the "Display Window," 5C04, into which the requested control and its ascendants, if any, will be rendered. Knowing the maximum display dimensions, 5C08 and 5C09, the work-area dimensions and center, and the display-zone dimensions 1A18 and 1A20 and the display-zone center, 1A06, permits determination of the best position for the maximum display. Once the best location of the maximum display is determined, the origin of the maximum shell can be determined and from this information the coordinates of the "Fixed-Point", 5D12, can be calculated; namely, those coordinates that are the datum for locating the initially requested control and any of its descendants. After calculation of the fixed-point, the shell dimensions of the initial control requested, 5D07 and 5D08, are determined and the origin, 5D06; i.e., the top-left corner, of this shell is calculated. These values are employed to position and dimension the previously allocated display window in a manner to minimally contain the graphic that is the visual manifestation of the initial control. Procedures not within the scope of this invention are now employed to render the requested control in the format being utilized by the active application; i.e., Vertical-Linear, Spider, or application specific. Once the current display is rendered, procedures also not within the scope of this invention are employed to respond to user manipulation of the current display. While manipulating a control, the user may request single and possibly multiple services, request display of a descendant control or redisplay of an ascendant control, or may explicitly terminate the current Control Subsystem activation. With the menu and toolbar controls the user may also request the alternate control be displayed. If the user requests a descendant control, the generation number of the control, the dimensions of its shell, and the location of the fixed-point are employed to determine dimensions and location of the updated display window. When painting the display to the active display initial processes convert all ascendant controls into ghost format and paint them in backward cascade as exemplified by 2A301 and 2A201 of FIG. 2A4. Only then is the currently requested shell and accompanying title bar painted.

Execution of requisite messages employed within the computer that accomplish these activities is specific to each operating system and presumed fully documented by vendor manuals pertaining to programming of the Graphic User Interface. Consequently, the preferred implementation of this invention does not detail the interactions between the processes that capture and screen the message stream and the interaction they have with the more fundamental resource allocation activities of the operating system depicted by 6A00 of FIG. 4A. Thus, when the Application-Master Call Module identifies messages not related to the Control Subsystem they are passed to "Non-Control Activity," 6A08 of FIG. 4A, for processing by procedures outside the purview of this invention. Activities that are performed by such system specific messages are represented by "Pseudo-Messages;" namely: generic massages expressed via self-evident generic names that indicate the desired action. It is presumed that one or more actual messages specific to the computer's operating system are available to achieve the purpose of any particular pseudo-message. How the operating system actually implements this functionality is not subsumed by this invention.

HIGH LEVEL DISCLOSURE OF THE PREFERRED IMPLEMENTATION

Figure 4A:
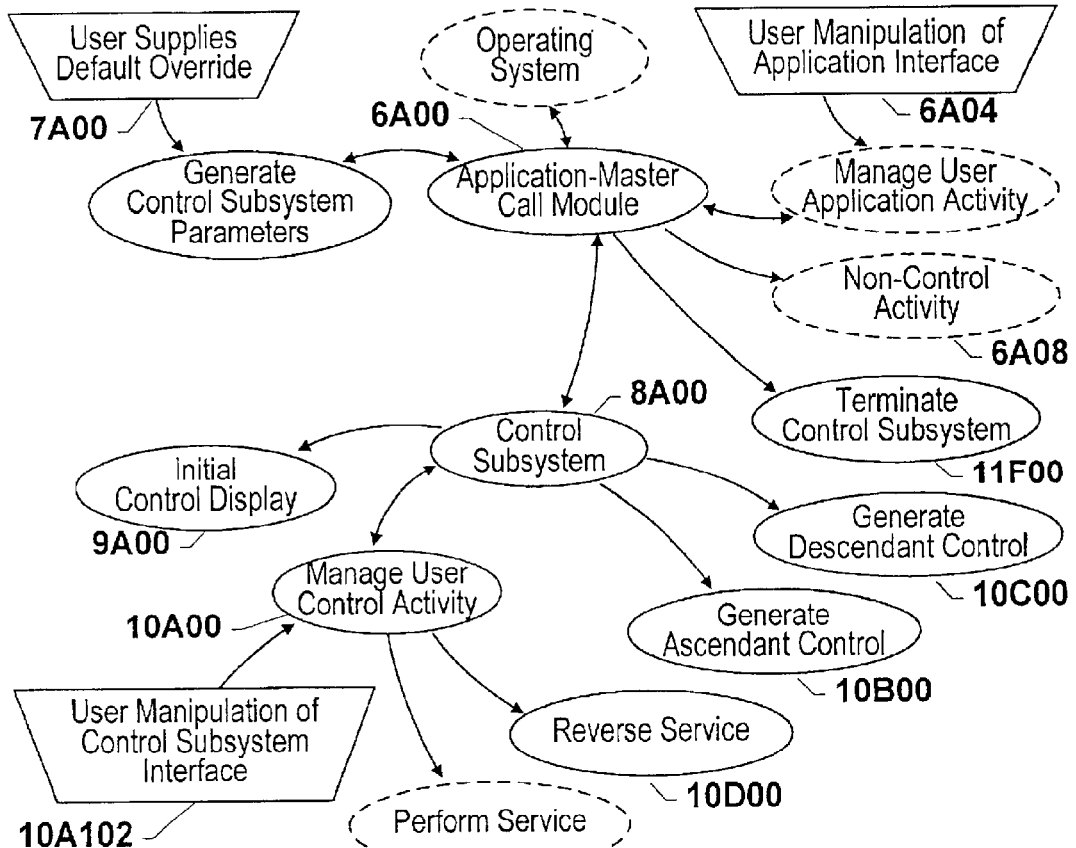
FIG. 4A is a flowchart that discloses the highest level aspects of how the preferred implementation of the invention integrates with other computer software.
Figure 4B:
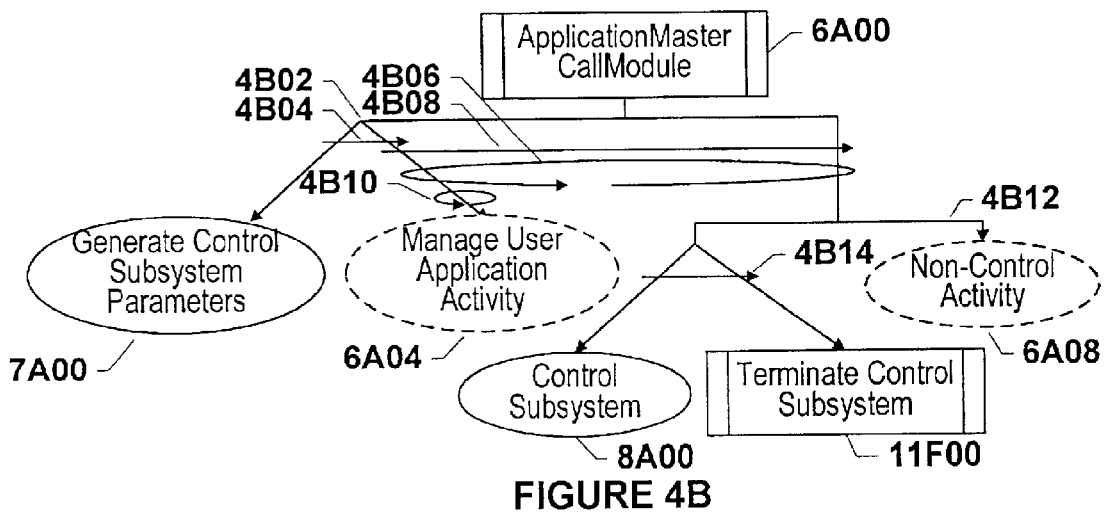
FIG. 4B is a flowchart that discloses the highest level aspects of how the preferred implementation interacts with the computer during and after an activation of the control subsystem.

FIG. 4A presents the highest-level disclosure of processes involved in the positioning and management of control displays. The operating system being utilized initially activates the Application-Master Call Module, 6A00, which is presented in a suggestive format to communicate how activation of the Control Subsystem is managed. The capabilities of 6A00 are more extensive than here indicated since those processes of that perform the functionality of the current application software are not detailed by this invention. As proposed herein an early activity of the Application-Master Call Module is to perform parameterization, 7A00, for variables that do not vary during a computer run. It is to be appreciated that since this invention relates only to some aspects of a fully functioning Control Subsystem, parameterization of a complete Control Subsystem entails parameters that are not detailed by the present invention. Upon completion of parameterization, manages four additional categories of activity. The most frequent of these are generally the "Manage User Application Activities", 6A04, and "Non-Control Activity", 6A08, which together encompass all computer activity not related to the Control Subsystem. Neither of these categories is within the purview of this invention. Another activity of 6A00 is activation of the Control Subsystem, 8A00, to affect display of the initial control, 9A00. This may be initiated either by the user or by a process of the active software. Processes of 8A00 subsequently respond to user manipulation of the current control via 10A00. Processes 10A00, in turn, activate processes that perform requested services, 10A208; activities also not within the scope of this invention. Once system activity returns to the Application-Master Call Module, processes of 11F00 terminate the Control Subsystem.

FIG. 4A does not disclose the ordering and repetition of activities permitted during user manipulation of the Control Subsystem. Once the Application-Master Call Module is entered, FIGS. 4B through 4G disclose this ordering and repetition but interpretation of these figures does require an understanding of conventions employed. All paths that radiate from a single point, illustrated by 4B02, are to be taken while a horizontal line, illustrated by 4B12, that connects vertical paths denotes choices that can be performed in arbitrary order, in constrained order, or not performed at all. A circular arrow, illustrated by 4B10, denotes that the path and any paths that branch below the circular arrow can be successively performed an arbitrary number of times. A horizontal arrow passing through two or more paths denotes the chronologic order of their performance. Thus, arrow 4B04, by connecting the two required paths radiating from 4B02, denotes that 7A00 must be performed before the user can manipulate the application interface, 6A04. Once the user can manipulate the application interface, he/she may perform such successive activities as mouse moves, pauses, keying, etc. If the user requests the application to perform an activity, either an application specific activity is performed with processing then passed to 6A08 or the Control Subsystem, 8A00 is requested. Arrow 4B14 communicates that because the paths intercepted radiate from a single point, once the Control Subsystem is activated via module 8A00 it must be terminated by processes of 11F00 before any other non-control activity can be performed. The circular arrow 4B06 denotes that once 8A00 and 11F00 or 6B08 are complete processing returns to 6A04 to await further user manipulation of the application interface. The result is that activation of the Control Subsystem or any non-control activity can be performed in arbitrary order any desired number of times.

Figure 4C:
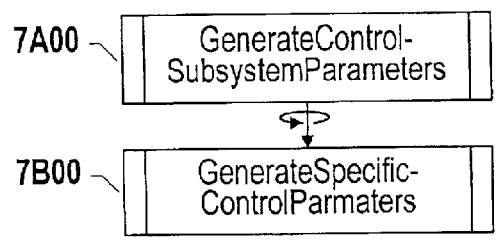
FIG. 4C is a flowchart that discloses high level aspects for the declaration of parameters of the invention that seldom change.

FIG. 4C communicates that parameterization of the Control Subsystem, as opposed to subsequent parameterization for particular subsystem activation or parameterization for particular control display of a particular subsystem activation, comprises two activities. The GenerateControlSubsystemParameters, 7A00, processes solicit parameters common to all control types. Processes of 7B00 exist to solicit parameters specific to each different control type.

Figure 4D:
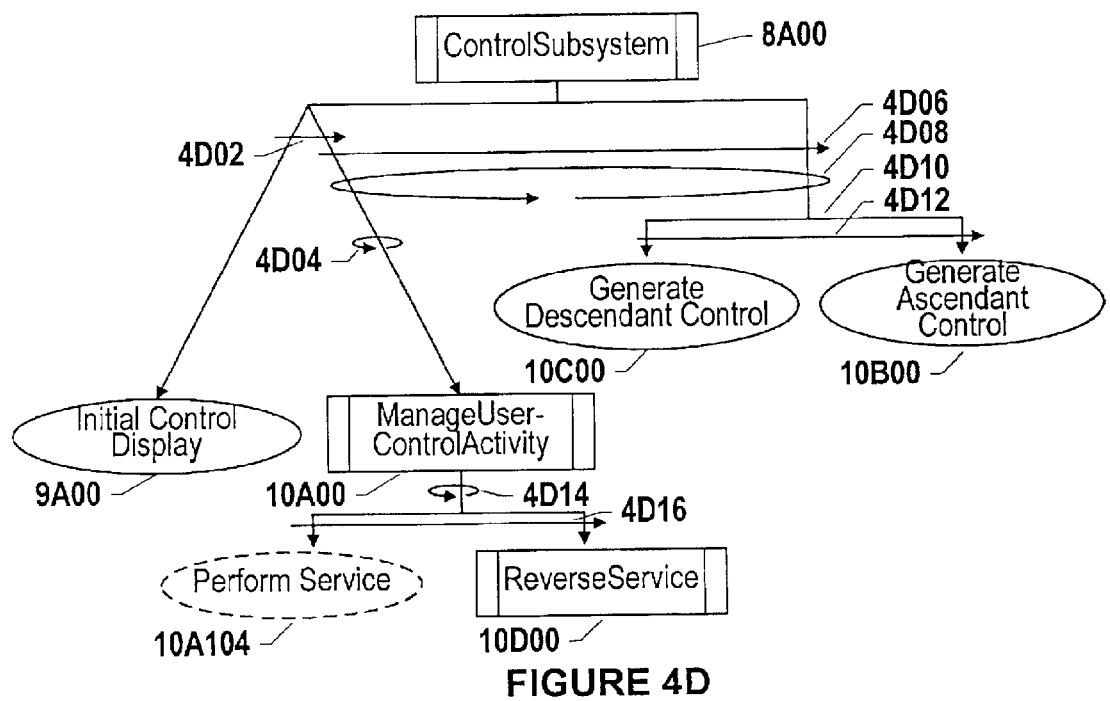
FIG. 4D is a flowchart that discloses the highest level processes and order in which they are performed by the control subsystem during any given activation.

FIG. 4D provides high-level detail of the ControlSubSystem, 8A00, which are the processes responsible for overall management of Control Subsystem activation. Arrow 4D02 denotes that the initial display, 9A00, must occur prior to user manipulation, 10A00, of that display. Circular arrow 4D04 denotes that an arbitrary number of user activities may be performed once the control is displayed. Such user activities are suggested by but not limited to mouse move, pauses, and cursor control keystrokes. Arrow 4D06 denotes that choices available via horizontal line 4D10 cannot be performed unless processes of 10A00 have been performed at least once. Circular arrow 4D14 denotes that the user may invoke services but 4D16 constrains reversing services until after at least one service has been performed. The circular arrow 4D08 denotes that the user might perform actions resulting in repeated requests to perform a service or to display descendant or ascendant controls. Arrow 4D12 imposes a constraint on when 10B00 can be performed by denoting that 10B00 cannot be activated without prior Control Subsystem, 9A00, activation and subsequent display of one or more descendant controls, 10C00.

Figure 4E:
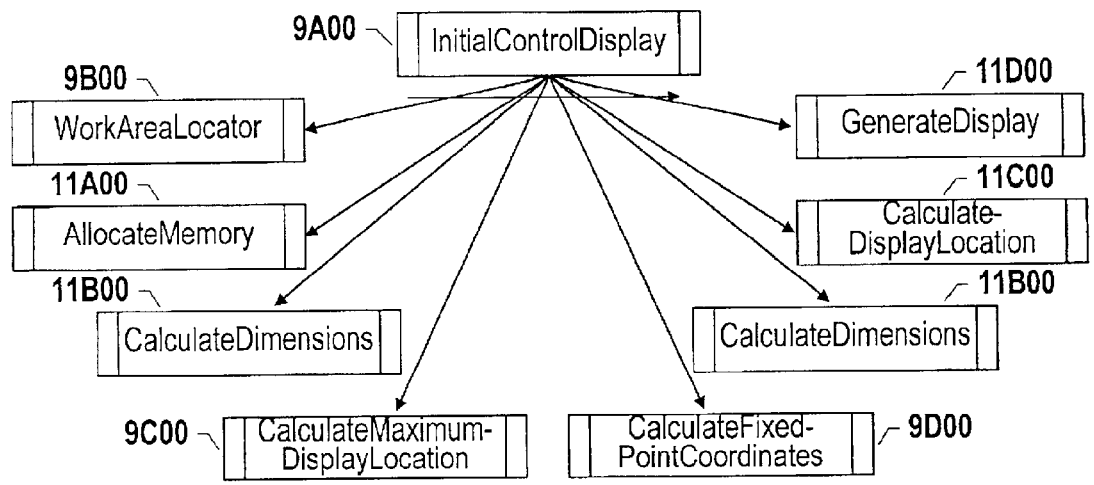
FIG. 4E is a flowchart that discloses high level aspects of how the positioning and rendering of the initial control display for any control subsystem activation is accomplished.

FIG. 4E discloses that processes of 9A00 of FIG. 4D devolve into eight processes performed in sequence. At Control Subsystem activation, processes of 9B00 first determine the work-area location. Memory is then allocated via AllocateMemory, 11A00. Processes of 11B00, 9C00, and 9D00 disclose the procedures that achieve the center-seeking, work-area avoidance, and fixed-point aspects of this invention. While the preferred implementation does suggest an approach for determination of the absolute maximum dimensions for the maximum display, module 11B00 returns the dimensions of a specified largest graphic that are presumed to be provided by system specific processes not subsumed by this invention. The maximum dimensions returned by CalculateDimensions, 11B00, are utilized by CalculateMaximumDisplayLocation, 9C00, in conjunction with the work-area parameters and specified displacements, 5C16 and 5C17, to determine the screen area that is used to display any possible sequence of the control's descendants. After dimensions and location of the maximum display are determined, CalculateFixedPointCoordinates, 9D00, utilizes these values in conjunction with other parameters to determine coordinates of the fixed-point, 5D12. Processes 11B00, 11C00, and 11D00 are responsible for rendering the requested initial control onto the active display. If the requested control is either the menu or toolbar—which commonly have fixed selections for the initial display—their dimension can be predetermined for storage at 5B29 through 5B32. Processes of 11B00 detail the preferred approaches for determination of these dimensions. Processes of 11C00 calculate the position of the control display based on the dimensions of the shell, the coordinates of the fixed-point, and the displacement of the top-left corner of the display from the fixed-point. Lastly, 11D00 employs procedures, not all of which are subsumed by this invention, to render the requested control to the display window.

Figure 4F:
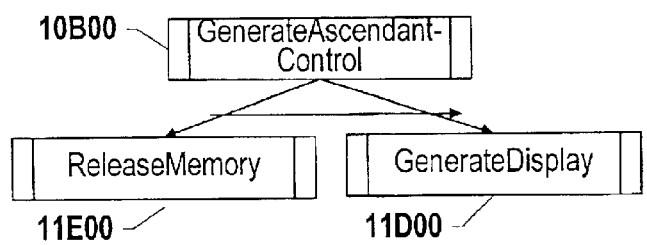
FIG. 4F is a flowchart that discloses high level aspects of how the positioning and rendering of a requested ascendant control of any control subsystem activation is accomplished.

FIG. 4F discloses the high level processes of 10B00 that manage requests for the redisplay of ascendant controls. ReleaseMemory, 11E00, releases all memory previously allocated for management of descendant controls rendered out of scope by the request to redisplay a prior control. Since the data structure 5D00 stores parameters required to regenerate a previously displayed control of the current Control Subsystem activation, the only other processes of 10B00 are to render the requested previously displayed control via 11D00.

Figure 4G:
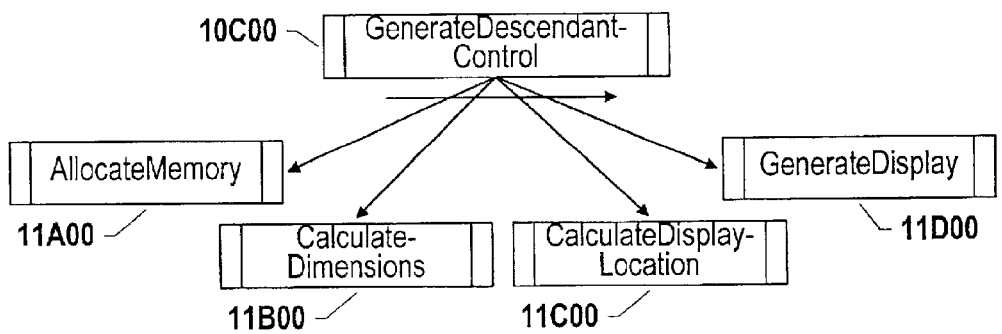
FIG. 4G is a flowchart that discloses high level aspects of how the positioning and rendering of a requested descendant control of any control subsystem activation is accomplished.

FIG. 4G presents high-level disclosure of how descendant controls are displayed by processes of 10C00. Since descendant controls will generally not be known in advance, necessary parameters are generated only after the descendant control is identified. Processes of 10C00 first activate 11A00 to allocate the memory required for storage of requisite parameters. Although employing different parameter values, CalculateDimensions, 11B00, performs the same processes noted above that determined dimensions of the initial display. Based on coordinates of the fixed-point, processes of 11C00 next determine the location for the control to be displayed. Lastly, processes of 11D00 render the display on the active display.

DETAILED DISCLOSURE OF THE PREFERRED IMPLEMENTATION

The detailed disclosure of the preferred implementation is presented in four parts: the master controlling procedures of the Control Subsystem, determination of the display location and generation of the initial control, response to user manipulation of the control display, and support capabilities.

Figure 6A:
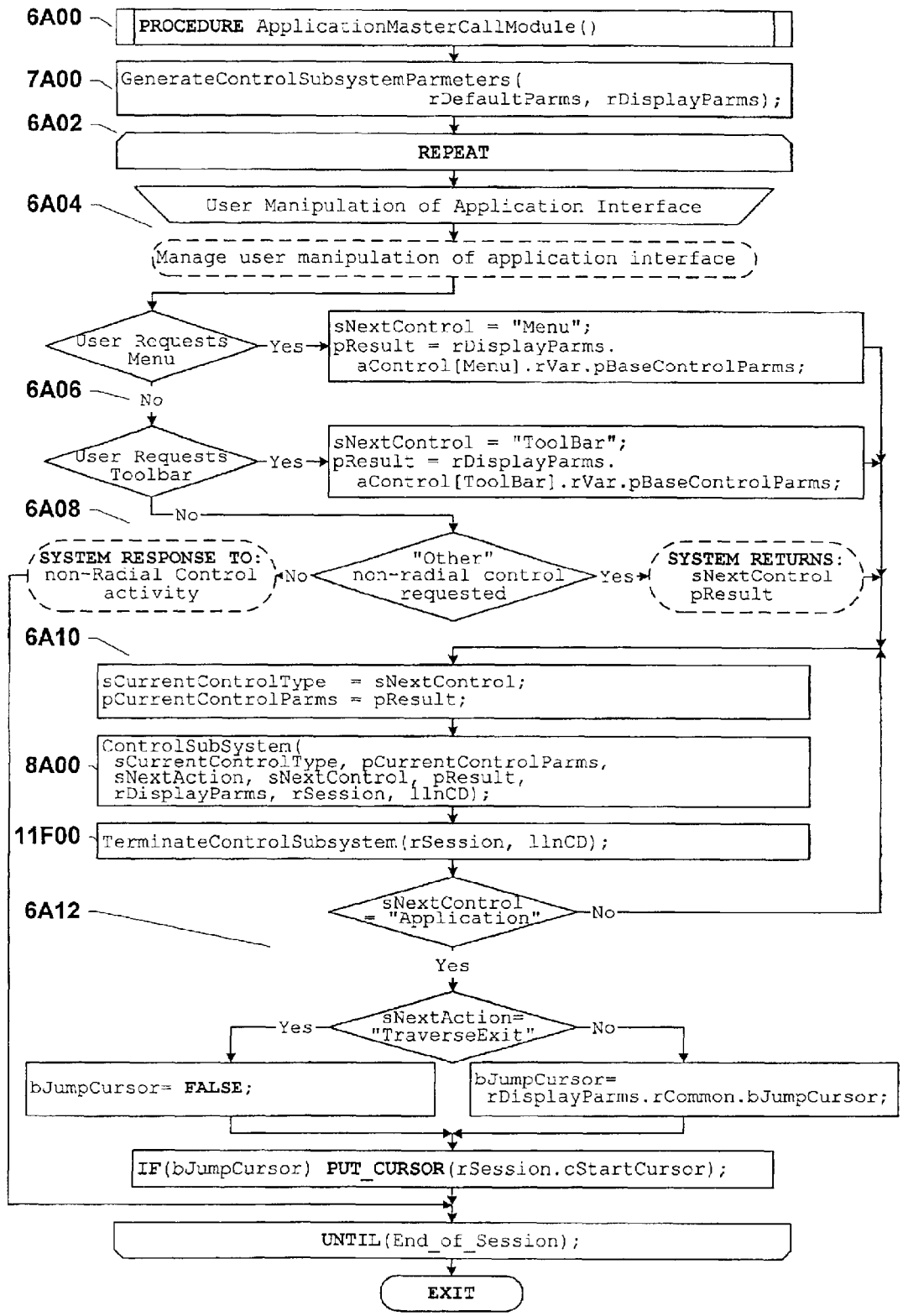
FIG. 6A is a flowchart that discloses the processes that identify a request for activation of the control subsystem, manage its activation and termination, and respond to user manipulation of said activation.
Figure 8A:
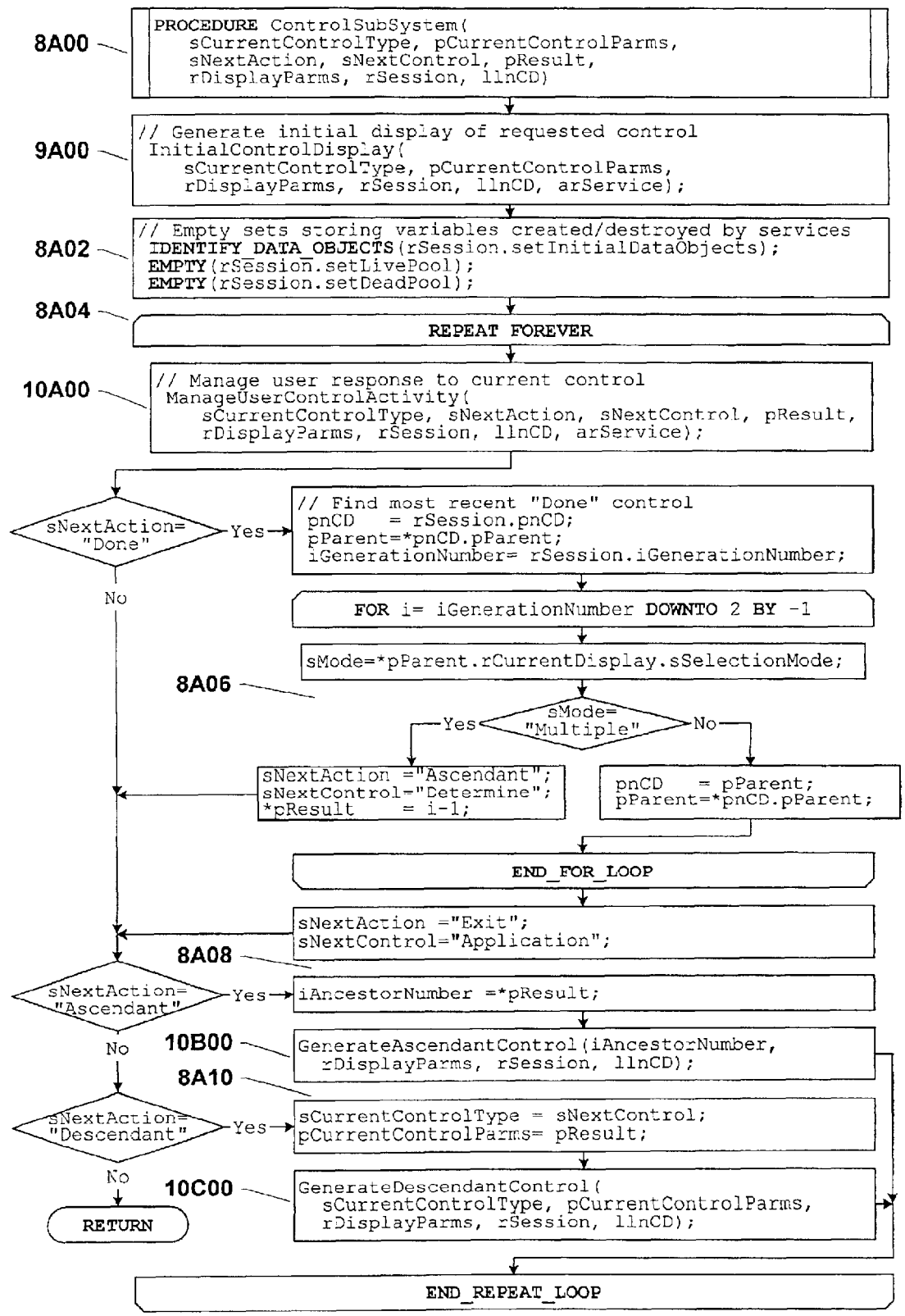
FIG. 8A is a flowchart that discloses the processes that initiate activation of the control subsystem and determine appropriate response to user requests for display of a requested ascendant and descendant control.

Detailed Disclosure of the Master Control Procedures of the Control Subsystem FIG. 6A is the master calling routine that manages how the Control Subsystem interacts with the application software. Processes of 7A00 activate the processes of GenerateControlSubsystemParameters immediately after start-up of the application software is complete. While parameters generated by 7A00 can be generated under various timing scenarios, to minimize demands on computer resources and assure timely display, the timing proposed is the one preferred. An endless loop is entered at 6A02 upon return from the 7A00 processes. Within this loop the initial processes, 6A04, performed are those of the application software that manage overall user activity. Although most user activity on application software is unrelated to the management of controls, screening user activity at this stage permits identification of requests for activation of the Control Subsystem. Processes of 6A06 perform this screening by initially determining whether a user activity is a request for either the menu or toolbar control. If either of these controls has been requested, two arguments are loaded at process 6A10 and passed to ControlSubSystem, 8A00. The first of these arguments, sNextControl, is loaded with a string identifying the type of control requested. The second argument, pResult, is loaded by extracting the pointer pBaseControlParms, 5B28, from data structure 5B00. This pointer points to a system defined data structure containing parameters relating to either the menu or toolbar system. Being system dependent, this invention presumes that persons of appropriate skill will write code to access and utilize the requisite data structures.

If the user has not requested either the menu or toolbar control, system specific processes at 6A08 are available to further evaluate user activity and provide appropriate response. If a non-control activity is requested, processes outside the scope of this invention are engaged with subsequent processing then continued at 6A04. If results of 6A08 indicate a control has been requested by the application or operating system, it is presumed that appropriate system processes load the variables sNextControl and pResult.

In anticipation of values returned in sNextControl and pResult during prior activity of the Control Subsystem, the processes of 6A10 load the values currently in these two variables into alternate temporary variables immediately before activation of the processes of ControlSubsystem, 8A00. Upon return from ControlSubsystem, 8A00, the processes of TerminateControlSubsystem, 11F00, are performed to terminate the current activation of 8A00. Processes of 6A12 now reference values in the arguments sNextControl and sNextAction returned from 8A00 to determine the next processes to perform. If sNextControl contains "Application" there is direct return to 6A04 with the method of return determined by the value contained in the argument sNextAction. It will be disclosed by FIG. 10A that sNextControl and sNextAction together return two category of values; those that denote display of a child or ancestor control handled by processes of 8A00 and those that identify the type of post control termination activity for handling by 6A00. When the value in sNextControl is "Application" sNextAction will contain either the string "TraverseExit" or "Exit". "TraverseExit" denotes that the user has explicitly traversed the cursor beyond the bounds of the display window, 5C04. This is interpreted as the user requesting return to the application system with all selected services maintained but with no automatic jump of the cursor by Control Subsystem processes to the coordinates stored in cStartCursor, 5C10. Detection of "Exit" produces the same result as "TraverseExit" except the cursor will be jumped to the cStartCursor location if the user has parameterized variable bCursorJump, 5B09, to give this result.

If sNextControl does not contain "Application", it will contain either the string "Menu" or the string "Toolbar". When 6A12 does not detect "Application" in sNextControl, processing returns to 6A10 to reactivate the Control Subsystem for display of the indicated alternate control. This enables the Control Subsystem to provide automatic toggling between these two controls via selection of the 3B06 area of FIG. 3B or 3C. As example, upon realizing the currently displayed toolbar does not offer a desired service the user is able to request from within the toolbar immediate display the menu with its generally greater offering of services. Without this capability, the user would be required to explicitly exit the pop-up toolbar then explicitly activate the pop-up menu.

Processes of FIG. 7 are designed to offer the user the opportunity to override defaults provided by designers of the Control Subsystem and presented via the rDefault, 5A00, data structure as variable values generally appropriate for the rDisplayParms, 5B00, data structure. It is expected that in general the processes of 7A02 through 7A08 will be more commonly used to override defaults for the rCommon array of 5A00 than will the processes of 7B02 through 7B10 be used override defaults of the rVar arrays of 5A00. This is because the rVar parameters generally relate to the visual appearance of any current control whereas the rCommon array parameters generally relate to overall placement and appearance of the control display on the active display. The processes presented by FIG. 7 are deliberately general as these are processes that are likely to be altered to meet exigencies of each particular application and operating system and are readily understood by any person having normal skill in these arts.

FIG. 4D communicates that ControlSubSystem, 8A00, performs two primary activities. The first activity performs initial Control Subsystem start-up activity. This involves activation of InitialControlDisplay, 9A00, to calculate values that control the positioning, determine the fixed-point, and render the initial display to the screen. The processes of 8A02 then execute a pseudo-message to obtain a listing of data objects extant within the application program at the time the Control Subsystem is activated. This capability is system dependant and presumed provided by persons with appropriate knowledge of the application's source code. 8A02 finally empties the data sets employed to manage creation and destruction of data objects during performance of services. Second, an iteration sequence is entered at 8A04 that immediately enters processes of 10A00 to interpret and respond to each user manipulation of the control display.

Processes 8A06 and 8A08 then respond to requests by the user to perform reverse traverse. For controls that display a selectable area identified by terms synonymic with "Done", 3B14, and possibly a selectable area identified by terms synonymic with "Cancel", 3B16, this invention provides staged reverse traverse that is managed by processes of 8A06. Staged reverse traverse is initiated when the user selects "Done" or "Cancel" or an implicit "Done" is emitted upon user selection from a single-selection control. Selection of one of these areas results in ManageUserControlActivity, 10A00, loading the string "Done" into the returned argument sNextAction. While "Done" is traditionally provided when the user can request multiple services from commonly available combo box and dialog box controls, it will be seen in disclosures below that availability of the "Done" and "Cancel" capabilities can also enhance the usability of the menu and toolbar controls. When "Cancel" is selected—subject to qualifications noted below—all services that have been requested via the current control are reversed. As will be detailed below, when reversing specified services performed within 10A00, it suffices to return the string "Done" to 8A06. When the test at detects the string "Done" the current generation number is fetched from 5C11 and used to initialize a decrementing loop that performs reverse traverse of the IlnCD nodes, 5D00, via the pParent pointer, 5D01. This scan locates the most recent ascendant control containing the string "Multiple" in the sSelectMode, 5D13, variable. If such an ascendant control is found, sNextAction is loaded with the string "Ascendant" and the location pointed to by pResult is loaded with the generation number of the ascendant control identified. Processing continues at 8A08, which treats the staged reverse traverse as if it were a request for redisplay of an arbitrary ascendant control. If the search for an ascendant control containing a "Multiple" is unsuccessful, sNextAction is loaded with "Exit" and sNextControl is loaded with "Application". These latter values will assure that the Control Subsystem is exited and then terminated by FIG. 6A00 via 11F00 with subsequent processing continued at 6A12.

The 8A08 processes test the value returned in sNextAction for the string "Ascendant" which denotes that a previously displayed control of the current Control Subsystem activation is to be redisplayed. The "Ascendant" value is present under one of three conditions: (1) the user has explicitly requested redisplay of an arbitrary ascendant control via selection of either a ghost control or an area within the control, of FIG. 3B or 3C, that explicitly identify the ascendant control requested, (2) the user has explicitly initiated a "Done" of "Cancel" action, or (3) the user has implicitly initiated a "Done" selection via a single-selection control. The generation number of the requested ascendant control is loaded into the memory pointed to by pResult either directly by ManageUserControlActivity, 10A00, or indirectly as result of 8A06 processes. Processes of 8A08 load the value pointed to by pResult to the temporary variable iAncestorNumber before the processes of GenerateAscendantControl, 10B00, are entered to redisplay the ascendant control. See 10B00 for disclosure of the processes involved in such redisplay.

Processes of 8A10 test the argument sNextAction for the string "Descendant" which denotes that a child of the current control is to be displayed. When a child control is requested, the string identifying its type is returned from 10A00 in the argument sNextControl while the address pointing to the application specific data structure defining this control is returned in the pResult argument. Once these values are loaded into sCurrentControlType and pCurrentControlParms respectively, processes of GenerateDescendantControl, 10C00, are initiated to render the requested descendant display. See 10C00 for disclosure of the processes involved in display of a child control.

Figure 9B:
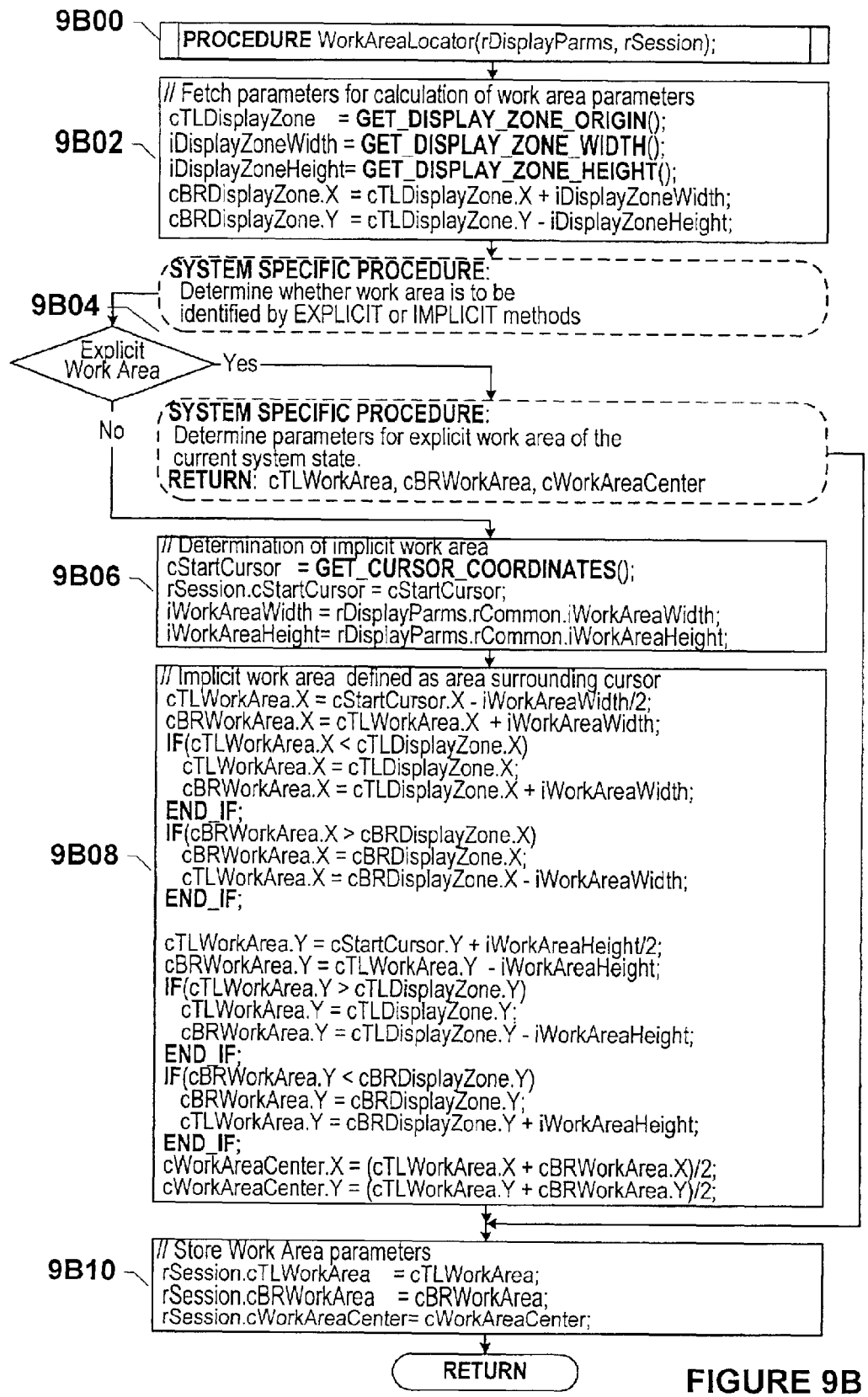
FIG. 9B is a flowchart that discloses the processes that determine the location of an implicit work area.

Detailed Disclosure for Determination of the Display Location and Generation of the Initial Control At Control Subsystem activation, the 9B00 processes of FIG. 9A identify the type, location, and dimensions of the work-area. Processes of 9A102 first load all elements of the arServiceHistory, 5E00, data structure with "null", to prepare for possible service reversal. 9A102 then loads parameter values from storage preparatory to allocation of memory for a IlnCD node, 5D00. This entails loading "null" to pnCD, 5C01, and "1" to iGenerationNumber, 5C11, of the rSession, 5C00, data structure to indicate to 11A00 that it is a Control Subsystem activation rather than an update to a currently active Control Subsystem that is being performed. Upon return from 11A00, processes of 9A104 send pseudo-messages that obtain: (1) coordinates of the initial axis origin, 5C03, (2) query whether selection mode of the control is single selection, multiple selection, or permits the user to determine selection capabilities, 5D13, (3) obtain the title of the currently active application, 5D05, and (4) and obtain the unique identification number, 5D14, of the requested control for use if undo activity is later requested.

It has been previously stated that to utilize this invention it is necessary to have available dimensions of a "maximum display" for each activation of the Control Subsystem that reflect a beneficial balance between juxtaposing the work-area and control display while simultaneously minimizing overlay of the work-area by the control display. The decision of 9A106 causes a branch to one of two system specific procedures: one determining the maximum likely dimensions; the other determining the absolute maximum dimensions. Maximum likely dimensions will generally be based on ordering the permitted control paths for the current Control Subsystem activation according to empirically determined probabilities of the user selecting each path. This reveals the frequency and extent to which dimensions of each possible path exceed the specified likely maximum dimensions. These results can be weighed against empirical evidence relating to the cost in increased error rates and decreased productivity due to the control display being either positioned excessively far from the work-area or overlaying the work-area. Irrespective of how acquired, values returned from the system specific processes of 9A106 are stored in the rSession, 5C00, data structure at locations 5C06 through 5C09.

Knowledge of the start cursor location, work-area dimensions and the selected dimensions of the maximum display are passed to CalculateMaximumDisplayLocation, 9C00, which returns the best location for the maximum display relative to the work-area. Once the location of the maximum display is determined, coordinates of the fixed-point are determined by CalculateFixedPointCoordinates, 9D00. It will be seen in disclosures of that in addition to calculating the fixed point, also translates the coordinate system to position its origin at the fixed-point. Benefits of this axis translation are detailed below. Processes of 9A202 now allocate computer resources required for the window into which the control display will be rendered. The identifier of these resources; i.e., the handle, is stored at 5C04. It is to be appreciated that this window is not rendered to the screen at this stage and may never be rendered with the maximum dimensions determined by processes of 9A106.

Once the fixed-point is determined calls to processes 11B00, 11C00, and 11D00 render the requested initial control—not the maximum display—to the active display. Width and height dimensions of the initial control are determined by CalculateDimensions, 11B00. Employing the dimensions returned by 11B00 and the coordinates of the fixed-point returned by 9D00, processes of CalculateDisplayLocation, 11C00, are activated to determine the best origin for the initial display control. The initial control display is now rendered to the active display by GenerateDisplay, 11D00. As detailed below, GenerateDisplay first configures and positions the window resources allocated by 9A202 to receive the display control. The final process, 9A204, positions the cursor at a location near the fixed-point to generally permit more rapid utilization of any control format.

This invention defines the "Display-zone" to be the area of the screen in which it is permitted to render a control display. Since this invention applies to any rendering of any applicable control into any defined, bounded region of the active display, pseudo-messages proposed by these disclosures that relate to the display-zone are interpreted as referencing whatever space it is that can clip the work-area or control display. Initial processes of 9B02 are provided to obtain relevant values for the display-zone by emitting pseudo-messages that return the origin and dimensions of the display-zone. From these values 9B02 determines the bottom-right corner of the display-zone.

Processes of 9B04 ascertain whether the work-area is implicitly or explicitly defined. Examples of explicit work-areas are highlighted screen areas, rubber-banded areas, such graphic objects as table cells, columns, and rows, etc. The first system specific procedure of 9B04 exists to determine if an explicit work-area is present. If an explicit work-area is detected, the second system specific procedure of is employed to determine coordinates of its origin, center, and bottom-right corner. Results returned are stored at locations 5C12 through 5C14 respectively. When an explicit work-area is not detected, this preferred implementation specifies the work-area to be a delimited area surrounding the cursor at the moment of Control Subsystem activation. Identifying a work-area in this manner in no way reduces the generality of this preferred implementation, as this invention only requires availability of a work-area location and its dimensions.

To generate an implicit work-area as here defined, processes of 9B06 fetch pre-specified dimensions from storage at 5B01 and 5B02 and employ a pseudo-message to obtain the cursor location at the moment of Control Subsystem activation. These dimensions are initially employed in conjunction with the cursor coordinates to determine the presumptive top-left corner and bottom-right corners of the work-area. If the X or Y coordinate of the cursor, 5C10, is closer to a display-zone boundary than one-half the related dimension for the work-area, the location of the presumptive work-area can be adjusted to avoid clipping. Processes of 9B08 implement these adjustments as appropriate. The top portion of 9B08 determines the X-coordinate of the top-left and bottom-right corners of the presumptive work-area and tests whether the left edge falls to the left of the left display-zone boundary. If so, the X-coordinate of the work-area origin is positioned on the left boundary of the display-zone. A test is now performed to determine whether the right edge of the presumptive work-area falls to the right of the right display-zone boundary. If so, the work-area origin is adjusted so the right edge of the work-area falls on the right boundary of the display-zone. The bottom portion of 9B08 performs appropriate analogous adjustment for the vertical positioning of the work-area. Final processes of 9B08 determine the work-area center. Once the location of the work-area is determined, processes 9B10 store the resulting cTL-WorkArea and cBRWorkArea coordinates in locations 5C12 and 5C13 with coordinates of the work-area center, cWorkAreaCenter, stored at 5C14.

FIG. 9C performs three inter-related activities: (1) determine the direction of center-seeking by appraising the center of the work-area relative to the display-zone center, (2) determine the optimum location of the maximum display based on user specifications, and (3) if the optimum location clips the maximum control display, determine an alternate, best location for the maximum display that avoids clipping. The first of these steps entails comparing the work-area center location relative to the display-zone center. Processes of 9C102 emit pseudo-messages to obtain necessary coordinates of the display-zone center and corners. Initial processes of 9C104 fetch corner coordinates of the work-area. Latter processes of 9C104 appraise work-area dimensions for unusual values and, as needed, adjust the two rDisplay-Displacement parameters, 5B03 and 5B04, that specify the user's desired placement of the control display relative to the work-area center. The user will specify values for the two rDisplayDisplacement parameters based on dimensions of anticipated, typical work-areas. However, when the work-area deviates from these typical dimensions, it is possible that values of 5B03 and 5B04 will not result in the most appropriate display location. The latter processes of 9C104 address this issue, but before considering how these processes handle unusual work-area dimensions it is first necessary to understand how to best position of the maximum display for the case of a typical work-area is determined.

Determination of the direction of center-seeking entails appropriate selection from among the four possible directions of the work-area center relative to the display-zone center. With quadrants of the display-zone consecutively numbered clockwise from the upper right, the following define the direction of center-seeking for each quadrant hosting the work-area center:

Quadrant #1: The maximum display is positioned down-and-left of the work-area.

Quadrant #2: The maximum display is positioned up-and-left of the work-area.

Quadrant #3: The maximum display is positioned up-and-right of the work-area.

Quadrant #4: The maximum display is positioned down-and-right of the work-area.

Processes of 9C106 determine the direction of center-seeking by appraising the center of the work-area relative to the center of the display-zone and applying the preceding criteria.

Once the direction of center-seeking is determined, for typical work-areas processes of 9C108 determine "Optimum coordinates", i.e., coordinates determined via the rDisplayDisplace, 5C16 and 5C17, parameters, for the "Reference corner"; i.e., the corner of the maximum display in a center-seeking location that is closest to the center of the work-area. As example, in FIG. 1A the lower left corner, 1A22, of the maximum display, 1A08, is the reference corner. The user is empowered to specify an optimum placement of the display relative to the work-area as a percent of one-half the width and height of the work-area. The parameters holding these displacement values are rDisplayDisplace_X, 5B03, and rDisplayDisplace_Y, 5B04, for the width and height displacement respectively.

When rDisplayDisplace_X and/or rDisplayDisplace_Y are positive the direction of displacement is toward the display-zone center and thus accords with center-seeking. This is illustrated by the location of the reference corner, 1A22, of FIG. 1A where the values of rDisplayDisplace_X and rDisplayDisplace_Y are 0.5 and 1.0 respectively. Negative values result in displacement away from the display-zone center. While this produces a result that does not accord with center-seeking it does empower the user to manage control placement in a way that might better meet the exigencies of a particular situation. Generally, one of the rDisplayDisplace values will be assigned a value of at least 1.0. To minimize the distance between the control display and work-area without work-area overlay the values of rDisplayDisplace_X and rDisplayDisplace_Y should not exceed 1.0. Processes 9C108 reference the center-seeking results and perform the calculations that determine the optimum coordinates of the maximum display reference corner.

To ascertain whether the optimum location found by 9C108 results in clipping of the control display, processes of 9C202 calculate the horizontal and vertical "Free Space" available for the maximum display. Horizontal free space, 1A14, is the distance between the X-coordinate of the optimally positioned reference corner and the most distant vertical side of the display-zone. The vertical free space, 1A16, is the vertical distance between the Y-coordinate of the optimally positioned reference corner and most distant horizontal side of the display-zone. Processes of 9C204 compare the width and height dimensions of the maximum display with values of horizontal and vertical free space respectively. When a dimension is greater than its related free space a constraint is said to exist. The four part FIG. 1B conveys the four possible constraint conditions by presenting a scenario in which the maximum display is presented in Vertical-Linear format positioned up-and-right of the work-area with optimal location determined by rDisplayDisplace_X and rDisplayDisplace_Y values of 1.0 and 0.0 respectively. FIGS. 1B2, 1B3, and 1B4 additionally communicate the approach to achieving the best non-optimum position for the maximum display under the various types of constraint. FIG. 1C similarly illustrates the four possible constraint conditions and appropriate response for a control that is displayed via the Spider format in which center-seeking is down-and-left with rDisplayDisplace_X and rDisplayDisplace_Y values of 0.0 and 1.0 respectively.

In anticipation that most Control Subsystem activations will not confront constraint conditions, processes of 9C206 determine the coordinates of the best location of the maximum display to be the optimum location as defined above. This entails determining whether the work-area center is to the right or left of the display-zone center. If it is to the right, the optimally positioned reference corner is one of the two right corners of the maximum display. The X-coordinate of the maximum display origin is therefore obtained by subtracting the width of the maximum display from the X-coordinate of the reference corner. Conversely, if the work-area center is to the left of the display-zone center the reference corner is one of the two left corners and thus already equal to the X-coordinate of the maximum display origin. The Y-coordinate of the origin is analogously determined. If the maximum display is above the work-area, the reference corner is one of the two bottom corners of the maximum display and the Y-coordinate of the origin is obtained by adding the height of the maximum display to the Y-coordinate of the reference corner. If, however, the maximum display is below of the work-area the reference corner is one of the two top corners and thus already equal to the Y-coordinate of the maximum display origin.

Processes of 9C208 perform a dual testing that produces branching to specific processes of FIG. 9 designed to respond to each different constraint condition. When no constraints exist, as illustrated by FIGS. 1B1 and 1C1, the best location calculated for the maximum display locates the control display according to user specifications. This location avoids clipping, does not overlay any portion of the work-area, and is positioned relative to the work-area at the location deemed optimum by the user. When there are no constraints, processes of 9C210 are activated to store the optimum coordinates of the origin of the maximum display as determined by processes of 9C206 in the variable cTLMaxDisplay, 5C05.

When a horizontal constraint is present processes of 9C208 branch to the processes of FIG. 9C3. Determination of a best alternative to the optimum location for the maximum display proceeds in stages. First, it is determined whether the value of the rDisplayDisplace_X can be redefined to remove the horizontal constraint. If this fails, it is determined whether the rDisplayDisplace_Y value can be redefined to remove the horizontal constraint without creating a vertical constraint. If either of these adjustments removes the constraint a best location for the maximum display can be determined that avoids all overlay of the work-area. Otherwise a best location is determined that minimally overlays the work-area.

The X-coordinate closest to the optimum X-coordinate that avoids clipping of the maximum display by the display-zone while minimizing work-area overlay is obtained by setting the vertical side of the maximum display most distant from the work-area to the X-coordinate of the vertical side of the display-zone also most distant from the work-area. Processes of 9C302 thus position the maximum display so its constrained side is repositioned to coincide with the edge of the display-zone causing the constraint. If rDispalyDisplace_X has a value greater than "1.0", the indicated shift of the maximum display from its optimum location may not produce any overlay of the work-area. To ascertain presence of work-area overlay 9C302 calculates the horizontal free-space under the presumption that rDispalyDisplace_X =1.0. Initial processes of 9C304 then retest whether horizontal constraint still exists. If the horizontal constraint has been removed, the best value for the Y-coordinate is based on the optimum coordinate; i.e., cOpt.Y, as already determined by processes of 9C206. Processing thus passes to 9C310 which stores these best cTLMaxDisplay coordinates at 5C05.

If the 9C302 adjustment is not possible or does not remove the horizontal constraint, final 9C304 processes determine whether rDisplayDisplace_Y is equal or exceeds 1.0. If rDisplayDisplace_Y is less than 1.0, resetting rDisplayDisplace_Y to 1.0 may remove the overlay resulting from 9C302 while not introducing vertical constraint. The 9C306 processes implicitly set the value of rDisplayDisplace_Y to 1.0, recalculate the value of vertical free space, and test whether a vertical constraint has been created. If a vertical constraint has not been created, the maximum display will fit without overlay of the work-area between the work-area and the farthest horizontal edge of the display-zone. If a vertical constraint has been created overlay of the work-area cannot be avoided. In this case, the best location for the maximum display is when the corner opposite the reference corner is positioned to coincide with the corner of the display-zone farthest from the work-area center under the criteria that the percent of total work-area overlaid is to be minimized. Processes of 9C308 perform these assignments. Process 9C310 completes positioning the maximum display location by storing the result to the variable cTLMaxDisplay, 5C05.

The dotted rectangle of FIGS. 1B2 depicts how horizontal constraint results in the display-zone clipping the maximum display if the reference corner is positioned according to user specification. If the distance between the top of the work-area and the top boundary of the display-zone exceeds the height of the maximum display, the maximum display can be positioned as depicted by the rectangle with dashed boarders. By implicitly setting rDisplayDisplace_Y to 1.0 clipping of the maximum display by the display-zone and overlay of the work-area by the maximum display are avoided. However, there now exists a discrepancy between the user's optimal placement of the control display relative to the work-area and its actual placement. Consideration of FIG. 1B2 gives the conclusion that the disparity is minimum commensurate with there being no overlay of the work-area by the maximum display.

When a vertical constraint is present processes of 9C208 branch to the processes of FIG. 9C4. Determination of the best location for the maximum display when vertical constraint exists proceeds in a manner analogous to processes employed for handling a horizontal constraint. First, it is determined whether the value of rDisplayDisplace_Y can be redefined to remove the vertical constraint. If this fails, it is determined whether the value of rDisplayDisplace_X can be redefined to remove the vertical constraint. If either of these adjustments removes the vertical constraint a best location for the maximum display can be determined that avoids all overlay of the work-area. Otherwise a best location is determined that minimally overlays the work-area.

The Y-coordinate closest to the optimum Y-coordinate that avoids clipping of the maximum display by the display-zone while minimizing work-area overlay derives from setting the horizontal side of the maximum display most distant from the work-area to the Y-coordinate of the horizontal side of the display-zone also most distant from the work-area. Processes of 9C402 thus position the maximum display so its constrained side is on the edge of the display-zone causing the constraint. If rDispalyDisplace_Y has a value greater than "1.0", the indicated shift of the maximum display from its optimum location may not produce any overlay of the work-area. To ascertain presence of work-area overlay 9C402 calculates the vertical free-space under the presumption that rDispalyDisplace_Y=1.0. Initial processes of 9C404 then retest whether vertical constraint still exists. If the vertical constraint has been removed, the best value for the X-coordinate is based on the optimum coordinate; i.e., cOpt.X, as already determined by processes of 9C206. Processing thus passes to 9C410 which stores these best cTLMaxDisplay coordinates at 5C05.

If the 9C402 adjustment is not possible or does not remove the vertical constraint, final processes of 9C404 determine whether rDisplayDisplace_X is equal or exceeds 1.0. If rDisplayDisplace_X is less than 1.0 resetting rDisplayDisplace_X to 1.0 may remove the overlay resulting from 9C402 while not introducing horizontal constraint. The 9C406 processes implicitly set rDisplayDisplace_X= 1.0, recalculates the value of horizontal free space, and tests whether a horizontal constraint has been created. If a horizontal constraint has not been created, the maximum display will fit without overlay of the work-area between the work-area and the farthest vertical edge of the display-zone. If a horizontal constraint has been created overlay of the work-area cannot be avoided. In this case, the best location for the maximum display is when the corner opposite the reference corner is positioned to coincide with the corner of the display-zone farthest from the work-area center under the criteria that the percent of total work-area overlaid is to be minimized. Process 9C408 performs this assignment. Process 9C410 completes processing of the maximum display location by storing the result in the variable cTLMaxDisplay, 5C05.

The dotted rectangle of FIG. 1B3 depicts how a vertical constraint results in the display-zone clipping the maximum display if the reference corner is positioned according to user specification. If the distance between the side of the work-area and the side boundary of the display-zone exceeds the width of the maximum display the maximum display can be positioned as depicted by the rectangle with dashed boarders. By implicitly setting rDisplayDisplace_X to 1.0 clipping of the maximum display by the display-zone and overlay of the work-area by the maximum display are avoided. However, there now exists a discrepancy between the user's optimal placement of the control display relative to the work-area and its actual placement. Consideration of FIG. 1B3 gives the conclusion that the disparity is minimum commensurate with there being no overlay of the work-area by the maximum display.

Detection of simultaneous horizontal and vertical constraint by 9C208 initiates the processes of FIG. 9C5. When double constraint exists with the maximum display positioned at the optimum location there exists opportunity to reset the rDisplayDisplace only if one or both have values exceeding 1.0. Even under this circumstance the best position is the same as if double constraint cannot be removed; namely, position the corner of the maximum display opposite the reference corner at the display-zone corner farthest from the work-area center. Process 9C502 does this for the X-dimension while 9C504 does this for the Y-dimension.

The latter processes of 9C104 disclose the preferred methods for positioning the maximum display when the work-area has dimensions approximating those of the display-zone. Why these special processes are appropriate was deferred until disclosures that determine the best location for the maximum display for work-areas with more limited dimensions were completed. Consider, as example, a display-zone of 7×12 inch height and width respectively. Consider now a word processor where it is common that display wide lines of text define the work-area. Assume the user has specified values of 1.0 for both the rDisplayDisplacement_X and rDisplayDisplacement_Y paramateres. If, as example, such a work-area is centered above the display-zone center, the control display will be located with its right edge on the right edge of the display-zone. However, setting the rDisplayDisplacement_X and rDisplayDisplacement_Y parameters to 0.0 and 1.0 respectively will place the control display just off-center and below the work-area. Alternatively, consider a spreadsheet on which the user highlights a six-inch high column centered down-and-below the display-zone center. For this case the display displacement values will place the top-edge of the control display at the top of the display-zone. For this situation the user is likely to prefer that the control display be more centrally aligned and to the right of the work-area as will occur if the 5B03 and 5B04 values are reset to 1.0 and 0.0 respectively. The latter processes of 9C102 provide these capabilities. The preferred implementation proposes that during the calculations that position the maximum display the user supplied rDisplayDisplacement_X and rDisplayDisplacement_Y are replaced by 1.0 and 0.0 when the ratio of the work-area height to the display-zone height exceeds some specified ratio denoted by the variable rWAy/DZyRatio, 5B11. Parallel conditions can occur when the horizontal dimension of the work-area is a large percent of the display-zone width. When this ratio exceeds the value of rWAx/DZxRatio, 5B10, the and values are reset to 0.0 and 1.0. Whether the user specified and values or values derived from application of the 5B10 or 5B11 ratios are applied, the resulting values are stored as rCurrDisplayDisplacement_X, 5C16, and rCurrDisplayDisplacement_Y, 5C17.

Once the best location for the maximum display is calculated, FIG. 1A can provide visual insight into how the fixed-point coordinates, 5D12, disclosed by processes of 9D00, are determined. Processes of 9D02 fetch the variables, rFixedPointDisplace_X, 5B22, and rFixedPointDisplace_Y, 5B23, which specify the percent of shell width and height respectively that the fixed-point is displaced from the maximum shell origin. Processes of 9D02 also fetch maximum shell dimensions, 5D06 and 5D07, maximum display height, 5C09, and the coordinates of the best origin for the maximum display, 5C05. The maximum shell, 1A10, is depicted in FIG. 1A as a rectangle bounded by a border of short dashes and filled with short horizontal dashes where not overlaid by the depiction of the current display, 1A11. When not overlaid by the maximum shell the maximum display, 1A08, is depicted as a rectangle bounded by a border of long dashes and filled with dots. FIG. 1A visually communicates that the maximum shell will always have its lower-left corner coincident with the lower-left corner of the maximum display for displays having backward cascade directed up-and-right. FIG. 1A also makes it visually apparent that the X-coordinate of the maximum shell origin equals the X-coordinate of cTLMaxDisplay, 5C05. The Y-coordinate of the maximum shell origin is cTLMaxDisplay.Y, 5C05, minus the difference between the height of the maximum display, iMaxDisplayHeight, 5C09, and the height of the maximum shell, iMaxShellHeight, 5C07. Processes of 9D04 express these relations. Processes of show that the X-coordinate of the fixed-point, cFixedPoint, 5D12, is the X-coordinate of the shell origin plus the product of rFixedPointDisplace_X, 5B22, and the width of the maximum shell, iMaxShellWidth, 5C06. Similarly, the Y-coordinate of the fixed-point, cFixedPoint equals the Y-coordinate of the shell origin minus the product of rFixedPointDisplace_Y, 5B23, and the height of the maximum shell, iMaxShellHeight, 5C07.

Determination of the fixed-point for system specific control formats cannot be detailed, but to the extent such controls contain contiguous, selectable items these areas define a shell. Any control that can have descendants is displayed as a combination of the shell with its title bar and ghost ascendant shells with their title bars. Thus, FIG. 9D will generally be applicable to system specific controls that can be expressed via a pop-up graphic of contiguous, selectable items. When selectable items are not contiguous, as with a dialog box, the iFixedPointDisplace_X and iFixedPointDisplace_Y must be specified employing criteria most appropriate to exigencies of the system specific control. As example, it is generally recommended that the bounding rectangle of the non-contiguous selectable items be used as the control display with the iFixedPointDisplace_X and iFixedPointDisplace_Y values each set to 0.50.

Figure 9D:
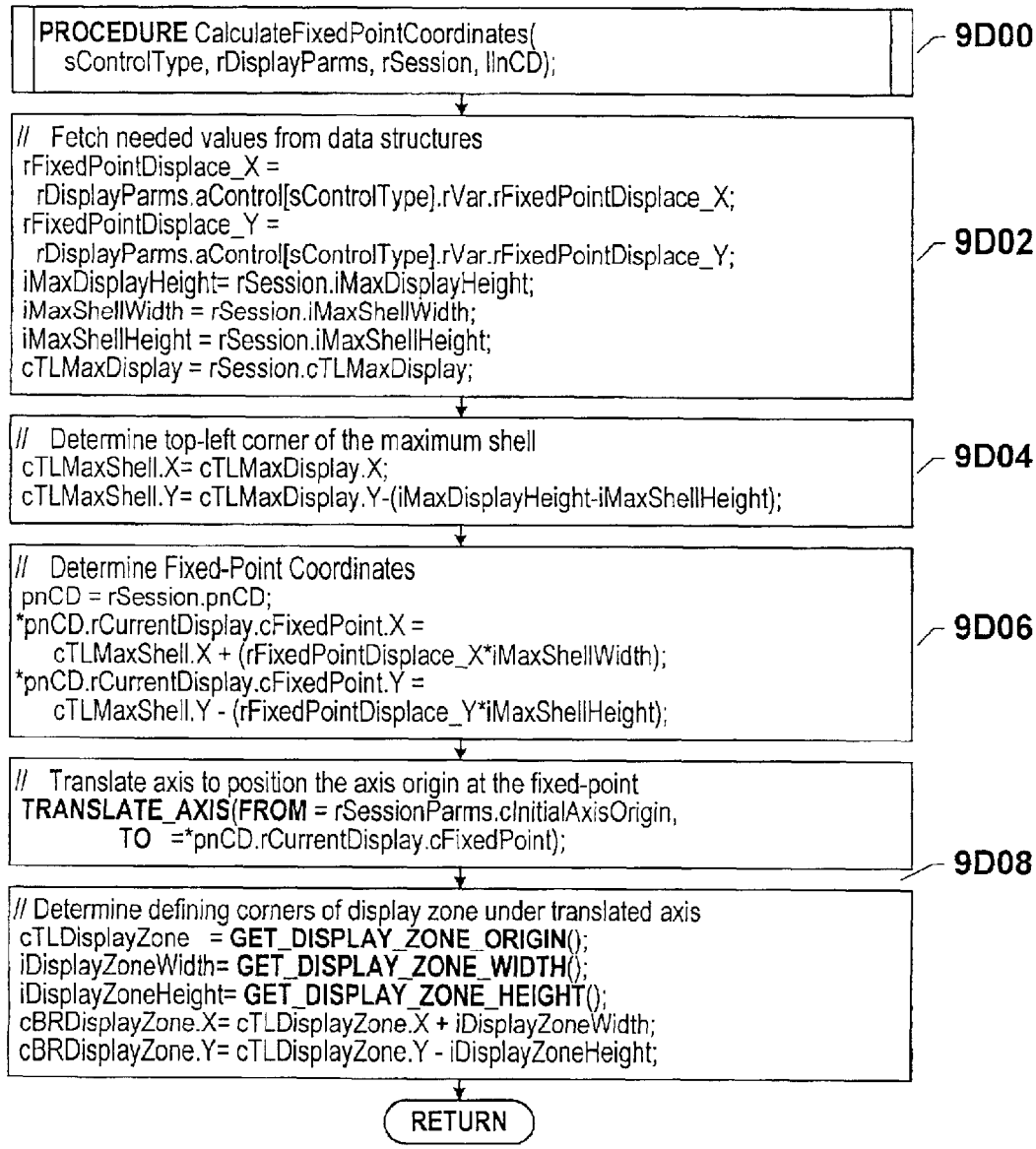
FIG. 9D is a flowchart that discloses the processes that determine the coordinates of the fixed point given the origin and dimensions of the maximum display window.

The 9D08 processes of FIG. 9D translate the axis system from its original position as stored at 5C03 to superimpose its origin on the fixed-point. It will be shown below that this translation has substantial benefits during generation of the control graphic and during interpretation of user manipulation of that graphic. It is to be appreciated that if exigencies of an application suggest the desirability of altering the fixed-point during any individual Control Subsystem activation, the axis system will need to be translated back to its original location whenever user manipulation of a current control is complete.

Detailed Disclosure of System Response to User Manipulation of the Control Display FIG. 4D provides the high level disclosure that once the initial control is displayed by 9A00 the Control Subsystem enters a mode that interprets and responds to user manipulation of that display. Although a fully functioning user management capability handles all user actions, processes of FIG. 10 concern only those user manipulations that: (1) represent various preparatory actions as mouse move, key stroke, pause, etc. (2) select services, (3) undo services, (4) toggle between menu and toolbar controls, (5) enable the current control for multiple selection, (6) exit the Control Subsystem, (7) request display of an ascendant control, and (8) request display of a descendant control. It will be seen that several processes of ManageUserControlActivity, 10A00, are outside the scope on this invention as they can be specific both the application software and operating system being utilized.

It will be presumed that when the user requests a service, appropriate 10A104 system specific processes will immediately perform the service requested. This presumption is reasonable when it is considered that the user expects a highlighted text string to convert to bold upon request or expects that an informational dialog box is displayed immediately upon system detection of an anomaly. It will also be presumed that system specific processes are available to provide an "Undo" capability that reverses the effect of services performed. While an extensive literature exists relating to the art of "Undo", processes that implement "Undo" are system specific. It is reasonable to posit that these processes comprise discrete activities based on capturing particulars of the system state immediately prior to performing a requested service. As such, it will be presumed that a pointer to the process needed to affect service reversal can be identified and returned to the Control Subsystem for storage in the chronological order in which the services are requested. For reasons expanded below, it will also be presumed that if any data objects are accessed during performance of a service these objects can be identified and pointed to via an address returned to the calling routine. Also for reasons expanded below, it will additionally be presumed that if any data objects are deleted during performance of a service can be identified and pointed to via an address returned to the calling routine. It is not the concept of reversing services that this invention claims to be novel as an extensive literature concerning these arts exist but, rather, the conjoining of the reversal of service with novel management of when and how the user may perform service reversal.

At 8A04 process the Control Subsystem activates the ManageUserControlActivity, 10A00, processes and immediately enters a wait state at 10A102. This wait state is maintained until the user performs some action on the control interface. Upon detection of a user action tests are undertaken at 10A104, based on the value passed to 10A00 in the sCurrentControl argument that identifies the control on which the action was performed. Appropriate procedures are then activated to interpret the user's action. This preferred implementation presumes that upon return from system procedures at 10A104 the arguements pDoService, 5E01, pUndoService, 5E02, psetReferencedDataObjects, 5E05, psetCreatedDataObjects, 5E06, psetDestroyedDataObjects, 5E07, sAction, iAncestor, and pActionParm contain information that enables the Control Subsystem to perform appropriate follow-on activity. The argument pDoService will contain "null" if no service was performed. If a service has been performed, pDoService is presumed loaded by system specific processes within 10A104 with the address to the processes that perform the service. The argument pUndoService is presumed similarly loaded with the address of the system specific process that reverses the service. When pDoService contains a non-null value, processes of 10A202 are entered to increment the iTotalNumServices, 5C15. This overwrites any existing value in 5C15 with the result that 5C15 always contains the total number of services that have been performed since the current activation of the Control Subsystem irrespective of whether one or more services have been subsequently permanently reversed. As will be disclosed by 10D00, the value in 5C15 is utilized in conjunction with data stored in arServiceHistory, 5E00, to provide the means to perform the four styles of "Undo" supported by this invention. To make possible these undo capabilities the values in the 5E06 and 5E07 arguments returned at 10104 are added into the sets setLivePool, 5C10, and setDeadPool, 5C20, respectively of the rSession data structure. As will be seen in 10D00 processes, the setLivePool and setDeadPool sets are employed with psetREferencedDataObjects, 5E05, which is returned via the system specific processes of 10A104, to support these undo capabilities. To complete the data needed for the undo capabilities provided herein, processes of 10A202 additionally retrieve the current control's unique identification, 5D14,—generated at either 9A104 or 10C02—for loading to 5E04. 10A202 lastly loads a "+1" code to the iStatus, 5E08, variable to denote the service pointed to by 5E01 has been performed Additional Control Subsystem responses to user action derive from the value returned by 10A104 via the argument sAction. If the user performed a preparatory action such as mouse move, some types of keystroke, pause, etc. the argument sAction is loaded with the string "Continue". If processes at 10A204 detect this case, processing immediately returns to 10A102 to await the next user action. If the user has selected "Undo", 3B10, the argument sAction contains the string "Undo". Processes of 10A206 detect this and activate processes of ReverseServices, 10D00, with the string "Undo" loaded to the sService arguement. The result will be that the most recently performed service of the current control is reversed. At return from 10D00 processing passes to 10A102 to await the next user action. Alternatively, if the 10A206 processes detect that the user has selected the displayed "Redo", 3D06, area of FIGS. 3D through 3G the sAction argument returns the string "Redo". When processes of 10A206 detect "Redo" in sAction, ReverseServices is activated with the string "Redo" passed through the sService argument to initiate redoing of the most recent service of the current control that has been reversed.

If the test commencing the 10A208 processes determines that 10A104 returned the string "MultSelect" in the argument sAction, depending on control type and format the appropriate processes of 10A208 alter the current control in the manner illustrated by FIGS. 3B through 3G. When application designers presume the user will commonly desire a single selection from the current control but realize that the user will frequently desire multiple selections, this invention discloses that the control can be provided with novel capabilities that permit the control's conversion from a single selection to a multiple selection control. The graphic appearance of a menu control having this dynamic capability is illustrated by FIG. 3B1 and FIG. 3B3 for Spider and Vertical-Linear formats respectively. When the user selects the "Multi-Select" area, 3B12, processes of 10A208 alter the control to display FIGS. 3B2 and 3B4 for the Spider and Vertical-Linear formats respectively. The difference between the two phases of such dynamic controls is that the 3B12 area identifies the control as being a single selection control capable of conversion to a multiple selection control. The dynamic altering of the menu control here disclosed thus converts a single selection control that does not require an explicit "Done" or "Cancel" action into a multiple selection control that does require one of these explicit user actions to terminate selection from the current control.

While the preceding illustrates this invention's disclosure of dynamic alteration of the menu control from single to multiple selection capability, this capability is readily adapted to toolbar and combo box controls. The diagramed central areas for Spider formatted menu and toolbar controls differ only in the 3B06 area; displaying "Toolbar" for a menu control and "Menu" for the toolbar control to permit toggling between the two control types. Thus the graphics of FIGS. 3B1 and 3B2 and FIGS. 3C1 and 3C2 are applicable for the Spider format. FIGS. 3B3 and 3B4 and FIGS. 3C3 and 3C4 are provided to better communicate the same management capabilities when incorporated in a Vertical-Linear toolbar control. It is apparent that the regions of Vertical-Linear menu and toolbar controls novel to this invention are functionally identical to those of the Spider format even though they appear in different graphical layout. The Spider formats of FIGS. 3DX through FIGS. 3GX (X=1 or 2) illustrate this capability for combo box controls. While full implications of differences in these figures are available from the author's U.S. Pat. No. 6,239,803, it suffices to note here that these differences provide for efficient management of paged combo box lists of differing lengths.

When considering the 3B12 and 3B14–3B16 areas, it is seen that there is no difference in capabilities between 3B12 areas of FIGS. 3B1, 3C1, 3D1, 3E1, 3F1, and 3G1 and between the and areas of FIGS. 3B2, 3C2, 3D2, 3E2, 3F2, and 3G2 The equivalent areas of FIGS. 3D3 through 3G3 and FIGS. 3D4 and 3G4 show that capabilities of the Vertical-Linear format to manage the combo box are identical to those of the Spider format except for differences in the physical shape and position of the component parts. It is apparent that it is the concept of converting a single selection to a multiple selection graphic that is the novel aspect of this aspect of the invention and not the particular control types illustrated herein for which it is detailed. Consequently, this invention subsumes any control type for which a capability to convert from the single to the multiple selection mode enhances the usability of the computer-human interface.

Processes 10A302 through 10A306 manage user requests for direct return to the application. If the user wishes to keep all services selected via the current control but to avoid explicit exiting of each control of the control path that provides multiple selection capabilities (detailed below) the "Exit" area of the current control is selected. Processes of 10A304 parameterize the arguments sNextAction and sNextControl with the strings "Exit" and "Application" respectively. These values are passed through 8A00 to 6A00, which terminates the Control Subsystem. If 6A12 detects "Application" the cursor is positioned at the cStartCursor, 5C10, coordinates if the user has specified this via bCursorJump, 5B09. If the user wishes the results of "Exit" but without an automatic jump of the cursor upon termination of the Control Subsystem, the cursor is traversed out of the display window, 5C04. This results in 10A104 loading the sAction argument with the string "TraverseExit" which is identified at 10A306. This produces the same sequence as 10A204 except that the loading of sNextAction with "TraverseExit" will assure that the final test at 6A12 is always FALSE. If the user has parameterized bCursorJump to FALSE, the user need only terminate the control in any accepted manner and the cursor will not be returned to the cStartCursor coordinates.

If the user decides a particular activation of the Control Subsystem was inappropriate and all services performed using that control should be reversed, the user selects the "Abort" area of the control. This results in the string "Abort" being loaded to the sAction argument of 10A104 with "Abort" being detected by 10A302. Detection of "Abort" at 10A302 activates ReverseService, 10D00, with the string "Global" loaded to the sService argument. This results in processes of FIG. 10D1 reversing all services performed during the current Control Subsystem activation. At return from 10D00 processing proceeds as if the sAction argument had initially been loaded with "Exit" and sNextControl with "Application".

Processes 10A310 perform the "Staged Reverse Traverse" activities disclosed by this invention. If the user is satisfied that all service requests made via a current multiple selection control are appropriate, the "Done", 3B14, capability is selected. This results in the string "Done" being loaded into the sAction argument of 10A104 with subsequent detection by the test at 10A310. If the current control is not the initial control; i.e., 5C11 contains a value greater than "1", sNextAction is loaded with the string "Done" and sNextControl is loaded with the string "unused". When 5C11 contains "1", sNextAction is loaded with Exit" and sNextControl is loaded with the string "Application". Processing now passes to 8A06. If the sNextAction arguement is found to contain "Done" tests are performed for the presence of a control in the control path containing the "Done" capability. If a control containing the "Done" capability is detected, processes at 8A08 redisplay the said control and the wait state at the top of the 8A04 loop is entered until the next user action occurs. If the control path does not contain a control with the "Done" capability, 8A06 loads the argument sNextAction with "Exit" and processing passes to 6A00. Processes at 6A10 terminate the current Control Subsystem activation by calling 11F00 and after cursor placement the system returns to 6A04 to await the user's next action on the application interface. If the user has made a selection from a single selection control, processes at 10A104 return the string "SingleSelect" in the argument sAction. This result represents an implied "Done" capability and produces system behavior equivalent to an explicit "Done" capability.

If, however, the user concludes that selections of the current control are inappropriate and wishes to return to the most recent control offering the "Done" capability the "Cancel", 3B16, capability is selected. This results in the string "Cancel" being loaded into the sAction argument of 10A104 with subsequent detection at 10A308. Processes of 10A308 then initiate processes of 10D00 to reverse all services performed via the current control As will be disclosed below it is possibly some subsequent services will also be reversed. At return from 10D00, final processes of 10A308 become the processes of a "Done" user request.

The "Staged Reverse Traverse" capability disclosed by this invention is initiated if the user's action at 10A102 is to select a 3B08 sub-area or the title bar or ghost shell of the desired control. Performance of Staged Reverse Traverse maintains all services performed subsequent to the control it is desired to redisplay and the requested arbitrary ancestor control is redisplayed. This is accomplished by loading the sAction argument with "AscendantControl" which is detected at 10A312. At 10A312 the argument sNextAction is loaded with the string "Ascendant" and address of the iAncestor variable, which holds the generation of the ancestor control to be redisplayed, loaded to pResult. Processing now returns to 8A00 where the test at 8A08 detects the string "Ascendant" and activates the processes of FIG. 10B to redisplay the requested control.

A request for display of a descendant control activates the system specific processes 10A104 to load sAction with the type of control requested and pResult with the address of the data structure defining the desired control. Processes of 10A402, and 10A404 screen sAction for requests to display a menu or toolbar control. Processes of 10A406 handle requests for other types of control. The 10A406 processes load the argument sNextAction with the string "Descendant", the argument sNextControl with the string in sAction; i.e., type of control to generate, and pResult with the address to whatever data structure enables 8A10 to access parameters that permit the format specific processes of 11D00 to correctly render the requested control to the active display.

Processes 10A402 and 10A404 are provided when a toolbar has been requested from a menu control or a menu has been requested from a toolbar control. It may be generally stated that the menu and toolbar offer related services with the menu having low user recall burden but requiring greater time and expenditure of physical effort than the toolbar while the toolbar is timely and requires low physical effort but requires greater cognitive effort than the menu. To permit convenient user access to either control after the Control Subsystem has been activated, this invention provides for repeated toggling between the menu and toolbar when there is provision for an area within the control's display to activate this capability; namely the 3B06 areas in FIGS. 3B and 3C. When the user requests this capability the string "Exit" is loaded to the argument sNextAction and sNextControl is loaded with "Menu" at 10A402 or with "Toolbar" at 10A404. The argument pResult is loaded with the address to the data structure that defines the requested menu or toolbar. When toggling is requested, the "Exit" string loaded to sNextAction returns processing to 6A12 where the presence of other than "Application" iterates processing back to 6A10 to automatically reactivate the Control Subsystem to display the requested menu or toolbar.

Figure 10B:
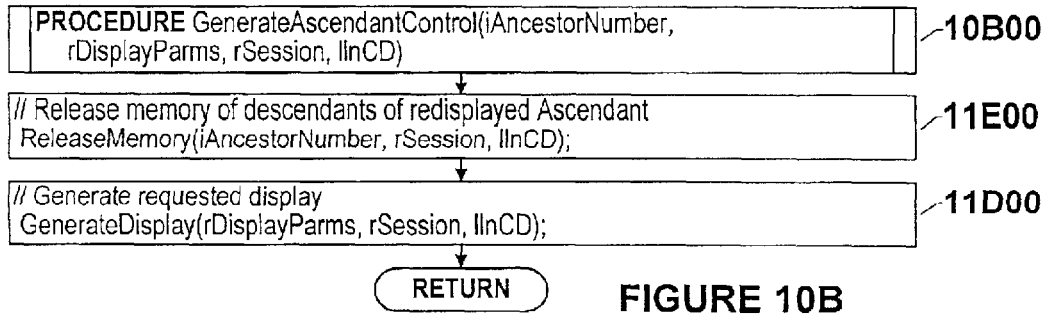
FIG. 10B is a flowchart that discloses the processes that display a requested ascendant control.
Figure 10C:
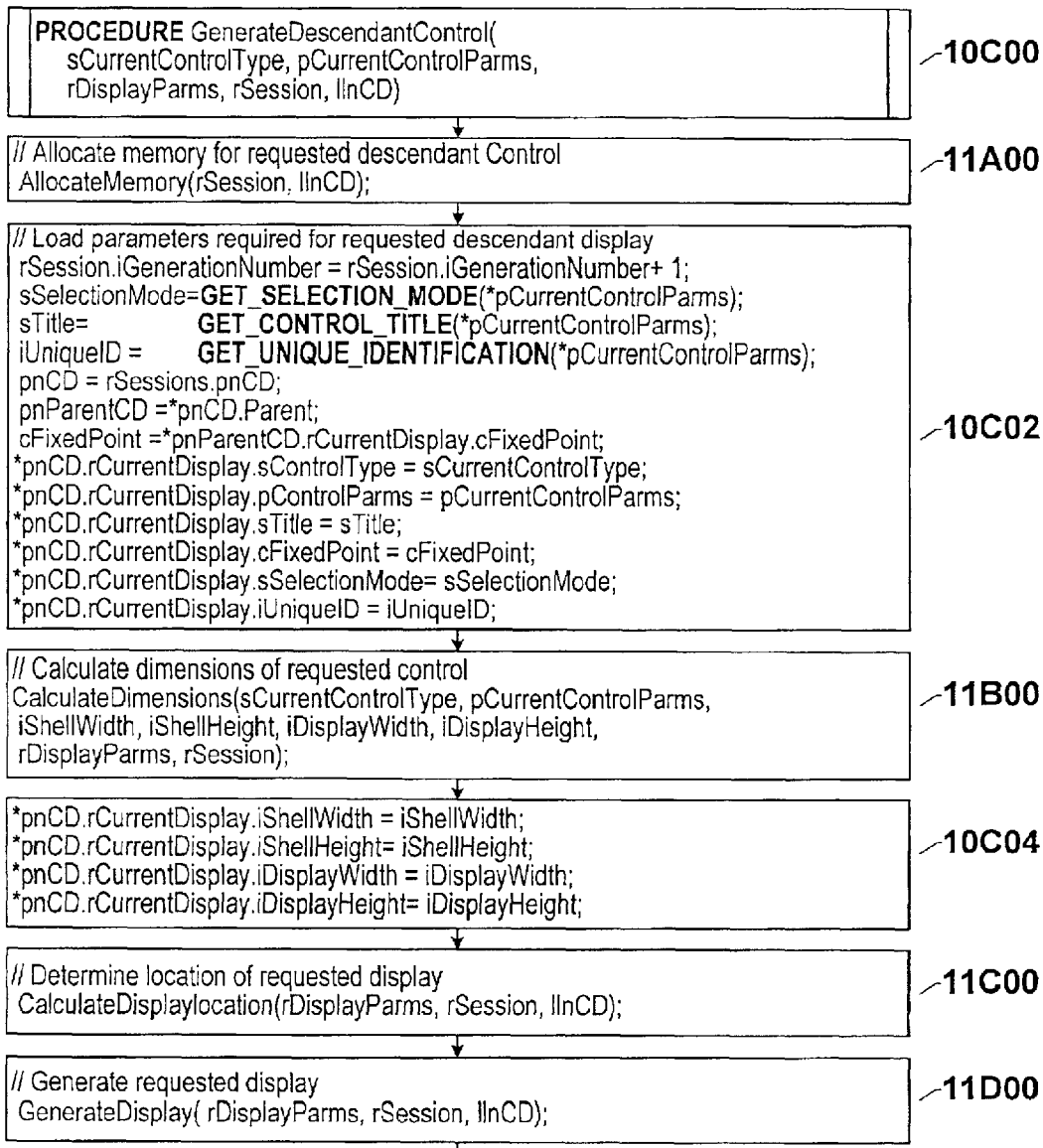
FIG. 10C is a flowchart that discloses the processes that display a requested descendant control.

FIG. 10B00 redisplays a previously displayed control. It is to be appreciated that parameters defining the current Control Subsystem activation are stored in the rSession, 5C00, data structure and that parameters defining each control displayed during the current Control Subsystem activation are stored in a node of the IlnCD, 5D00, data structure. Thus, to redisplay the requested control 10B00 activates ReleaseMemory, 11E00, to release all memory for nodes of the IlnCD, 5D00, data structure that descend from the control to be redisplayed with final processes of 11E04 loading the address of the desired node to 5C01. Processes of 10B00 then activate GenerateDisplay, 11D00, to redisplay the requested control.

Display of a descendant control by GenerateDescendantControl, 10C00, utilizes several processes that have already been disclosed. After AllocateMemory, 11A00, is activated to provide storage space for parameter values that define the requested descendant control, the tally stored in iGenerationNumber, 5C11 is incremented. The address of the node allocated for the new control by 11A00 is fetched from storage at pnCD, 5C01, by processes of 10C02 to permit loading of currently known values that relate to display aspects of the requested control. Four of these, sControlType, 5D03, pControlParms, 5D04, sTitle, 5D05, and iUniqueID, 5D14, are self-explanatory or have been detailed above. Remaining assignments performed by 10C02 initialize 5D12 with the fixed-point of the new control's parent and 5D13 with the control's selection mode. Storing the fixed-point in 5D00 rather in 5C00 is proposed to permit more ready adaption of this preferred implementation to exigencies of specific software. As was disclosed by 9D00 above, the fixed-point for this preferred implementation is determined at activation of the Control Subsystem and used throughout the said activation. This preferred implementation is presented in a manner to emphasize maintenance of visual focus during the life of a given display. It has been noted that when dimensions of the maximum display are specified to be less that the absolute maximum dimensions the display location calculated may on occasion lead to control display clipping. To handle this as a special case the 11C06 and 11C08 processes are available to adjust the fixed-point coordinates. It is appreciated that different determination of the fixed-point may be more appropriate to some implementations. As example, other implementations may not desire to position, say, a small dialog box at the fixed-point calculated for a toolbar having large dimensions as this will likely display the dialog box at a location excessively removed from the work-area. It will be apparent that storage of the fixed-point coordinates in 5D00 rather than 5C00 enables the person of normal skill to more easily adapt this preferred implementation to exigencies of a specific application while not limiting the scope and intent of the preferred implementation itself. The scope of this invention is presumed to encompass either use of the fixed-point.

The 10C00 processes then activate CalculateDimension, 11B00, to determine dimensions of the requested control. The values returned, namely: shell width, shell height, display width, and display height, are stored by 10C04 in the IlnCD, 5D00, data structure at locations 5D07 through 5D10 respectively. The CalculateDisplayLocation, 11C00, processes are now activated to determine descendant control display coordinates with GenerateDisplay, 11D00, then activated to render the display to the active display. Details of 11C00 and 11D00 processes are disclosed below.

FIG. 10D00 discloses the novel forms of "Undo" utilized by this invention. This invention will commonly employ the phrase "Reverse Service" in lieu of undo to differentiate the broader capabilities of this invention from the more limited undo capabilities commonly available. Commonly available undo generally requires the user to request one undo request for each service reversed with the service reversed being predefined by the application to be the chronologically most recent non-reversed service. Performing undo in other than the reverse chronologic order encounters the possibility that a single action performed by the user can lead to unpredictable effects. An elementary example can be the initial act of inserting new text into extant text followed by a second service request that sets the inserted text to bold. It is illogical to consider that the chronologically later "bold" service request has meaning if the earlier request is reversed without first reversing the bold service since if the prior service request were reversed without the bold service bring first reversed there would be no text to set to bold. With constraints indicated below, this invention provides for the current Control Subsystem activation the permanent removal of services in other than reversed chronological order without requiring that the user also explicitly reverse all subsequent services performed. The approach is for the system to temporarily reverse all services subsequent to the service being permanently reversed, permanently reverse the specified service, and then, to the extent logic allows, re-perform the services performed subsequent to the permanently reversed service.

The extent to which this approach can be implemented without altering the original intent of the user depends on the interplay of the basic three actions that services can perform during user manipulation of a control path; namely: (1) destroy data objects, (2) create data objects, or (3) alter attributes of existing data objects. It is to be appreciated that while data objects destroyed by performance of a service are returned to existence by reversal of that service, this is of no consequence to redoing a subsequent service after its reversal since such data objects will not have been available to any subsequent service because the data object of concern did not exist when the subsequent service was initially performed. This is not the case with reversal of services that create data objects during their original performance. When a service creates a data object this data object becomes available for incorporation into services subsequent to the service creating the data object. Thus, if a service references a data object created by a prior service, the latter service cannot be performed if the former service is reversed.

FIG. 10D discloses the undo capabilities of this invention. The arServiceHistory, 5E00, data structure is an array of records that stores and, on demand, provides information regarding the status of services requested during any given Control Subsystem activation. Rows of this structure maintain the chronological order in which services are requested. Content of each row is: (1) pDoService, 5E01, stores the pointer to the system specific data structure capable of performing the service and presumed passed to the Control Subsubsystem by system specific processes at 10A104, (2) pUndoService, 5E02, stores the pointer to the system specific data structure capable of reversing—undoing—the service performed via 5E01, and presumed passed to the Control Subsubstem by system specific processes at 10A104, (3) pCD, 5E03 stores the address of the IlnCD node, 5D00, defining the control from which a service was requested, (4) iUniqueID, 5E04, is the unique identification of the control assigned during system design and available when the service is requested via 5D14, (5) psetReferencedDataObjects, 5E05, is a pointer to the set of data objects referenced by a given service prior to the actual execution of that service and presumed passed to the Control Subsubstem by system specific processes at 10A104, (6) psetDestroyedObjects, 5E06, is a pointer to the possibly empty set of data objects destroyed by performance of a given service with update data presumed passed to the Control Subsubstem by system specific processes at 10A104, (7) psetCreatedObjects, 5E07, is a pointer to the possible empty set of data objects created by performance of a given service with update data presumed passed to the Control Subsubstem by system specific processes at 10A104, and (8) iStatus, 5E04, is an index designating the status of a given service.

Irrespective of service(s) the user desires to reverse, all such reversals commence at 10D102 with the fetching of parameters requisite to each of the reversal techniques. The type of service reversal requested is then identified. If the user has selected "Abort", 3B04, this request is detected at 10A302 and results in "Global" being loaded into the sService argument of 10D00 for processing at 10D104. It was noted above that as services are performed a tally of their number is maintained in iTotalNumServices, 5C15. The iTotalNumServices value identifies the row of arServiceHistory, 5E00, that commences the decrementing loop of 10D104 and continues through the first service of the current Control Subsystem activation. During each iteration the value in iStatus, 5E08, is tested for the value "+1". If a "+1" value is found, that row of 5E00 represents a service that has not been reversed and system specific processes pointed to by pUndoService, 5E05, of that row are activated to perform the service reversal. When all loops at 10D104 are completed, processing returns to 10A302 where parameters loaded at 10A304 result in Control Subsystem termination.

If the user wishes to reverse the most recent, non-reversed service of the currently displayed control, the "Undo", 3D10, area is selected. Activation of 3B10 can—but need not—be equivalent to activation of the traditional undo. If the current control is the chronologically last control performed, the service being reversed will be the last service performed via the current control. Since all other application activity is suspended while the Control Subsystem is active, this result is the same result as activation of a traditional undo. The relevant difference is that the current control may be a redisplayed ancestor of the control that performed the chronologically last service. In this case, this invention's undo and the traditional undo produce different results. To accomplish this invention's broader undo a decrementing loop is entered at 10D202 to scan the arServiceHistory, 5E00, data structure in reverse chronologic order to identify the most recent service performed by the current control. The first service for which the unique identification, 5E04, matches the unique identification of the current control stored at 5D14 having a iStatus, 5E08, value of "+1" is the most recent service performed via the currently displayed control. If such a match is not found the current control has either not been used to request a service or all services activated via the current control have been previously reversed. In this instance, the undo request is exited without any result.

When a most recent service of the current control is identified, processes of 10D204 initiate a loop that iterates in reverse chronologic order from the most recent service performed to the most recent non-reversed service performed via the current control. Each detected non-reversed service; i.e., services with iStatus values of "+1", is reversed and its iStatus variable set to "0" to indicate its availability for possible "redoing" once the most recent service of the current control is permanently reversed. The reversal of the most recent service of the current control is declared permanent after the loop is exited by setting its iStatus variable to "−2". As the 10D204 loop proceeds appropriate respond to the reversal of services that destroy data objects created when the service was initially performed removes these data object(s) from the setLivePool; namely the set that identifies all data objects created by services when initially performed during the current activation of the Control Subsystem. Data objects of such services are passed from 10A104 and stored at 5E06. If such services are reversed, the data objects identified at 5E06 are removed from setLivePool. Similarly, the setDeadPool data set identifies all data objects that have been destroyed during initial service performance of the current Control Subsystem activation. As each data object is destroyed by performance of the initial service request, identification of the destroyed data objects is passed from 10A104 and stored at 5E07. If such services are reversed, the destroyed data objects are regenerated and thus removed from setDeadPool. During a ControlSubsystem activation setLivePool and setDeadPool are stored at 5C19 and 5C20 respectively.

Once the most recent service of the current control has been permanently excised it is necessary to determine whether each successive service available for redoing references one or more data objects that no longer exist. This is accomplished by entering a loop at 10D302 that commences with the immediate successor service to the permanently reversed service of the most recent chronologic service performed. Each of these services is tested in turn to determine whether it has been declared available for possible redoing; i.e., its iStatus variable contains "−1" or "0". Whenever a service to be evaluated for redoing is found, its psetReferencedDataObjects, 5E05, is tested against currently available data objects stored in setAvailableData; i.e., the temporary variable that equals setinitialDataObjects, 5C18, plus setLivePoo, 5C19, minus setDeadPool, 5C20,. If no element of 5E05 is an element of setAvailableData the service being processed does not incorporate any data object that no longer exists. It is thus possible to "redo" that service. Resetting a iStatus variable for a redone data object to "+1" designates that the service has been redone. However, if at least one element of 5E05 exists that is not contained in setAvailableData the service requires a data object that no longer exists and, thus, the service cannot be reversed. The iStatus variable of the service is set to "−1" to denote this state.

If the user wishes to redo the permanent undoing of the last service performed by the currently displayed control, the "Redo" area, 3D06, is selected. A redo request is identified by FIG. 10A2 and acted upon by FIGS. 10D4 and 10D5. Initially a decrementing loop is entered at 10D402 that is identical to that of 10D202 except the loop is terminated by an iStatus value if "−2" rather than "+1"; the "−2" denoting a previously declared permanent reversal of a service. If such a match is not found no service of the current control has been reversed. In this instance the "Redo" request is exited without any result.

When a most recently, permanently reversed service of the current control is identified, processes at 10D404 enter a loop that iterates from the most recent chronologic service performed down to the service subsequent to the most recent reversed service performed via the current control. As with the 10D204 loop, each detected non-reversed service; i.e., services with iStatus values of "+1", is reversed and the iStatus variable set to "0" to declare them available for possible redoing once the most recently reversed service of the current control is itself reversed.

Processes of 10D502 enter a loop commencing with the service being redone and ending with the last chronologic service performed. It is necessary to determine whether each successive service available for redoing encompasses any of the data objects that no longer are in existence. To achieve this tests are performed to determine whether a redo or undo performed prior to the current redo has altered the set of available data objects. Because the service currently being redone will have a iStatus value of "−2", it specifically identified. All subsequent services available for redoing are identified with iStatus values of "−1" or "0". Actual testing of whether a service can be redone is identical to the processes employed in 10D304 and are not repeated here.

If the user wishes to reverse all services performed by the currently displayed control, the "Cancel", 3B16, area is selected. This can potentially result in the undo of multiple services. To identify the chronologically first service performed via the current control even if this service was performed by a prior display of the current control, an incrementing loop is entered at 10D602 to scan the arServiceHistory, 5E00, data structure in chronologic order starting with the first service performed during the current Control Subsystem activation. The service sought is the service for which the unique identification, 5E04, matches the unique identification of the current control stored at 5D14 having a iStatus, 5E08, value of "+1", which denotes an non-reversed service. If such a match is not found the current control has either not been used to request a service or all services activated via the current control have been previously reversed. In this instance, the "Cancel" request does not result in any service reversals. For this case, the result is the same as if "Done" had been selected.

If a first service initiated by the current control is identified, processes of 10D604 enter a loop that iterates from the most recent chronologic service performed to the identified first service initiated via the current control. Each detected non-reversed service; i.e., services with iStatus values of "+1", is reversed and its iStatus variable set to "0" to declare it available for possible redoing once all services subsumed by the "Cancel" request have been reversed. A second test is then performed by the 10D604 loop to identify services that were performed via the current control. Since these services have already been reversed, all that is required is to assign their iStatus variable to "−2" to denote permanent reversal.

Once the all service initiated by the current control has been declared as permanently reversed, a loop is entered to determine which services performed subsequent to the first service of the current control available for redoing can logically be redone. Other than a difference in the start index of this loop, processes of 10D702 and 10D704 are identical to processes of 10D302 and 10D304 respectively and will not be repeated here.

Detailed Disclosure of Support Capabilities

Figure 11A:
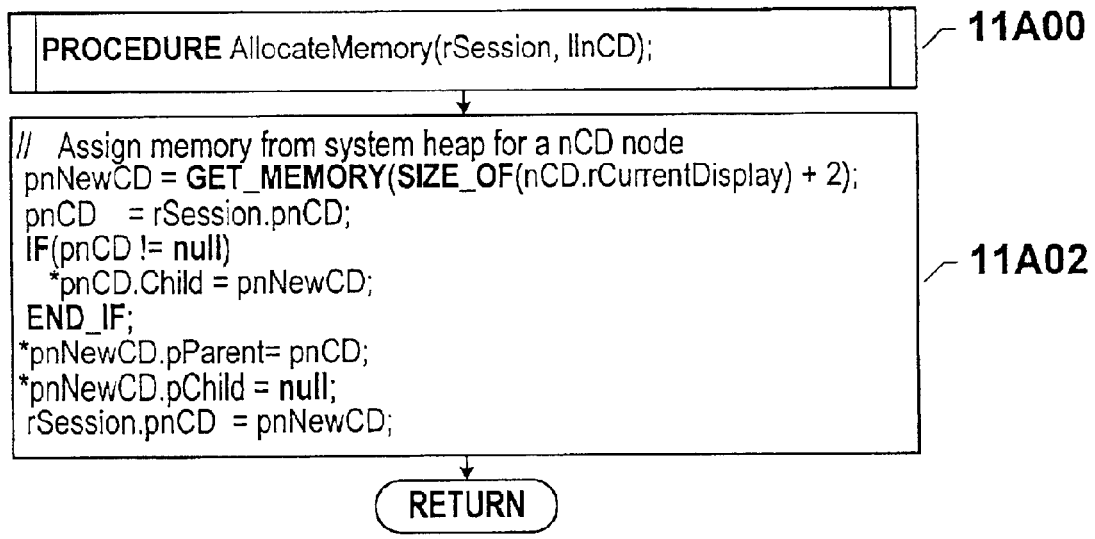
FIG. 11A is a flowchart that discloses the processes that allocate computer memory for each different control requested during a given control subsystem activation.

FIG. 11A allocates the memory required for a new IlnCD, 5D00, node. Processes of 11A02 send a pseudo-message requesting allocation of memory for the number of variables to be stored. The address of this memory is returned. Processes of 11A02 then reference and test the value stored in pnCD, 5C01. If 5C01 contains the value "null," processes of 9A00 are responsible for the current activation of 11A00. If 5C01 contains other than "null", processes of 10C00 have activated 11A00. If 10C00 is the activator, the address of the newly allocated memory is loaded to the pChild variable, 5D02, of the node storing parameters of the currently displayed control. The current control then becomes the parent control of the new control by having its address loaded to the pParent variable, 5D01, of the new nCD node. The address of this new node is then loaded to pnCD, 5C01, of data structure 5C00.

It was noted earlier that this invention presupposes procedures exogenous to the invention exist that actually determine dimensions of the current controls. For this reason FIG. 11B is provided to suggest rather than disclose approaches to the determination of dimensions of the differing control types. Note additionally that as this invention relates only to certain aspects of a control, it cannot be presumed that the data structures that define the Control Subsystem or the controls of a control path are wholly maintained within the code implementing this invention. In consequence, implementation of this invention requires access to the data structures relating to control management irrespective of what component of the computer's software provides storage for these data structures.

Since differences in control type require that width and height values are determined via methods specific to the control, processes of 11B102 identify the type of control being requested and branch to appropriate processes of FIG. 11B for their determination. Processes of 11B102 initially test for dialog box and "Other" type controls. If either of these control types is detected, processing is directed to control specific processes detailed below. If the user requests a control that is not a dialog box or "Other" control, a test is performed to determine if the request is for the initial display of a menu or toolbar control. Since initial menu and toolbar controls are not commonly altered once application start-up is complete, it is preferred to determine these dimensions during the start-up parameterization at 7B10. Processes of 11B104 exist to fetch such predetermined dimensions from storage at 5B29 through 5B32 and immediately return to the calling process. If, however, the tests at 11B02 identify a combo box, a non-initial menu, or non-initial toolbar request, appropriate parameters are extracted at 11B106 before branching to format specific processing. Processes of 11B106 first test if the control is a menu control. If so, the number of items, iNumItems, to be displayed is obtained via a pseudo-message with the result assigned to the local variable iNumRegions. If, however, the control is a toolbar a pseudo-message solicits the number of icon groups and the result assigned to local variable iNumRegions. Another pseudo-message then returns the number of icons in the largest icon group. Finally, if the control is a combo box a pseudo-message solicits the total number of items in its list. The maximum number of items that a combo box is permitted to display is fetched from storage at iRegionsLimit, 5B16 and compared against the value in iNumItem. The variable iNumRegions is then set to the lesser of iNumItem and iRegionsLimit. Processes of 11B108 then branch to further processing based on whether a Vertical-Linear, Spider, or an application specific format is being employed. If the format is other than the Vertical-Linear or Spider format system specific processes at 11B108 are invoked to ascertain the requisite shell and control dimensions.

Processes of FIG. 11B2 suggest a recommended approach for determination of the width and height dimensions of a control displayed via Vertical-Linear format. Processes of 11B202 reference common variables and the relevant aControl record of the rDisplayParms, 5B00, data structure to fetch the variables indicated. Review the definitions of FIG. 5B2 to appreciate the purpose of each of these parameters. Shell height is then determined by 11B204 as the product of the number of shell regions, iNumRegions, and the height of each region, iRegionHeight, 5B15. Determination of display height proceeds in two stages. Processes of 11B204 disclose that if there are no ascendants and no title bar the shell height and display height are equal. If there are no ascendants but a title bar is present, the display height equals shell height plus iTitleBarHeight, 5B06. When ascendants are present the display height is calculated by adding the product of the number of ascendants and iCascadeDisplace_Y, 5B08, to the sum of the shell height and any title bar height.

Determination of shell width is dependent on the number of symbols and text strings to be displayed within the individual regions. This implementation presumes that a whitespace having the width specified by iInterGap, 5B20, precedes the initial symbol or text string and trails the final symbol or text string within each region. It is the general convention that icons within a group of related icons of a toolbar do not have spacing between them. Since the Vertical-Linear format displays one icon group per region, the horizontal width required to dispaly unlabeled icons derives from adding twice the iInterGap value to the product of the number of icons in the largest group, iNumItems, and icon width, iIconWidth, 5B17. Processes of 11B206 determine this dimension. Processes of 11B208 determine the width of a menu or combo box control displayed via the Vertica-Linear fomat. It is presumed that the various identifiers within menu and combo box controls; i.e., icon, label, key-equivalent code, etc., are separated by whitespace equal to iInterGap. Processes of 11B208 loop over each item of the requested control. At the start of each loop a local variable, iWidth, is initialized with the whitespace width, iInterGap. If an icon is present, its width and an iInterGap value are added to iWidth. If a label is present, its width and an iInterGap value are added to iWidth. If key-equivalent symbols are present, their width and an iInterGap value are added to iWidth. Similar processing can be applied to any other identifier. At the end of each loop, iShellWidth and iWide are compared. if iWide represents a new, wider symbol iShellWidth is set to iWide. When the loop terminates the shell width is in iShellWidth. When the current control to be displayed has ascendants, the iCascadeDisplace_X, 5B07, parameter provides the desired displacement. The total display width of a control display is thus the sum of the shell width and the product of the number of ascendants and iCascadeDisplace_X as shown by processes of 11B210.

Processes 11B302 of FIG. 11B4 indicate the preferred approach for determination of width and height for menu, toolbar and combo box controls displayed via the Spider format, but does presuppose obtaining specifics for these controls by reference to the author's writings related to the Spider format. Determination of the height of a Spider combo box differs from that of the menu and toolbar since its preferred implementation dynamically adjusts the number of regions based on relations between the maximum permitted regions and the number of items on the item box's list. When the number of regions exceed four, the processes which determine the height of Spider based menu and toolbar displays parallel those of the Vertical-Linear format except that the shell height equals one-half the number of regions times region height. When a control employing Spider format contains two or four regions special treatment is required. The width of the shell and display of the current control under the Spider format can also be determined by reference to U.S. Pat. No. 6,239,803. For the menu and combo box controls reference to U.S. Pat. No. 6,239,803 is also recommended as the coordinates of the interior region apexes can only be determined by additional knowledge of parameters not provided by data structures disclosed by this invention. When the control is a toolbar the above considerations are extended to encompass whether targets will comprise primarily rectangular icons or whether they encompass both icon and label displayed by a nonrectangular graphic.

Processes of FIG. 11B4 communicate how dialog box dimensions are determined. Pseudo-messages are issued that return dimensions of the requested dialog box. Width of an initial dialog box display will be equal to the dialog box width. When there are ascendants, display width will equal current dialog box width plus the product of iCascadeDisplace_X, 5B07, and the number of ascendants; i.e., the value in iGenerationNumber, 5C11, minus 1. Although system dependent, it is presumed that the value returned for the dialog box height will be inclusive of any title bar. Processes of 11B402 thus subtract the titlebar height from the returned value to determine an "inferred shell" height. Height of an initial display will be the inferred shell height plus the title bar height if present. Height of a display with ascendants will be the height of the current display plus the product of iCascadeDisplace_Y, 5B08, and the number of ascendants.

Since dimensions of any "Other" control cannot be anticipated in the absence of information about characteristics of such system specific controls, the processes of FIG. 11B5 presuppose that system specific code is employed to acquire the width and height dimensions. Once dimensions of the current shell, the height of any title bar present, and the number of ascendants are known processes disclosed above can be adapted by persons of normal skill in these arts to determine display dimensions.

Processes of FIG. 11C disclose how the coordinates of the fixed-point and the width and height dimensions of the current shell are utilized to determine the origin of the current display. Processes of 11C02 fetch needed variables from the data structures rDisplayParms, 5B00, rSession, 5C00, and IlnCD, 5D00. Since 9D08 translated the axis origin to coincide with the fixed-point, initial processes of 11C04 show the X-coordinate of the origin of the current shell to be the negative of the percent of the width of the shell indicated by the value of rFixedPointDisplace_X, 5B22. The Y-coordinate of the current shell's origin is similarly determined as the percent of the height of the shell indicated by the value of rFixedPointDisplace_Y, 5B23, to the Y-coordinate of the fixed-point. Latter processes of 11C04 disclose how the origin of the control display is determined. The X-coordinate of the origin of the control display is determined from the origin of the current shell. Determination of the Y-coordinate of the display is accomplished by adding to the Y-coordinate of the current shell origin the sum of the height of the title bar and the product of the "Y" cascade displacement, 5B08, and the number of ascendant controls. The latter processes of 11C04 determine the bottom-right coordinates of the control display.

Remaining processes of 11C00 exist to manage the case where actual control display dimensions exceed declared maximum display dimensions as can happen when dimensions of the maximum display specified are less than the absolute maximum dimensions. Initial processes of 11C06 solicit values from the computer that permit determination of the coordinates of the top-left and bottom-right corners of the display-zone. Processes of 11C06 then perform two tests to ascertain whether the display-zone clips the control display. If clipping is found, calculations are performed to determine the amount and direction of shift needed to align the clipped edge of the control display on the clipping edge of the display-zone. To perform actual adjustments to the fixed-point, processes 1C08 first translate the axis system back to its original location, the fixed point is then shifted by the amount determined by 11C06 necessary to avoid clipping, and the axis system translated so its origin coincides with the new fixed-point.

Once the dimensions and best location for the current control display are determined, two separate tasks are required to render the control display to the active display: (1) render any ghost controls and (2) render the current control. Processes 11D102 fetch required parameters used by these tasks. Coordinates of the current shell origin, cTLShell, 5D06, combined with shell width and height, 5D07 and 5D08, respectively supported by iTitleBarHeight, 5B06, are requisite to display of the current control. These same values when employed in conjunction with one less than the number of control generations, 5C11, and the displacements for the ghost controls, 5B07 and 5B08, provide the basis for rendering of the ghost controls.

Processes of 11D104 render the window, 5C04, whose resources were allocated at 9A202, to the active display. The origin of this window is the origin of the current display, 5D11, and has width and height given by 5D09 and 5D10 respectively. Because of the translated axis system, the X-coordinate of the origin of the current control shell is the negative product of iShellWidth, 5D07 and rFixedPointDisplace_X, 5B22. The Y-coordinate of the current shell origin is similarly calculated to be the positive product of iShellHeight, and rFixedPointDisplace_Y, 5B23. In general the axis translation will simplify calculations that render the control on the active display and also simplify interpretations of subsequent user manipulations of the resulting control. Specifically, this translation reduces calculations when using the Spider format, which—excluding the titlebar—is symmetric in both dimensions about the fixed-point. The axis origin is translated back to its initial coordinates by process 11F00 immediately after return to FIG. 6A.

Processes of 11D106 initiate a loop that commences by rendering the initial control of the current Control Subsystem activation to ghost format and completes only when all ascending controls of the control display are rendered to the active display in ghost format. Access to data identifying the successive ghost controls commences with the address of the initial control stored in pnInitialCD, 5C02, and is continued by following the sequence of linked pointers provided by the pChild, 5D02, addresses of each successive control. Since 11D102 makes the address of the initial control available prior to the onset of the 11D106 loop, these child addresses are fetched at 11D114; i.e., only after the current ghost display is rendered. Determination of the origin of each ghost control is based on offsets from the origin of the current shell. Because of the axis translation of 9D08, the origin of each ghost shell is expressed as an offset from the fixed-point; i.e., from the translated origin of (0,0). The origin of each ghost shell thus is the sum of the current shell origin and the product of the offset in the appropriate dimension; i.e., 5B07 for the horizontal and 5B08 for the vertical, and one less than the difference between the total number of generations and the generation number of the ghost control being rendered. Process 11D110 sends a pseudo-message to create each successive ghost shell by generating a rectangle having dimensions equal to those of the current shell and positioned relative to the origin of the current shell as calculated by 11D108. This rectangle contains no interior detail and serves only to identify the generation number of the control it represents. Process 11D112 completes the rendering of a ghost control by abutting the title bar to the top of the ghost shell. The iCascadeDisplace offset of each successive ghost control overlays the preceding ghost control in a manner to leave visible all title bars and the right edge of each ghost control, as illustrated by FIG. 3A4

The second task of FIG. 11D; rendering the current control to the active display, is not within the scope of this invention. Processes of 11D202 are presented only to communicate what is required to render the current control.

Figure 11E:
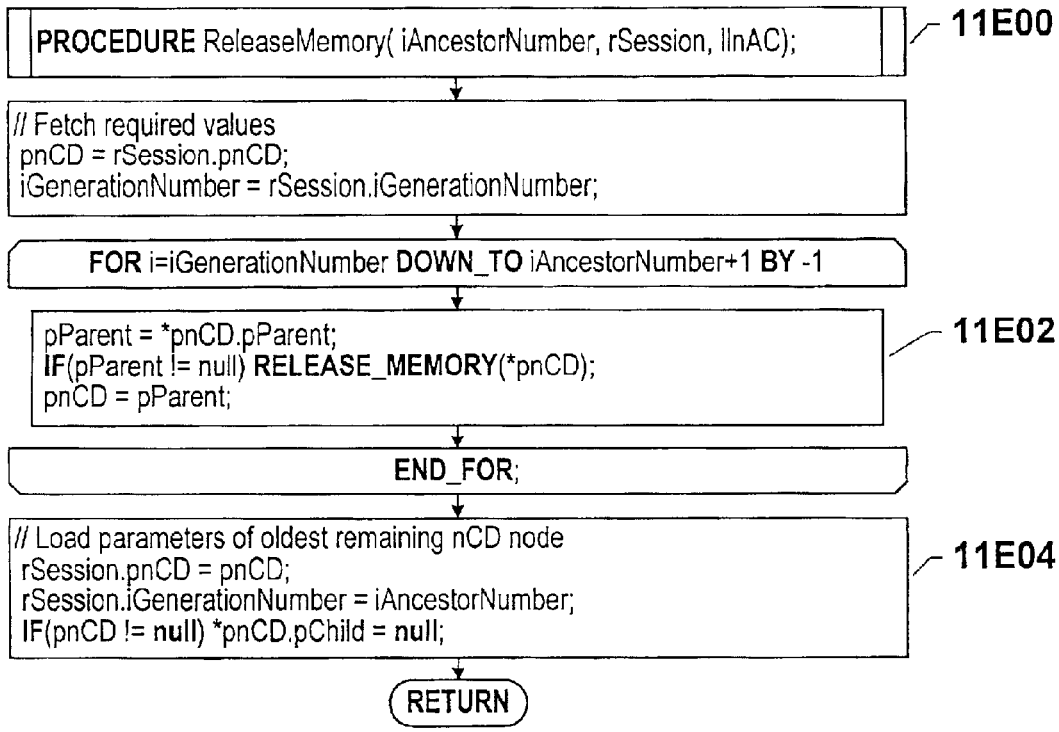
FIG. 11E is a flowchart that discloses the processes that release memory allocated to a control display.

When the user requests an activity that releases memory, processes of FIG. 11E are performed. Processes of 11E02 fetch the address of the currently active IlnCD node stored in the variable pnCD, 5C01, and the number of generations, iGenerationNumber, from storage at 5C11. A loop is entered that fetches and temporarily stores the parent, pParent, 5D01, of the node being referenced by the loop index. The memory of said node is released and the temporarily parent node is set to the currently referenced node. This continues until the node pointed to by pParent is reached. Processes of 11E04 complete memory release by loading the address of the requested ancestor control to rSession.pnCD, 5C01, loading the generation number of the control to be redisplayed to iGenerationNumber, 5C11, and loading "null" to pChild, 5D02.

Figure 11F:
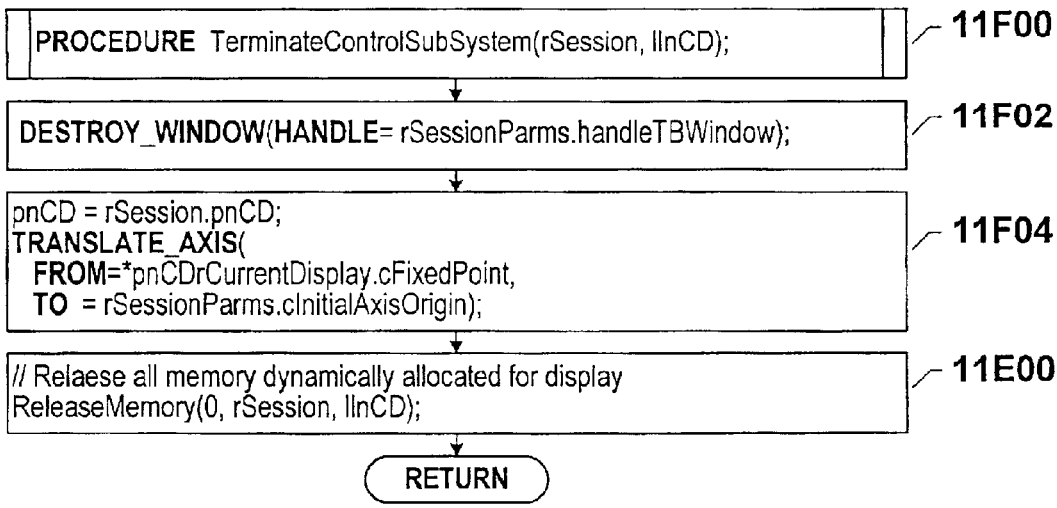
FIG. 11F is a flowchart that discloses the processes that terminate a current activation of the control subsystem.

FIG. 11F terminates the current activation of the Control Subsystem through a three-step process. First, processes of 11F02 send a pseudo-message to the system instructing it to unpaint the control display and release the resources allocated for the display window defined by handleDisplayWindow, 5C04. Next, processes of 11F04 send pseudo-message to translate the current axis system to the coordinates occupied at Control Subsystem activation as stored at 5C03. Termination of the Control Subsystem is completed at 11F06 by releasing all memory allocated to the IlnCD, 5D00, data structure via activation of the processes of FIG. 11E00 with the ancestor generation set to 0.

What is claimed is:

1. A method of display for use with a graphical user interface of a personal computer, the method comprising the steps of:

identifying a maximum display, wherein a size of the maximum display is based at least in part on at least one of a probable-largest required size and an absolute-largest required size;

positioning the maximum display in a best manner, wherein the maximum display minimally overlays a work area of a display zone of an active display, and wherein the maximum display does not extend outside the display zone; and displaying a control path selected by the user based at least in part on a position of the maximum display, wherein the control path does not extend outside the display zone, wherein the display zone corresponds to a delimited area of the active display within which the control path may be rendered, and wherein the work area corresponds to an area of the display zone presumed to be of interest to the user, and wherein the plurality of control paths selectable by the user comprises a plurality of permitted, generation ordered, sequences of differing controls, wherein a control corresponds to a displayable graphic having at least a shell area for presentation of at least one of choice selections and textual matter.

2. The method of claim 1, further comprising the steps of:

identifying a center of the work area;

identifying a center of the display zone;

translating an origin of a coordinate system of the active display to coincide with the center of the work area;

identifying a quadrant of the coordinate system containing the center of the display zone; and positioning a reference point of the maximum display within the quadrant of the coordinate system containing the center of the display zone.

3. The method of claim 2, wherein the reference point is a reference corner of the maximum display.

4. The method of claim 1, further comprising the steps of:

identifying a center of the work area;

identifying a center of the display zone;

translating an origin of a coordinate system of the active display to coincide with the center of the display zone;

identifying a quadrant of the coordinate system containing the center of the work area; and positioning a reference point of the maximum display within the quadrant of the coordinate system containing the center of the work area.

5. The method of claim 4, wherein the reference point is a reference corner of the maximum display.

6. The method of claim 1, wherein the maximum display is positioned within the display zone based at least in part on a plurality of at least one user supplied parameters.

7. The method of claim 6, further comprising the step of selectively overriding the plurality of at least one user supplied parameter to ensure that the maximum display does not extend outside the display zone.

8. The method of claim 1, wherein the maximum display is positioned within the display zone based at least in part on:
 a first user-supplied percentage parameter applied to a horizontal dimension of the work area; and
 a second user-supplied percentage parameter applied to a vertical dimension of the work area.

9. The method of claim 1, wherein the control has an associated control subsystem that remains active during an activation interval controlled by the user and during which a succession of control instances may be displayed corresponding to a permitted control path, wherein the control subsystem operates according to a control subsystem method, the method comprising the steps of:
 a) defining a maximum shell, wherein the maximum shell defines a fixed coordinate within the maximum display, and wherein the fixed coordinate remains fixed during the activation interval unless the size of the maximum display is insufficient to permit display of the control path in the best manner, whereby the control path does not extend outside the display zone; and
 b) positioning all control instances displayed during the activation interval relative to the fixed coordinate.

10. The method of claim 9, wherein the maximum shell is defined based on a maximum shell definition method, the method comprising the steps of:
 a) identifying a shell having a first greatest requirement associated with a first dimensional characteristic of the control shell; and
 b) identifying a shell having a second greatest requirement associated with a second dimensional characteristic of the control shell;
 wherein first dimensional characteristics and second dimensional characteristics of control shells correlate to describe areas of control shells, and
 wherein the first dimensional requirement and second dimensional requirement are determined based at least in part on at least one of a majority of the control shells and all of the control shells.

11. The method of claim 10, wherein the first dimensional characteristic is height, wherein the second dimensional characteristic is width, wherein the first greatest requirement is the greatest height, and wherein the second greatest requirement is the greatest width.

12. The method of claim 9, the method further comprising the step of defining an anchor-point for each of a plurality of at least one control type based on a plurality of at least one user supplied parameters, wherein the associated control subsystem produces the control display, and wherein the anchor point of a current control is positioned to coincide with the fixed point,
 wherein the current control corresponds to the control of a control path that is the control most recently displayed.

13. The method of claim 12, wherein the associated control subsystem affects a repositioning of an ancestor display instance of an ancestor control associated with a control path of the current control, wherein the repositioning affects a displacement of the ancestor display instance that is a predetermined distance to a side of a child display instance of a child control associated with the ancestor control, that is upward in relation to the child display instance, and that is behind the child display instance.

14. The method of claim 13, wherein the current display instance and each ancestor display instance has a title bar display, and wherein the displacement of the ancestor display instance that is upward in relation to the child display instance is not less than the height of the title bar display, and wherein each title bar display of the current display instance and each ancestor display instance is simultaneously visible.

15. The method of claim 14, wherein each ancestor display instance is re-dimensioned to a dimension of the current display instance.

16. The method of claim 15, wherein at least one ancestor display instance is provided with a predetermined visual treatment, wherein the predetermined visual treatment communicates an absence of display content.

17. The method of claim 1, the method further comprising the step of defining an anchor-point for each of a plurality of at least one control type based on a plurality of at least one user supplied parameters.

18. The method of claim 17, wherein the anchor-point is positioned within a shell of each of a plurality of at least one differing control types based at least in part on:
 a first user-supplied percentage parameter applied to the first dimensional characteristic of the shell; and
 a second user-supplied percentage parameter applied to the second dimensional characteristic of the shell.

19. The method of claim 1, wherein a current control has an exit capability, wherein the exit capability permits removal of a graphical display that results from rendering the control path to the active display, and wherein the exit capability permits a return of subsequent computer processing to a calling application, and
 wherein the current control corresponds to the control of a control path that is the control most recently displayed.

20. The method of claim 1, wherein a current control has an abort capability, wherein the abort capability permits a reversal of each service performed during a current activation of a control subsystem, and wherein the abort capability permits removal of a graphical display that results from rendering the control path to the active display, and wherein the abort capability permits a return of subsequent computer processing to a calling application,
 wherein the reversal affects a return of the calling application without provision of any services selected during manipulation of the control path to a system state existing immediately prior to performance of a choice selection, and
 wherein the current control corresponds to the control of a control path that is the control most recently displayed.

21. The method of claim 1, wherein the current control has a done capability, wherein the done capability of the current control is at least one of explicit and implicit, and wherein the done capability of the current control permits a search for an ancestor control associated with a control path of the current control that is a most recent ancestor control, wherein the most recent ancestor control has the done capability, wherein the done capability of the ancestor control is explicit, and wherein the done capability of the current control permits removal of all controls descending from the most recent ancestor control, and wherein the done capability permits display of the most recent ancestor control and its antecedents, and wherein the current control corresponds to the control of a control path that is the control most recently displayed.

22. The method of claim 1, wherein a current control has a done capability, wherein the done capability of the current control is at least one of explicit and implicit, and wherein the done capability of the current control permits a search for an ancestor control associated with a control path of the current control that is the most recent ancestor control, wherein the most recent ancestor control has the done capability, wherein the done capability of the ancestor control is explicit, and wherein the done capability of the current control permits removal of a graphical display that results from rendering the control path to the active display, and wherein the done capability of the current control permits a return of subsequent computer processing to a calling application, and wherein the removal and the return are affected by the done capability of the current control if the search is not successful, and wherein the current control corresponds to the control of a control path that is the control most recently displayed.

23. The method of claim 1, wherein a current control has a cancel capability, wherein the cancel capability permits reversal of all services in a plurality of services performed by a control subsystem, wherein the plurality of services were performed by the control subsystem in response to manipulation of the current control by the user, and wherein the cancel capability permits a search for an ancestor control associated with a control path of the current control that is the most recent ancestor control, wherein the most recent ancestor control has a done capability, wherein the done capability of the most recent ancestor control is explicit, and wherein the cancel capability permits removal of all controls descending from the most recent ancestor control, and wherein the done capability permits display of the most recent ancestor control and its antecedents, and wherein the current control corresponds to the control of a control path that is the control most recently displayed.

24. The method of claim 1, wherein a current control has a cancel capability, wherein the cancel capability permits reversal of all services in a plurality of services performed by a control subsystem, wherein the plurality of services were performed by the control subsystem in response to manipulation of the current control by the user, and wherein the cancel capability permits a search for an ancestor control associated with a control path of the current control that is the most recent ancestor control, wherein the most recent ancestor control has a done capability, wherein the done capability of the most recent ancestor control is explicit, and wherein the cancel capability permits removal of a graphical display that results from rendering the control path to the active display, and wherein the done capability of the current control permits a return of subsequent computer processing to a calling application, and wherein the removal and the return are affected by the cancel capability of the current control if the search is not successful, and wherein the current control corresponds to the control of a control path that is the control most recently displayed.

25. The method of claim 1, wherein a current control has a multi-select capability, wherein the multi-select capability permits the user to convert to a multiple selection mode from a single selection mode at an option of the user, wherein the multiple selection mode permits the user to perform multiple selections from the current control, and wherein the current control corresponds to the control of a control path that is the control most recently displayed.

26. The method of claim 1, wherein a current control has a multi-select capability wherein the multi-select capability is configurable by the user for permitting the user to perform multiple selections, and wherein the current control corresponds to the control of a control path that is the control most recently displayed.

27. The method of claim 1, wherein a current control has an undo capability, wherein the undo capability permits a reversal of a last service performed by a control subsystem in response to user manipulation from at least one of the current control and a previously current control, wherein the current control corresponds to the control of a control path that is the control most recently displayed.

28. A user-interface for use with a computer, the user-interface comprising:

an operating system;

an input means in communication with said operating system for accepting input from a user;

an active display in communication with said operating system;

a plurality of controls in communication with said operating system, said controls corresponding to graphics displayable to said active display, wherein the graphics each have a shell area for presentation of at least one of choice-selections and textual matter;

at least one control path associated with said plurality of controls, said control path corresponding to a permitted, generation ordered sequence of said controls;

a display zone associated with said active display, said display zone corresponding to a delimited area of said active display for rendering said control path as a control display to said active display, wherein said control path has a first dimensional characteristic and a second dimensional characteristic, wherein the first dimensional characteristic and the second dimensional characteristic correlate to describe an area of the control display; and a work area associated with said display zone, said work area corresponding to an area of said display zone of interest to the user, wherein said operating system manages said input means, said active display, and said plurality of controls in a best manner permitting a best rendering of an entirety of the control display specified by the user within said display zone, wherein the control display minimally overlays said work area.

29. The user-interface of claim 28, wherein said operating system employs a display method for achieving the best rendering, the method comprising the steps of:

identifying a maximum display, wherein a size of the maximum display is based at least in part on at least one of a first greatest requirement associated with the first dimensional characteristic of a selectable control and a second greatest requirement associated with a second dimensional characteristic of a selectable control;

positioning the maximum display in the best manner, wherein the maximum display minimally overlays said work area of said display zone of said active display, and wherein the maximum display does not extend outside said display zone; and displaying said control path selected by the user based at least in part on a position of the maximum display region, wherein said control path does not extend outside said display zone.

30. The user-interface of claim 29, wherein the display method further comprises the steps of:

identifying a center of said work area;

identifying a center of said display zone;

translating an origin of a coordinate system of said active display to coincide with the center of said work area;

identifying a quadrant of the coordinate system containing the center of said display zone; and positioning a reference point of the maximum display within the quadrant of the coordinate system containing the center of said display zone 31. The user-interface of claim 30, wherein the reference point is a reference corner of the maximum display.

32. The user-interface of claim 29, wherein the display method further comprises the steps of:

identifying a center of said work area;

identifying a center of said display zone;

translating an origin of a coordinate system of said active display to coincide with the center of said display zone;

identifying a quadrant of the coordinate system containing the center of said work area; and positioning a reference point of the maximum display within the quadrant of the coordinate system containing the center of said work area.

33. The user interface of claim 29, wherein the display method further comprises the step of defining an anchor-point for each of a plurality of at least one control type based on a plurality of at least one user supplied parameters.

34. The user interface of claim 33, wherein the anchor-point is positioned within a shell of each of a plurality of at least one differing control types based at least in part on:

a first user-supplied percentage parameter applied to the first dimensional characteristic of the shell; and a second user-supplied percentage parameter applied to the second dimensional characteristic of the shell.

35. The user interface of claim 29, wherein the first greatest requirement and the second greatest requirement are determined based at least in part on dimensional characteristics of all control paths selectable by the user.

36. The user interface of claim 29, wherein the first greatest requirement and the second greatest requirement are determined based at least in part on dimensional characteristics of a majority of control paths selectable by the user, wherein a small population of control paths selectable by a user having exceptionally large requirements regarding at least one dimensional characteristic are excluded from the majority.

37. The user interface of claim 29, wherein an absolute determination regarding the first greatest requirement and the second greatest requirement are determined based on dimensional characteristics of all control paths selectable by the user, wherein a probable determination regarding the first greatest requirement and the second greatest requirement are determined based on dimensional characteristics of a majority of control paths selectable by the user, wherein a small population of control paths selectable by a user having exceptionally large requirements regarding at least one dimensional characteristic are excluded from the majority, and wherein the size of the maximum display is based on the probable determination unless the size of the maximum display is insufficient to permit display of the control path in the best manner, and wherein the size of the maximum display is based on the absolute determination if the size of the maximum display is insufficient to permit display of the control path in the best manner.

38. The user interface of claim 28, wherein the best rendering includes a positioning of the control display as near said work area as possible while maintaining a minimal overlay.

39. The user interface of claim 28, wherein a current control corresponding to the control of said control path that is the control most recently displayed has navigation capabilities.

40. The user interface of claim 39, wherein the navigation capabilities include at least one of a multi-select capability and an undo capability, wherein the multi-select capability permits the user to select a plurality of services from the current control for performance by a control subsystem, and wherein the undo capability permits a reversal of at least one of a last service and a last plurality of services performed by a control subsystem in response to user manipulation from at least one of the current control and a previously current control.

41. The user interface of claim 39, wherein the navigation capabilities include at least one of a done capability and an exit capability, wherein a done capability permits at least one of:

a) removal of all controls descending from a most recent ancestor control explicitly having the done capability and display of the most recent ancestor control and its antecedents, and b) removal of the control display and return to a calling application, and wherein the exit capability permits removal of the control display and return to the calling application.

42. The user interface of claim 41, wherein the done capability performs a search for the most recent ancestor control and performs removal of the control display and return to the calling application in the event the search is not successful.

43. The user interface of claim 39, wherein navigation capabilities include at least one of an abort capability and a cancel capability, wherein the abort capability permits reversal of all services performed during a current activation of an associated control subsystem of the current control, removal of the control display, and return to a calling application, and wherein the cancel capability permits reversal of all services performed during a current activation of an associated control subsystem of the current control and at least one of:

a) removal of all controls descending from a most recent ancestor control explicitly having the done capability and display of the most recent ancestor control and its antecedents, and b) removal of the control display and return to a calling application.

44. The user interface of claim 43, wherein the cancel capability performs a search for the most recent ancestor control and performs removal of the control display and return to the calling application in the event the search is not successful.

45. The user interface of claim 28, wherein the control display is rendered in a manner permitting display of the current control in reference to a fixed point, wherein each ancestor control is displayed behind its child control and at least one of offset in a first direction relative to its child control and offset in a second direction relative to its child control.

46. The user interface of claim 45, wherein the fixed point remains fixed during an activation interval of an associated control subsystem unless repositioning of the fixed point is required to facilitate the best rendering.

* * * * *